United States Patent
Yamaoka et al.

(10) Patent No.: US 12,557,414 B2
(45) Date of Patent: Feb. 17, 2026

(54) LIGHT DETECTING DEVICE FOR HYPERSPECTRAL IMAGING, METHOD FOR MANUFACTURING STRUCTURE FOR HYPERSPECTRAL IMAGING, AND METHOD FOR MANUFACTURING LIGHT DETECTING DEVICE FOR HYPERSPECTRAL IMAGING

(71) Applicant: Panasonic Intellectual Property Management Co., Ltd., Osaka (JP)

(72) Inventors: Yoshikazu Yamaoka, Osaka (JP); Motoki Yako, Osaka (JP); Atsushi Ishikawa, Osaka (JP); Chikai Hosokawa, Osaka (JP); Taku Hirasawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 393 days.

(21) Appl. No.: 18/194,669

(22) Filed: Apr. 3, 2023

(65) Prior Publication Data

US 2023/0238413 A1 Jul. 27, 2023

Related U.S. Application Data

(63) Continuation of application No. PCT/JP2021/037711, filed on Oct. 12, 2021.

(30) Foreign Application Priority Data

Oct. 30, 2020 (JP) .................................. 2020-182110
Sep. 24, 2021 (JP) .................................. 2021-155972

(51) Int. Cl.
*H10F 39/00* (2025.01)
*G01J 3/28* (2006.01)
(Continued)

(52) U.S. Cl.
CPC .......... *H10F 39/806* (2025.01); *G01J 3/2823* (2013.01); *G02B 5/201* (2013.01);
(Continued)

(58) Field of Classification Search
CPC .... H10F 39/806; H10F 39/024; H10F 39/182; H10F 39/804; H10F 39/805;
(Continued)

(56) References Cited

U.S. PATENT DOCUMENTS 6,031,653 A 2/2000 Wang
2008/0251873 A1 10/2008 Kasano et al.
(Continued)

FOREIGN PATENT DOCUMENTS

EP 3 206 060 8/2017
JP 59-218770 12/1984
(Continued)

OTHER PUBLICATIONS

International Search Report of PCT application No. PCT/JP2021/037711 dated Jan. 11, 2022.
(Continued)

*Primary Examiner* — Ratisha Mehta
*Assistant Examiner* — Sophia W Kao
(74) *Attorney, Agent, or Firm* — Wenderoth, Lind & Ponack, L.L.P.

(57) ABSTRACT

A light detecting device is provided with: a filter array including filters arranged two-dimensionally, each of the filters having a light-incident surface and a light-emitting surface, the filters including multiple types of filters having mutually different transmission spectra; and an image sensor having a light-detecting surface facing the light-emitting surface, the image sensor being provided with light-detecting elements arranged two-dimensionally on the light-detecting surface, wherein the distance between the light- (Continued)

emitting surface and the light-detecting surface is different for each of the filters.

25 Claims, 30 Drawing Sheets

(51) Int. Cl.
    *G02B 1/11*     (2015.01)
    *G02B 3/00*     (2006.01)
    *G02B 5/20*     (2006.01)
    *G02B 5/28*     (2006.01)
    *H04N 25/13*     (2023.01)
    *H10F 39/18*     (2025.01)

(52) U.S. Cl.
    CPC ......... *H04N 25/135* (2023.01); *H10F 39/024* (2025.01); *H10F 39/182* (2025.01); *H10F 39/804* (2025.01); *H10F 39/805* (2025.01); *H10F 39/8063* (2025.01); *G01J 2003/2826* (2013.01); *G02B 1/11* (2013.01); *G02B 3/0056* (2013.01); *G02B 5/28* (2013.01)

(58) Field of Classification Search
    CPC .. H10F 39/8063; H10F 39/12; H10F 39/8053; H10F 99/00; G01J 3/2823; G01J 2003/2826; G01J 3/513; G02B 5/201; G02B 1/11; G02B 3/0056; G02B 5/28; G02B 5/20; H04N 25/135
    See application file for complete search history.

(56) References Cited

U.S. PATENT DOCUMENTS

| | | | |
|---|---|---|---|
| 2012/0092666 A1* | 4/2012 | Meijer | G01J 3/513 |
| | | | 356/326 |
| 2014/0175265 A1 | 6/2014 | Gonzalez et al. | |
| 2016/0138975 A1 | 5/2016 | Ando et al. | |
| 2017/0270381 A1 | 9/2017 | Itoh et al. | |
| 2018/0356212 A1* | 12/2018 | Narumi | H10F 39/8053 |
| 2020/0209596 A1* | 7/2020 | Kimura | G02B 5/20 |
| 2020/0258927 A1* | 8/2020 | Ockenfuss | H10F 39/8067 |
| 2020/0386620 A1 | 12/2020 | Toda | |
| 2021/0167107 A1* | 6/2021 | Sugizaki | H10F 77/413 |
| 2021/0288087 A1 | 9/2021 | Tisserand et al. | |
| 2021/0318171 A1 | 10/2021 | Inada et al. | |
| 2023/0096263 A1* | 3/2023 | Miyata | H10F 39/802 |
| | | | 250/208.1 |
| 2023/0353890 A1* | 11/2023 | Gimkiewicz | H04N 23/55 |

FOREIGN PATENT DOCUMENTS

| | | | | |
|---|---|---|---|---|
| JP | 63-151076 | | 6/1988 | |
| JP | 2008-035047 | | 2/2008 | |
| JP | 2008035047 A | * | 2/2008 | |
| JP | 2008-170979 | | 7/2008 | |
| JP | 2008170979 A | * | 7/2008 | |
| JP | 2013-512445 | | 4/2013 | |
| JP | 2016-513240 | | 5/2016 | |
| JP | 2016-111661 | | 6/2016 | |
| JP | 2018-137284 | | 8/2018 | |
| WO | 2011/064403 | | 6/2011 | |
| WO | 2014/120686 | | 8/2014 | |
| WO | 2018/193986 | | 10/2018 | |
| WO | WO-2018193986 A1 | * | 10/2018 | ............ H10F 30/20 |
| WO | 2020/025888 | | 2/2020 | |
| WO | 2020/149056 | | 7/2020 | |

OTHER PUBLICATIONS

Extended European Search Report issued Nov. 15, 2024 in European Patent Application No. 21885888.4.

* cited by examiner

LIGHT DETECTING DEVICE FOR HYPERSPECTRAL IMAGING, METHOD FOR MANUFACTURING STRUCTURE FOR HYPERSPECTRAL IMAGING, AND METHOD FOR MANUFACTURING LIGHT DETECTING DEVICE FOR HYPERSPECTRAL IMAGING

BACKGROUND

1. Technical Field

The present disclosure relates to a light detecting device, a method for manufacturing a structure, and a method for manufacturing a light detecting device.

2. Description of the Related Art

By utilizing spectral information from many bands, such as several dozen bands for example, each of which is a narrow band, it is possible to ascertain detailed physical properties about an object that would not be possible with a conventional RGB image. A camera that acquires such information on many wavelengths is referred to as a "hyperspectral camera". Hyperspectral cameras are being used in various fields, such as food inspection, biopsies, drug development, and mineral component analysis.

U.S. Pat. No. 9,599,511 discloses an example of a hyperspectral imaging device utilizing compressed sensing. The imaging device is provided with an encoding element, that is, an array of optical filters having mutually different wavelength dependencies of light transmittance, an image sensor that detects light transmitted through the encoding element, and a signal processing circuit. The encoding element is disposed on a light path connecting a subject and the image sensor. The image sensor acquires a multi-wavelength image for each pixel by simultaneously detecting light resulting from the superposition of components from multiple wavelength bands. The signal processing circuit utilizes information about the spatial distribution of the spectral transmittance of the encoding element to apply compressed sensing to the acquired multi-wavelength image, and thereby generates image data for each of the wavelength bands. In the imaging device disclosed in U.S. Pat. No. 9,599,511, an optical filter having two or more transmittance peaks (that is, local maxima) inside the target wavelength band is used as the encoding element.

U.S. Pat. No. 9,466,628 discloses an example of a filter array provided with a Fabry-Pérot resonator using a dielectric multilayer film as a reflection layer. Japanese Unexamined Patent Application Publication (Translation of PCT Application) No. 2013-512445, Japanese Unexamined Patent Application Publication No. 63-151076, and Japanese Unexamined Patent Application Publication No. 59-218770 disclose examples of arrangements of a filter array and an image sensor.

SUMMARY

One non-limiting and exemplary embodiment provides a light detecting device with which the imaging characteristics can be improved.

In one general aspect, the techniques disclosed here feature a light detecting device provided with: a filter array including filters arranged two-dimensionally, each of the filters having a light-incident surface and a light-emitting surface, the filters including multiple types of filters having mutually different transmission spectra; and an image sensor having a light-detecting surface facing the light-emitting surface, the image sensor being provided with light-detecting elements arranged two-dimensionally on the light-detecting surface, wherein the distance between the light-emitting surface and the light-detecting surface is different for each of the filters.

It should be noted that general or specific embodiments may be implemented as a system, an apparatus, a method, an integrated circuit, a computer program, a computer-readable recording medium, or any selective combination thereof. The computer-readable recording medium includes a non-volatile recording medium such as Compact Disc-Read-Only Memory (CD-ROM), for example. An apparatus may also include one or more apparatuses. In the case where an apparatus includes two or more apparatuses, the two or more apparatuses may be disposed inside a single piece of equipment or disposed separately in two or more discrete pieces of equipment. In the specification and claims herein, an "apparatus" may not only refer to a single apparatus, but also to a system including multiple apparatuses.

According to the technology of the present disclosure, it is possible to improve the imaging characteristics of a light detecting device such as a hyperspectral camera, for example.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
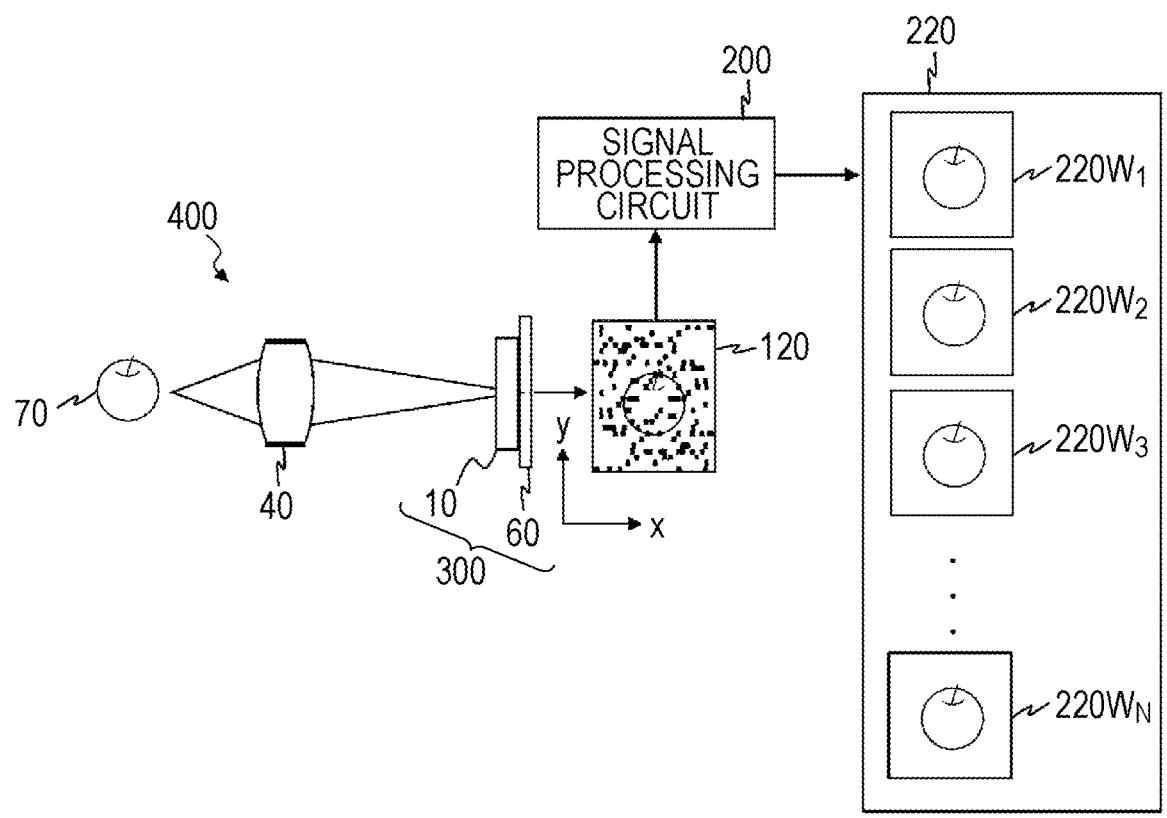
FIG. 1 is a diagram schematically illustrating a light detection system according to an exemplary embodiment.

Hereinafter, exemplary embodiments of the present disclosure will be described. Note that the embodiments described hereinafter all illustrate general or specific examples. Features such as numerical values, shapes, structural elements, placement and connection states of structural elements, steps, and the ordering of steps indicated in the following embodiments are merely examples, and are not intended to limit the present disclosure. In addition, among the structural elements in the following embodiments, structural elements that are not described in the independent claim indicating the broadest concept are described as arbitrary or optional structural elements. Also, each diagram is a schematic diagram, and does not necessarily illustrate a strict representation. Furthermore, in the drawings, structural elements that are substantially the same are denoted with the same signs, and duplicate description of such structural elements may be reduced or omitted in some cases.

Before describing embodiments of the present disclosure, the underlying knowledge forming the basis of the present disclosure will be described.

U.S. Pat. No. 9,599,511 discloses an imaging device that can generate a high-resolution multi-wavelength image, that is, an image for each of multiple wavelength bands. In the imaging device, an image of light from an object is encoded and captured by an optical element referred to as an "encoding element". The encoding element includes regions arranged two-dimensionally, for example. The transmission spectrum of each of at least two of the regions has a transmittance maximum in multiple wavelength bands included in the wavelength band to be imaged. The regions may be arranged to correspond respectively with pixels in an image sensor, for example. In imaging using the encoding element, the data of each pixel includes information from multiple wavelength bands. In other words, the image data acquired by the imaging is compressed image data containing compressed wavelength information. Consequently, it is sufficient to hold two-dimensional data, and the data size can be reduced. For example, it is possible to acquire video image data of a long duration, even if the capacity of the recording medium is constrained. A multi-wavelength image is generated by reconstructing images corresponding to each of the wavelength bands from the image acquired by imaging.

The encoding element may be achieved by a filter array including multiple filters arranged two-dimensionally, for example. Each of the filters may have the structure of what is called a Fabry-Pérot resonator including an interference layer, for example. The structure disclosed in U.S. Pat. No. 9,466,628 can be adopted as the Fabry-Pérot resonator, for example. The filters may be designed such that the transmission spectrum of each filters has multiple peaks in the wavelength band to be imaged. Filters having interference layers of different thicknesses will exhibit mutually different transmission spectra.

Light passing through the filter array is detected by the image sensor. Japanese Unexamined Patent Application Publication (Translation of PCT Application) No. 2013-512445, Japanese Unexamined Patent Application Publication No. 63-151076, and Japanese Unexamined Patent Application Publication No. 59-218770 disclose examples of arrangements of a filter array and an image sensor. In the arrangement disclosed in Japanese Unexamined Patent Application Publication (Translation of PCT Application) No. 2013-512445, the filter array is fabricated on top of the image sensor. With such a configuration, modifying the configuration of the filter array also entails modifying the fabrication step, which has the effect of increasing costs. In the arrangement disclosed in Japanese Unexamined Patent Application Publication No. 63-151076, the filter array and the image sensor are bonded to each other with a gap in between. With such a configuration, a fringe pattern like Newton's rings appears in the captured image due to light interference produced between the filter array and the image sensor. As a result, the imaging characteristics are degraded. In the arrangement disclosed in Japanese Unexamined Patent Application Publication No. 59-218770, the filter array and the image sensor are bonded to each other with no gap in between. However, if the filter array and/or the image sensor has curvature, there is a possibility that a gap will be formed even if one attempts to bond the filter array and the image sensor with no gap.

In light of the above investigation, the inventors conceived of an arrangement of a filter array and an image sensor with which degraded imaging characteristics due to light interference can be suppressed at low cost. A light detecting device according to an embodiment of the present disclosure is provided with: a filter array having a light-incident surface and a light-emitting surface on the opposite side; and an image sensor having a light-detecting surface facing the light-emitting surface. The filter array is provided with multiple types of filters with mutually different transmission spectra in a specific wavelength band. The distance between the light-emitting surface and the light-detecting surface is different depending on the transmission spectra of the filters. By making the distance between the light-emitting surface and the light-detecting surface nonuniform, the impact of a fringe pattern appearing in the captured image can be lessened. As a result, the imaging characteristics can be improved. Furthermore, since it is not necessary to fabricate the filter array on top of the image sensor, the light detecting device can be manufactured at low cost. The light detecting device according to an embodiment of the present disclosure can be applied not only to a hyperspectral camera but also to a typical color camera that acquires images in three primary colors, for example. Hereinafter, the light detecting device according to an embodiment of the present disclosure will be described briefly.

A light detecting device according to a first aspect of the present disclosure is provided with: a filter array including filters arranged two-dimensionally, each of the filters having a light-incident surface and a light-emitting surface, the filters including multiple types of filters having mutually different transmission spectra; and an image sensor having a light-detecting surface facing the light-emitting surface, the image sensor being provided with light-detecting elements arranged two-dimensionally on the light-detecting surface. The distance between the light-emitting surface and the light-detecting surface is different for each of the filters.

With this light detecting device, the appearance of a fringe pattern in the captured image can be suppressed.

According to a light detecting device according to a second aspect, in the light detecting device according to the first aspect, each of the multiple types of filters is provided with a resonance structure including an interference layer having a first surface and a second surface positioned on opposite sides from each other and a reflection layer provided on the first surface. The thickness of the interference layer is different depending on the transmission spectra of the filters. The transmission spectrum of each of the multiple types of filters has a transmittance maximum at each of two or more wavelengths included in a specific wavelength band. The image sensor is sensitive in the specific wavelength band.

With this light detecting device, a multi-wavelength image can be acquired.

According to a light detecting device according to a third aspect, in the light detecting device according to the first aspect, the multiple types of filters include two or more types of color filters.

With this light detecting device, a multi-wavelength image can be acquired.

According to a light detecting device according to a fourth aspect, in the light detecting device according to the third aspect, at least one of the multiple types of color filters is provided with an anti-reflective film on the light-emitting surface.

With this light detecting device, the appearance of a fringe pattern in the captured image can be suppressed further.

According to a light detecting device according to a fifth aspect, in the light detecting device according to any of the first to fourth aspects, the multiple types of filters are arranged irregularly.

With this light detecting device, the appearance of a fringe pattern in the captured image can be suppressed further. Furthermore, in the case of acquiring a multi-wavelength image, reconstruction error in the multi-wavelength image can be reduced.

According to a light detecting device according to a sixth aspect, in the light detecting device according to any of the first to fifth aspects, the minimum distance between the light-emitting surface and the light-detecting surface is equal to or greater than 0.1 µm and less than or equal to 200 µm.

With this light detecting device, the majority of the light passing through each filter can be made to be incident on the region of the light-detecting surface positioned directly below each filter.

According to a light detecting device according to a seventh aspect, in the light detecting device according to any of the first to sixth aspects, the filters face the light-detecting elements in a one-to-one correspondence.

With this light detecting device, the light passing through each filter can be made to be incident on a single light-detecting element.

According to a light detecting device according to an eighth aspect, in the light detecting device according to any of the first to sixth aspects, at least one of the filters has portions that face a portion of each of two adjacent light-detecting elements among the light-detecting elements.

With this light detecting device, randomness in the spectra of the light detected by the light-detecting elements can be improved.

According to a light detecting device according to a ninth aspect, in the light detecting device according to any of the first to eighth aspects, the light-incident surface of the filters and the light-detecting surface are parallel to each other.

With this light detecting device, the gap between the filter array and the image sensor can be reduced without causing the filter array and the image sensor to touch each other.

According to a light detecting device according to a 10th aspect, in the light detecting device according to any of the first to eighth aspects, the light-incident surface of the filters and the light-detecting surface are not parallel to each other.

With this light detecting device, the appearance of a fringe pattern in the captured image can be suppressed further.

According to a light detecting device according to an 11th aspect, in the light detecting device according to any of the first to 10th aspects, when viewed from the light-incident surface side, the filters are arranged two-dimensionally in a first direction and a second direction rotated counter-clockwise from the first direction by a predetermined angle, and the light-detecting elements are arranged two-dimensionally in a third direction and a fourth direction rotated counter-clockwise from the third direction by the predetermined angle. The angle obtained by the first direction and the third direction is equal to or greater than ¼ and less than or equal to ½ the predetermined angle.

With this light detecting device, moiré patterns can be suppressed and the imaging characteristics can be improved.

According to a light detecting device according to a 12th aspect, in the light detecting device according to the 11th aspect, the predetermined angle is 90 degrees.

With this light detecting device, moiré patterns can be suppressed over a wider angle range.

According to a light detecting device according to a 13th aspect, in the light detecting device according to any of the first to 12th aspects, the filter array and the image sensor have curvature bowing in the same direction.

With this light detecting device, the gap between the filter array and the image sensor can be reduced without causing the filter array and the image sensor to touch each other.

According to a light detecting device according to a 14th aspect, in the light detecting device according to any of the first to 12th aspects, the filter array and the image sensor have curvature bowing in opposite directions.

With this light detecting device, the appearance of a fringe pattern in the captured image can be suppressed further.

According to a light detecting device according to a 15th aspect, the light detecting device according to any of the first to 14th aspects is further provided with a substrate on the light-incident surface of the filters.

With this light detecting device, by treating the substrate on which the filter array is provided as a structural element, a step for removing the substrate can be omitted.

According to a light detecting device according to a 16th aspect, in the light detecting device according to the 15th aspect, the substrate is provided with an anti-reflective film on the surface on the opposite side from the surface on the filter array side.

With this light detecting device, the light detection efficiency can be improved.

According to a light detecting device according to a 17th aspect, the light detecting device according to any of the first to 16th aspects is further provided with double-sided tape sticking together at least a portion of a peripheral area located around the light-emitting surface of the filters and at least a portion of a peripheral area located around the light-detecting surface of the image sensor.

With this light detecting device, the arrangement of the filter array and the image sensor can be fixed.

According to a light detecting device according to an 18th aspect, the light detecting device according to any of the first to 16th aspects is further provided with spacers caught between the filter array and the image sensor, the spacers prescribing the distance between the light-emitting surface of each of the filters and the light-detecting surface. At least a portion of the light-emitting surface of the filters and at least a portion of the light-detecting surface are bonded to each other with a transparent adhesive.

With this light detecting device, the arrangement of the filter array and the image sensor can be fixed.

According to a light detecting device according to a 19th aspect, in the light detecting device according to the 18th aspect, in a plan view, at least one of the spacers is disposed at a position overlapping at least one of the light-detecting elements.

With this light detecting device, randomness in the spectra of the light detected by the light-detecting elements can be improved.

According to a light detecting device according to a 20th aspect, in the light detecting device according to any of the first to 19th aspects, the image sensor is provided with first microlenses arranged on the light-detecting elements in a one-to-one correspondence.

With this light detecting device, the light passing through the filters can be made to be incident on the light-detecting elements efficiently through the first microlenses.

According to a light detecting device according to a 21st aspect, in the light detecting device according to any of the first to 20th aspects, the filter array is provided with second microlenses disposed on the light-emitting surface of each of the filters in a one-to-one correspondence.

With this light detecting device, the light passing through the filters can be made to be incident on the light-detecting elements efficiently through the second microlenses.

According to a light detecting device according to a 22nd aspect, in the light detecting device according to any of the first to 21st aspects, the minimum distance between the light-emitting surface and the light-detecting surface is greater than 0.1 µm.

With this light detecting device, the impact of interference near the 400 nm wavelength in the target wavelength band can be lessened.

According to a light detecting device according to a 23rd aspect, in the light detecting device according to any of the first to 21st aspects, provided that a target wavelength band is equal to or greater than $\lambda_1$ and less than or equal to $\lambda_2$, the minimum distance between the light-emitting surface and the light-detecting surface is greater than $\lambda_1/4$.

With this light detecting device, the imaging characteristics in the target wavelength band can be improved.

According to a light detecting device according to a 24th aspect, in the light detecting device according to any of the first to 21st aspects, provided that a target wavelength band is equal to or greater than Xi and less than or equal to $\lambda_2$, the minimum distance between the light-emitting surface and the light-detecting surface is greater than $\lambda_2/4$.

With this light detecting device, the imaging characteristics in the target wavelength band can be improved further.

According to a light detecting device according to a 25th aspect, the light detecting device according to any of the first to 24th aspects is further provided with: a transparent cover supporting the filter array; and a package provided with a base having a first area where the image sensor is provided and side walls surrounding the image sensor and extending from a second area of the base, the second area being located around the first area. The transparent cover and the package encapsulate the filter array and the image sensor.

With this light detecting device, the intrusion of dust, dirt, or moisture into the light detecting device can be deterred.

According to a light detecting device according to a 26th aspect, the light detecting device according to any of the first to 25th aspects is further provided with a signal processing circuit. The signal processing circuit reconstructs spectral images for each of four or more wavelength bands from a compressed image encoded by the filter array.

With this light detecting device, an image containing more wavelength information than an RGB color image can be obtained.

A method for manufacturing a structure according to a 27th aspect includes: preparing a filter array having an uneven surface and including filters arranged two-dimensionally, the filters having mutually different transmission spectra; forming a photoresist on the uneven surface of the filter array by spin coating; and forming spacers on the uneven surface of the filter array by patterning the photoresist.

With this method for manufacturing a filter array, spacers with aligned heights can be formed on the uneven surface of the filter array.

A method for manufacturing a light detecting device according to a 28th aspect includes: preparing a structure manufactured according to the method for manufacturing a structure according to the 27th aspect and an image sensor having a light-detecting surface; and sticking together the filter array and the image sensor with the spacers interposed in between, in a state in which the uneven surface of the filter array and the light-detecting surface of the image sensor are facing each other.

With this method for manufacturing a light detecting device, the filter array and the image sensor can be stuck together substantially parallel to each other.

According to a method for manufacturing a light detecting device according to a 29th aspect, in the method for manufacturing a light detecting device according to the 28th aspect, adhesives are arranged on the light-detecting surface and/or a peripheral area located around the light-detecting surface of the image sensor, and the sticking together of the filter array and the image sensor includes pressing the filter array against the image sensor with the spacers and the adhesives interposed in between.

With this method for manufacturing a light detecting device, the adhesives can be cured to stick together the filter array and the image sensor.

In the present disclosure, all or part of the circuits, units, devices, members, or sections, or all or part of the function blocks in the block diagrams, may also be executed by one or multiple electronic circuits, including a semiconductor device, a semiconductor integrated circuit (IC), or a large-scale integration (LSI) chip, for example. An LSI chip or IC may be integrated into a single chip, or may be configured by combining multiple chips. For example, function blocks other than memory elements may be integrated into a single chip. Although referred to as an LSI chip or IC herein, such electronic circuits may also be called a system LSI chip, a very large-scale integration (VLSI) chip, or an ultra-large-scale integration (ULSI) chip, depending on the degree of integration. A field-programmable gate array (FPGA) programmed after fabrication of the LSI chip, or a reconfigurable logic device in which interconnection relationships inside the LSI chip may be reconfigured or in which circuit demarcations inside the LSI chip may be set up, may also be used for the same purpose.

Furthermore, the function or operation of all or part of a circuit, unit, device, member, or section may also be executed by software processing. In this case, the software is recorded onto a non-transitory recording medium, such as one or multiple ROM modules, optical discs, or hard disk drives, and when the software is executed by a processor, the function specified by the software is executed by the processor and peripheral devices. A system or device may also be provided with one or multiple non-transitory recording media on which the software is recorded, a processor, and necessary hardware devices, such as an interface, for example.

(Embodiment)

<Light Detection System>

FIG. 1 is a diagram schematically illustrating a light detection system 400 according to an exemplary embodiment of the present disclosure. The light detection system 400 is provided with an optical system 40, a filter array 10, an image sensor 60, and a signal processing circuit 200. The filter array 10 has functions similar to the "encoding element" disclosed in U.S. Pat. No. 9,599,511. For this reason, the filter array 10 may also be referred to as the "encoding element". The optical system 40 and the filter array 10 are disposed on a path of light incident from an object 70. In the example illustrated in FIG. 1, the filter array 10 is disposed between the optical system 40 and the image sensor 60.

In FIG. 1, an apple is illustrated as one example of the object 70. The object 70 is not limited to an apple and may be any physical object. The signal processing circuit 200 generates image data for each wavelength band included in a specific wavelength band (hereinafter also referred to as the "target wavelength band") on the basis of image data generated by the image sensor 60. The image data is referred to as "spectral image data" in this specification. Herein, the number of wavelength bands included in the target wavelength band is taken to N (where N is an integer equal to or greater than 4). In the following description, the spectral image data of each of the generated wavelength bands is referred to as the isolated images $220W_1$, $220W_2$, ..., $220W_N$, and collectively referred to as the isolated images 220. In this specification, a signal representing an image, that is, a set of signals expressing the pixel values of pixels forming an image, is also simply referred to as an "image".

The filter array 10 is provided with transmissive filters arranged in rows and columns. The filter array 10 is an optical element in which the transmission spectrum of the light, or in other words the wavelength dependency of the light transmittance, is different depending on the filter. The filter array 10 allows incident light to pass through while modulating the intensity of the light in each wavelength band.

In the example illustrated in FIG. 1, the filter array 10 is disposed near the image sensor 60. Here, "near" means that an image of light from the optical system 40 is close enough to be formed on the surface of the filter array 10 in a distinct state to some degree. In this specification, a device provided with the filter array 10 and the image sensor 60 is referred to as a "light detecting device 300".

The optical system 40 includes at least one lens. In FIG. 1, the optical system 40 is illustrated as a single lens, but the optical system 40 may also be formed by a combination of multiple lenses. The optical system 40 forms an image on the imaging surface of the image sensor 60 through the filter array 10.

The image sensor 60 is provided with light-detecting elements arranged two-dimensionally. The image sensor 60 may be a charge-coupled device (CCD) sensor, a complementary metal-oxide-semiconductor (CMOS) sensor, or an infrared array sensor, for example. The light-detecting elements may include photodiodes, for example. The image sensor 60 may be a sensor of the monochrome type or a sensor of the color type, for example. The target wavelength band may be set in any way. The target wavelength band is not limited to the visible wavelength band and may also be the wavelength range of ultraviolet, near-infrared, mid-infrared, far-infrared, or microwave.

In the example illustrated in FIG. 1, each of the light-detecting elements is disposed facing one of the filters. Each light-detecting element is sensitive to light in a wavelength band to be imaged. Specifically, each light-detecting element has substantial sensitivity necessary to detect light in a wavelength band to be imaged. For example, each light-detecting element may have an external quantum efficiency of 1% or higher in the corresponding wavelength band. The external quantum efficiency of the light-detecting elements may also be 10% or higher. The external quantum efficiency of the light-detecting elements may also be 20% or higher. In the following description, the light-detecting elements are also referred to as "pixels".

The signal processing circuit 200 may be an integrated circuit provided with a processor and a storage medium such as a memory, for example. The signal processing circuit 200 generates data of the isolated images 220, each of which contains information about multiple wavelength bands, on the basis of an image 120 acquired by the image sensor 60. Details of the isolated images 220 and a method for processing an image signal in the signal processing circuit 200 will be described later. Note that the signal processing circuit 200 may be built into the light detecting device 300, or may be a structural element of a signal processing device that is electrically connected to the light detecting device 300 in a wired or wireless way.

<Filter Array>

Hereinafter, the filter array 10 according to the present embodiment will be described. The filter array 10 is disposed on the path of light incident from the object, and outputs the incident light while modulating the intensity of the light on each wavelength. This process by the filter array, that is, the encoding element, is referred to as "encoding" in this specification.

Figure 2A:
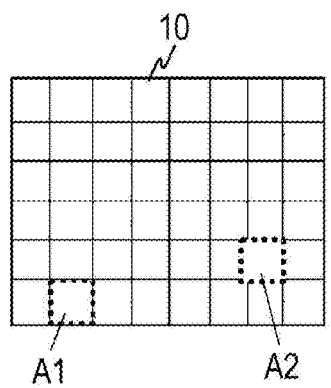
FIG. 2A is a diagram schematically illustrating an example of a filter array according to an exemplary embodiment.

FIG. 2A is a diagram schematically illustrating an example of the filter array 10. The filter array 10 includes filters arranged two-dimensionally. Each filter has an individually set transmission spectrum. The transmission spectrum is expressed as a function $T(\lambda)$, where $\lambda$ is the wavelength of the incident light. The transmission spectrum $T(\lambda)$ may take a value from 0 or greater to 1 or less.

In the example illustrated in FIG. 2A, the filter array 10 includes 48 square filters arranged into 6 rows and 8 columns. The above is merely an example, and more filters may be provided in actual applications. The number may be approximately the same as the number of pixels in the image sensor 60, for example. The number of filters included in the filter array 10 is determined according to the purpose in the range from several dozen to tens of millions of filters, for example.

Figure 2B:
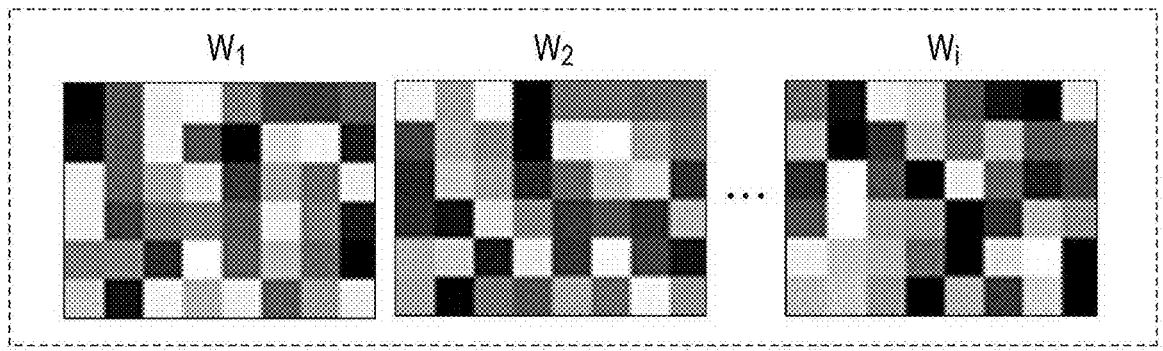
FIG. 2B is a diagram illustrating an example of a spatial distribution of the transmittance of light in each of multiple wavelength bands included in a target wavelength band.

FIG. 2B is a diagram illustrating an example of a spatial distribution of the transmittance of light in each of wavelength bands $W_1$, $W_2$, ..., $W_i$ included in the target wavelength band. In the example illustrated in FIG. 2B, differences in the transmittance are expressed as differences in the shading of each filter. The more lightly shaded a filter is, the higher the transmittance is, and the more darkly shaded a filter is, the lower the transmittance is. As illustrated in FIG. 2B, the spatial distribution of the light transmittance is different depending on the wavelength band.

Figure 2C:
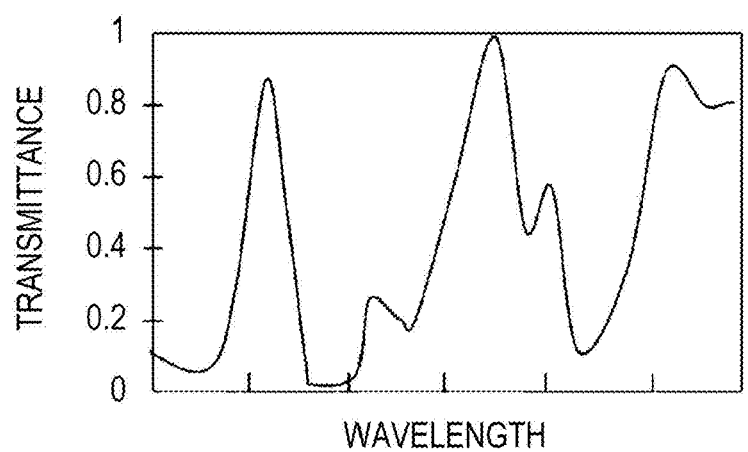
FIG. 2C is a diagram illustrating an example of the transmission spectrum of a filter included in the filter array illustrated in FIG. 2A.
Figure 2D:
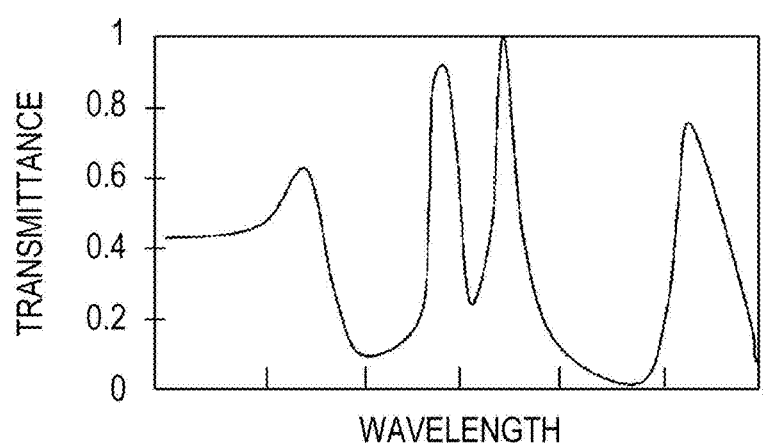
FIG. 2D is a diagram illustrating another example of the transmission spectrum of a filter included in the filter array illustrated in FIG. 2A.

FIGS. 2C and 2D are graphs illustrating examples of the transmission spectra of a filter A1 and a filter A2, respectively, which are included among the filters of the filter array 10 in FIG. 2A. The transmission spectrum of the filter A1 and the transmission spectrum of the filter A2 are different from one another. In this way, the transmission spectrum of the filter array 10 is different depending on the filter. However, it is not strictly necessary for all of the filters to have different transmission spectra. In the filter array 10, at least two or more filters among the multiple filters have mutually different transmission spectra. That is, the filter array 10 includes two or more filters having transmission spectra that are different from each other. In one example, the number of patterns of transmission spectra of the filters included in the filter array 10 may be equal to or greater than the number i of wavelength bands included in the target wavelength band. The filter array 10 may also be designed such that at least half of the filters have different transmission spectra.

Figure 3A:
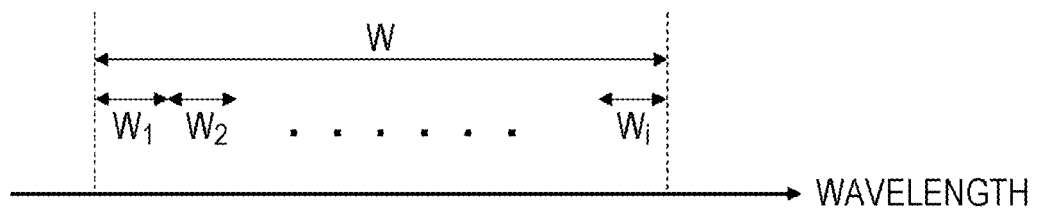
FIG. 3A is a diagram for explaining an example of the relationship between a target wavelength band and wavelength bands included therein.
Figure 3B:
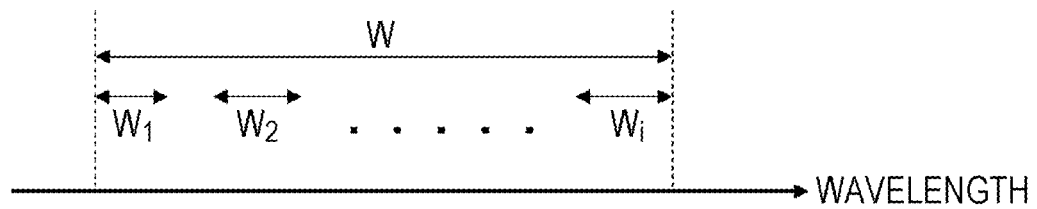
FIG. 3B is a diagram for explaining another example of the relationship between a target wavelength band and wavelength bands included therein.

FIGS. 3A and 3B are diagrams for explaining the relationship between a target wavelength band W and wavelength bands $W_1$, $W_2$, ..., $W_i$ included therein. The target wavelength band W may be set to various ranges depending on the purpose. The target wavelength band W may be the visible light wavelength band from approximately 400 nm to approximately 700 nm, the near-infrared wavelength band from approximately 700 nm to approximately 2500 nm, or the near-ultraviolet wavelength band from approximately 10 nm to approximately 400 nm, for example. Otherwise, the target wavelength band W may also be mid-infrared, far-infrared, terahertz waves, or a radio wave band such as millimeter waves. In this way, the wavelength band to be used is not necessarily the visible light band. In this specification, the term "light" is used out of convenience to refer to not only visible light but also non-visible light such as near-ultraviolet rays, near-infrared rays, and radio waves.

In the example illustrated in FIG. 3A, the target wavelength band W is subdivided into i equal segments designated the wavelength band $W_1$, wavelength band $W_2$, ..., wavelength band $W_i$, where i is any integer equal to or greater than 4. However, the configuration is not limited to such an example. The wavelength bands included in the target wavelength band W may be set in any way. For example, the bandwidths may be nonuniform depending on the wavelength band. There may also be gaps between adjacent wavelength bands. In the example illustrated in FIG. 3B, the bandwidth is different depending on the wavelength band, and there is a gap between two adjacent wavelength bands. In this way, the wavelength bands may be determined in any way insofar as the wavelength bands are different from each other. The number of wavelength divisions i may also be three or less.

Figure 4A:
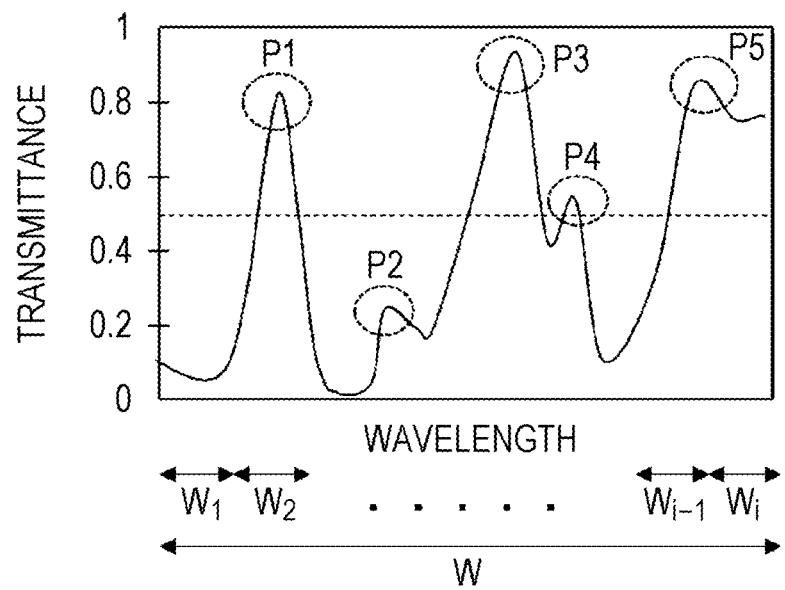
FIG. 4A is a diagram for explaining the properties of the transmission spectrum of a filter in a filter array.

FIG. 4A is a diagram for explaining the properties of the transmission spectrum of a filter in the filter array 10. In the example illustrated in FIG. 4A, the transmission spectrum has maxima P1 to P5 and minima in relation to the wavelength within the target wavelength band W. In the example illustrated in FIG. 4A, the transmittance within the target wavelength band W is normalized to a maximum of 1 and a minimum of 0. In the example illustrated in FIG. 4A, the transmission spectrum has maxima in wavelength bands such as the wavelength band $W_2$ and the wavelength band $W_{i-1}$. In this way, in the present embodiment, the transmission spectrum of each filter has maxima in at least two wavelength bands among the wavelength bands $W_1$ to $W_i$. As FIG. 4A demonstrates, the maximum P1, the maximum P3, the maximum P4, and the maximum P5 are 0.5 or greater.

As above, the light transmittance of each filter is different depending on the wavelength. Consequently, the filter array 10 transmits more of the component of the incident light in certain wavelength bands and less of the component in other wavelength bands. For example, the transmittance may be greater than 0.5 for the light in k wavelength bands among the i wavelength bands, while the transmittance may be less than 0.5 for the light in the remaining i–k wavelength bands. Here, k is an integer satisfying 2≤k<i. In the hypothetical case where the incident light is white light containing uniform wavelength components across all visible light, the filter array 10 would modulate, through each filter, the incident light into light having strong, discrete peaks with respect to wavelength, and output a superposition of the light at these wavelengths.

Figure 4B:
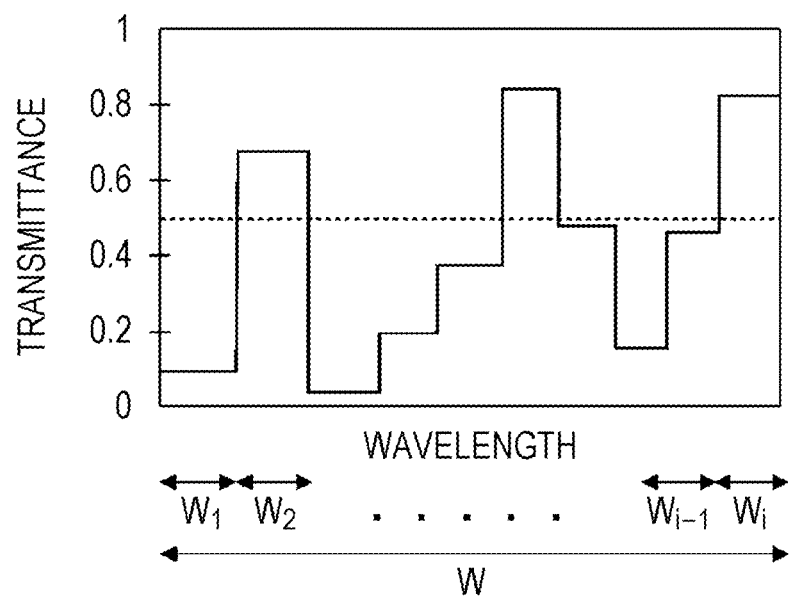
FIG. 4B is a diagram illustrating the result of averaging the transmission spectrum illustrated in FIG. 4A in each wavelength band.

As an example, FIG. 4B is a diagram illustrating the result of averaging the transmission spectrum illustrated in FIG. 4A in each of the wavelength bands $W_1$, $W_2$, . . . , $W_i$. The averaged transmittance is obtained by integrating the transmission spectrum $T(\lambda)$ over each wavelength band and dividing by the bandwidth of the wavelength band. In this specification, the value of the transmittance averaged for each wavelength band in this way is referred to as the transmittance for that wavelength band. In this example, the transmittance peaks higher in the three wavelength bands taking the maxima P1, P3, and P5. In particular, the transmittance exceeds 0.8 in the two wavelength bands taking the maxima P3 and P5.

The resolution of each filter in the wavelength direction of the transmission spectrum may be set to approximately the bandwidth of the desired wavelength band. In other words, among the wavelength ranges containing a maximum in the transmission spectrum curve, the width of a range that takes a value equal to or greater than the average of the maximum and a minimum most closely adjacent to the maximum may be set to approximately the bandwidth of the desired wavelength band. In this case, if the transmission spectrum is resolved into frequency components by applying a Fourier transform, for example, the value of the frequency component corresponding to the wavelength band is increased relatively.

Typically, the filter array 10 has filters subdivided into a grid, as illustrated in FIG. 2A. Some or all of the filters have mutually different transmission spectra. The wavelength distribution and spatial distribution of the light transmittance of the filters included in the filter array 10 may be random distributions or quasi-random distributions, for example.

The line of thinking regarding random distributions and quasi-random distributions is as follows. First, each filter in the filter array 10 can be thought of as a vector element having a value from 0 to 1, for example, depending on the light transmittance. When the transmittance is 0, the value of the vector element is 0, and when the transmittance is 1, the value of the vector element is 1. In other words, a set of filters lined up in the row or column direction can be thought of as a multidimensional vector having a value from 0 to 1. Consequently, the filter array 10 may be considered to include multiple multidimensional vectors in the column or row direction. Here, a random distribution means that any two multidimensional vectors are independent, that is, not parallel. Also, a quasi-random distribution means a configuration in which some of the multidimensional vectors are not independent from each other. Consequently, in random distributions and quasi-random distributions, a vector whose elements are the values of the transmittance of light in a first wavelength band in each filter belonging to a set of filters lined up in a single row or column among the filters and a vector whose elements are the values of the transmittance of light in the first wavelength band in each filter belonging to a set of filters lined up in another row or column are independent from one another. Similarly, for a second wavelength band different from the first wavelength band, a vector whose elements are the values of the transmittance of light in the second wavelength band in each filter belonging to a set of filters lined up in a single row or column among the filters and a vector whose elements are the values of the transmittance of light in the second wavelength band in each filter belonging to a set of filters lined up in another row or column are independent from one another.

In the case where the filter array 10 is disposed close to the image sensor 60, the pitch of the filters included in the filter array 10 may be substantially matched to the pixel pitch of the image sensor 60. With this configuration, the resolution of the encoded image of light emitted from the filter array 10 is substantially the same as the resolution of the pixels. By causing the light passing through each cell to be incident on a corresponding pixel, the computations described later can be simplified. In the case where the filter array 10 is disposed farther away from the image sensor 60, the cell pitch may be reduced according to the distance.

In the examples illustrated in FIGS. 2A to 2D, the filter array 10 has a grayscale transmittance distribution in which the transmittance of each filter may take any value equal to or greater than 0 and less than or equal to 1. However, a grayscale transmittance distribution is not strictly necessary. For example, a binary scale transmittance distribution may be adopted, in which the transmittance of each filter may take a value of either substantially 0 or substantially 1. In a binary scale transmittance distribution, each filter transmits the majority of light in at least two of the wavelength bands included in the target wavelength band, and does not transmit the majority of light in the remaining wavelength bands. Here, the "majority" refers to roughly 80% or more.

Some of the filters, such as half of the filters, for example, may also be replaced with transparent filters. Such transparent filters transmit light in all of the wavelength bands W1 to Wi included in the target wavelength band at a high transmittance. The high transmittance is 0.8 or higher, for example. In such a configuration, the transparent filters may be arranged in a checkerboard pattern, for example. That is, in the two arrangement directions of the filters in the filter array 10, filters having a wavelength-dependent light transmittance and transparent filters may be arranged in alternation. In the example illustrated in FIG. 2A, the two arrangement directions are the horizontal and vertical directions.

Data indicating such a spatial distribution of the spectral transmittance of the filter array 10 is acquired in advance on the basis of design data or measured calibration, and stored in a storage medium provided in the signal processing circuit 200. The data is used in the computational processing described later.

The filter array 10 may be configured using fine structures containing multilayer films, organic materials, diffraction gratings, or metals. In the case where multilayer films are used in the configuration, dielectric multilayer films or multilayer films containing a metal layer may be used. In this case, the multilayer films may be formed such that at least one of the thickness, the material, or the layering order of each multilayer film is different for each cell. With this arrangement, cell-dependent spectral characteristics can be achieved. By using multilayer films, sharp rises and falls in the spectral transmittance can be achieved. A configuration using organic materials may be achieved by varying the pigment or dye depending on the cell, or by layering different types of materials. A configuration using diffraction gratings may be achieved by providing diffraction structures with different diffraction pitches or depths for each cell. A fine structure containing metals can be created by utilizing spectroscopy arising from plasmonic effects.

<Signal Processing Circuit>

Next, a method by which the signal processing circuit 200 reconstructs the multi-wavelength isolated images 220 will be described. Here, multi-wavelength means more wavelength bands than the wavelength bands of the three colors RGB acquired by a conventional color camera, for example; in other words, four or more wavelength bands. The number of wavelength bands may be a number approximately from 4 to 100, for example. The number of wavelength bands is also referred to as the "number of spectral bands". Depending on the purpose, the number of spectral bands may exceed 100.

The isolated images 220 are the data to be obtained, and this data is designated f. Provided that w is the number of spectral bands, f is the data obtained by combining the image data $f_1, f_2, \ldots, f_w$ of each band. Herein, as illustrated in FIG. 1, the horizontal direction of an image is taken to be the x direction and the vertical direction of an image is taken to be the y direction. Provided that n is the number of pixels in the x direction and m is the number of pixels in the y direction of the image to be obtained, each of the data $f_1, f_2, \ldots, f_w$ is two-dimensional data containing n×m pixels. Consequently, the data f is three-dimensional data containing n×m×w elements. On the other hand, there are n×m elements in data g of image data 120 acquired by the encoding and multiplexing performed by the filter array 10. The data g can be expressed by the following expression (1).

$$g = Hf = H \begin{bmatrix} f_1 \\ f_2 \\ \vdots \\ f_w \end{bmatrix} \quad (1)$$

Here, $f_1, f_2, \ldots, f_w$ are data including n×m elements. Consequently, the vector on the right-hand side is, strictly speaking, a one-dimensional vector with n×m×w rows and one column. The vector g is expressed and calculated by being converted into a one-dimensional vector with n×m rows and one column. The matrix H represents a transform that encodes and intensity-modulates each component $f_1, f_2, \ldots, f_w$ of the vector f according to encoding information that is different for each wavelength band, and then adds together the modulated components. Consequently, H is a matrix with n×m rows and n×m×w columns.

Given the vector g and the matrix H, it appears possible to calculate f by solving the inverse problem of expression (1). However, since the elements n×m×w in the data f to be obtained are more numerous than the elements n×m in the acquired data g, the above problem is an ill-posed problem and cannot be solved as-is. Accordingly, the signal processing circuit 200 uses redundancy in the images included in the data f to find a solution using compressed sensing. Specifically, the data f to be obtained is estimated by solving the following expression (2).

$$f' = \arg\min \left\{ \|g - Hf\|_{l_2} + \tau \Phi(f) \right\} \quad (2)$$

Here, f' represents the estimated data of f. The first term inside the curly brackets in the above expression represents the discrepancy between the estimation result Hf and the acquired data g, also referred to as the residual error. Here, the sum of squares is treated as the residual error, but a value such as the absolute value or the square root of the sum of squares may also be treated as the residual error. The second term inside the curly brackets is a regularization term or stabilization term described later. Expression (2) means that the f that minimizes the sum of the first term and the second term is obtained. The signal processing circuit 200 can converge on a solution by recursive iterative operations, and calculate a final solution f'.

The first term inside the curly brackets in expression (2) means an operation of calculating the sum of squares of the difference between the acquired data g and Hf obtained by the system transformation of the provisionally estimated f by the matrix H. In the second term, φ(f) is a constraint condition for regularization, and is a function reflecting information about the sparsity of the estimated data. The function works to smooth out or stabilize the estimated data. The regularization term may be expressed by, for example, the discrete cosine transform (DCT), the wavelet transform, the Fourier transform, or the total variation (TV) of f. For example, in the case of using the total variation, stable inference data can be acquired in which the influence of noise in the observed data g is suppressed. The sparsity of the object 70 in the space of each regularization term is different depending on the texture of the object 70. The regularization term may also be chosen such that the texture of the object 70 is sparser in the space of the regularization term. Alternatively, multiple regularization terms may be included in the calculation. Also, τ is a weighting factor. The larger the weighting factor τ is, the more redundant data is removed, and the compression ratio rises. The smaller the weighting factor τ is, the weaker is the convergence on a solution. The weighting factor τ is set to a suitable value such that f converges to some degree and is also not over-compressed.

Note that although an example of operations using the compressed sensing indicated in expression (2) is illustrated here, a solution may also be found using another method. For example, another statistical method such as maximum likelihood estimation or Bayesian estimation can be used. Also, there may be any number of isolated images 220, and the wavelength bands may be set in any way. Details regarding a reconfiguration method are disclosed in U.S. Pat. No. 9,599,511, the entire disclosure of which is incorporated herein by reference.

<Filter Array Including Fabry-Pérot Filter>

Figure 5A:
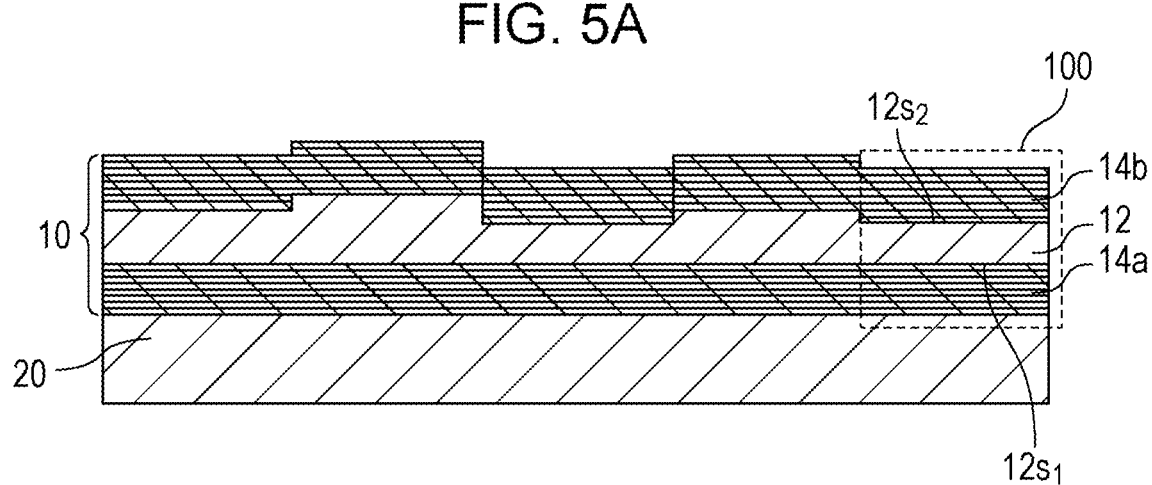
FIG. 5A is a cross section schematically illustrating a first example of a filter array according to an embodiment of the present disclosure.
Figure 5B:
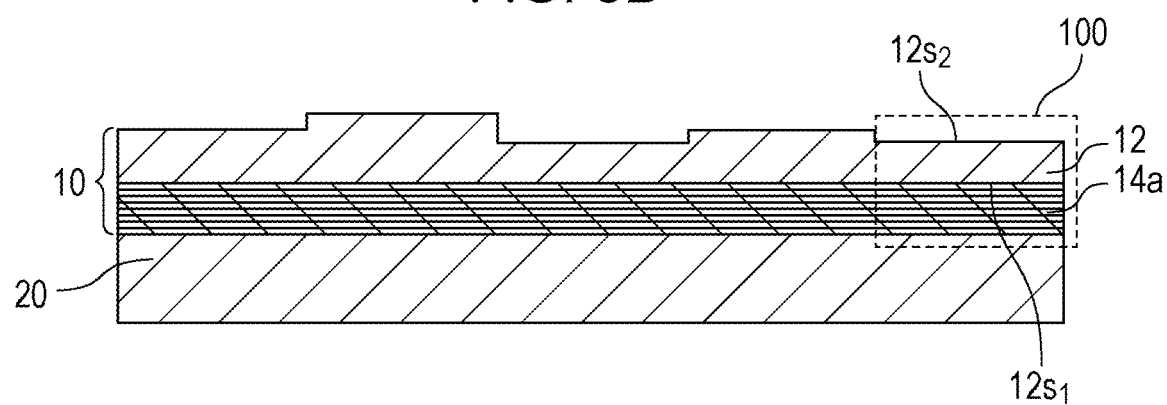
FIG. 5B is a cross section schematically illustrating a second example of a filter array according to an embodiment of the present disclosure.
Figure 5C:
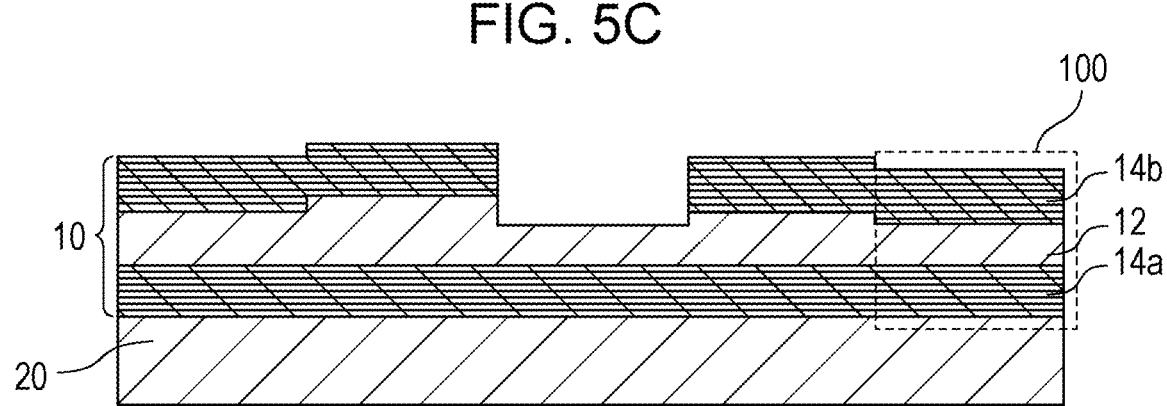
FIG. 5C is a cross section schematically illustrating a third example of a filter array according to an embodiment of the present disclosure.

Next, FIGS. 5A to 5C will be referenced to describe examples of the specific structure of the filter array 10 according to an embodiment of the present disclosure. FIG. 5A to FIG. 5C are cross sections schematically illustrating first to third examples, respectively, of the filter array 10 according to an embodiment of the present disclosure. In the cross sections, five filters 100 included in a single row are illustrated for simplicity. In the examples illustrated in FIGS. 5A to 5C, the filter array 10 is supported by a substrate 20. As illustrated in FIG. 2A, the filter array 10 includes the filters 100 arranged two-dimensionally in a square grid. In the first example illustrated in FIG. 5A to the third example illustrated in FIG. 5C, all of the filters 100 included in the filter array 10 are provided with a resonance structure. A resonance structure means a structure which light of a certain wavelength forms standing waves and exists stably inside the structure.

In the first example illustrated in FIG. 5A, a first reflection layer 14a, an interference layer 12, and a second reflection layer 14b are layered in the above order on the substrate 20. Each resonance structure illustrated in FIG. 5A includes: the interference layer 12 having a first surface $12s_1$ and a second surface $12s_2$ positioned on opposite sides of each other; the first reflection layer 14a provided on the first surface $12s_1$; and the second reflection layer 14b provided on the second surface $12s_2$. The reflectance for light in the target wavelength band W at each of the first surface $12s_1$ and the second surface $12s_2$ may be 80% or higher, for example. The reflectance may be lower than 80%, but may be designed to be equal to or greater than 40%. The first reflection layer 14a and the second reflection layer 14b may be designed to be of equal thickness. The filters 100 having interference layers 12 of mutually different thicknesses exhibit mutually transmission spectra in the target wavelength band W. The transmission spectrum of each resonance structure illustrated in FIG. 5A has two or more sharp peaks in the target wavelength band W, as described later.

In the first example illustrated in FIG. 5A, each of the first reflection layer 14a and the second reflection layer 14b is formed from a distributed Bragg reflector (DBR) in which highly refractive layers and lowly refractive layers are layered in alternation. Each of the first reflection layer 14a and the second reflection layer 14b may also be formed from a metal thin film.

A DBR includes one or more pairs of a highly refractive layer and a lowly refractive layer having different refractive indices. The refractive index of the highly refractive layer is higher than the refractive index of the lowly refractive layer. A DBR has a wavelength band with a high reflectance due to Bragg reflection caused by the periodic layered structure. The wavelength band is referred to as the stopband. As the number of pair layers described above increases, the reflectance of the stop-band approaches 100%.

Let $\lambda$ be a wavelength in the target wavelength band W, let $n_H$ be the refractive index of the highly refractive layer, and let $n_L$ be the refractive index of the lowly refractive layer. A DBR including one or more pairs of a highly refractive layer with a thickness of $\lambda/(4n_H)$ and a lowly refractive layer with a thickness of $\lambda/(4n_L)$ as pair layers efficiently reflects light on the wavelength $\lambda$. If the target wavelength band W is the range equal to or greater than a wavelength $\lambda_i$ and less than or equal to a wavelength $\lambda_f$, by gradually changing the thickness of the highly refractive layers and the lowly refractive layers, the DBR can include pair layers from a pair layer corresponding to the wavelength $\lambda_i$ to a pair layer corresponding to the wavelength $\lambda_f$. As a result, the DBR can efficiently reflect all light in the target wavelength band W.

The highly refractive layers and the lowly refractive layers included in each of the first reflection layer 14a and the second reflection layer 14b, and the interference layer 12, may be formed from a material with a low absorptance with respect to light in the target wavelength band W, for example. In the case where the target wavelength band W is in the visible light region, such a material may be at least one selected from the group consisting of $SiO_2$, $Al_2O_3$, $SiO_xN_y$, $Si_3N_4$, $Ta_2O_5$, and $TiO_2$, for example. In the case where the target wavelength band W is in the infrared region, such a material may be at least one selected from the group consisting of $SiO_2$, $Al_2O_3$, $SiO_xN_y$, $Si_3N_4$, $Ta_2O_5$, and $TiO_2$ above in addition to single-crystal Si, polycrystalline Si, and amorphous Si, for example. Similarly, the substrate 20 may be formed from a material with a low absorptance with respect to light in the target wavelength band W, for example. In the case where the target wavelength band W is in the visible light region, such a material may be at least one selected from the group consisting of $SiO_2$, ITO, $Al_2O_3$, GaN, $Nb_2O_5$, $Ta_2O_5$, and SiC. In the case where the target wavelength band W is in the infrared region, such a material may be at least one selected from the group consisting of $SiO_2$, ITO, $Al_2O_3$, GaN, $Nb_2O_5$, $Ta_2O_5$, and SiC above in addition to single-crystal Si, polycrystalline Si, amorphous Si, and InP, for example. The thickness of each of the first reflection layer 14a and the second reflection layer 14b may be equal to or greater than 100 nm and less than or equal to 900 nm, for example. The thickness of the interference layer 12 may be equal to or greater than 10 nm and less than or equal to 500 nm, for example. The thickness of the substrate 20 may be equal to or greater than 0.1 mm and less than or equal to 1 mm, for example.

In the second example illustrated in FIG. 5B, a first reflection layer 14a and an interference layer 12 are layered in the above order on the substrate 20. Each resonance structure illustrated in FIG. 5B includes: the interference layer 12; and the first reflection layer 14a provided on the first surface $12s_1$. The second example illustrated in FIG. 5B differs from the first example illustrated in FIG. 5A in that the second reflection layer 14b is not provided on the second surface $12s_2$. The transmission spectrum of each resonance structure illustrated in FIG. 5B has two or more wide peaks in the target wavelength band W, as described later.

In the example illustrated in FIG. 5B, the second surface $12s_2$ is exposed to the outside and in contact with air. A transparent layer be additionally layered on the second surface $12s_2$ of the interference layer 12. The reflectance for light in the target wavelength band W at the first surface $12s_1$ (hereinafter referred to as the "first reflectance") may be 80% or higher, for example. The first reflectance may be lower than 80%, but may be designed to be equal to or greater than 40%. The reflectance for light in the target wavelength band W at the second surface $12s_2$ (hereinafter referred to as the "second reflectance") is lower than the first reflectance and may be equal to or greater than 1% and less than 30%, for example. A fixed difference equal to or greater than 10% exists between the first reflectance and the second reflectance.

In this specification, the resonance structure illustrated in FIG. 5A is referred to as a "double-sided DBR structure" and the resonance structure illustrated in FIG. 5B is referred to as a "single-sided DBR structure". In this specification, in the double-sided DBR structure and the single-sided DBR structure, light inside the interference layer 12 is assumed to be reflected by the first surface $12s_1$ and the second surface $12s_2$ unless the exact location of the surface that reflects light is relevant. In the present embodiment, a portion of the light incident on the first reflection layer 14a or the second reflection layer 14b from the interference layer 12 actually infiltrates the first reflection layer 14a or the second reflection layer 14b and is reflected at the interfaces between the highly refractive layers and the lowly refractive layers. The interface at which the light is reflected is different depending on the wavelength. However, for convenience, this light is treated as being reflected at the first surface $12s_1$ and the second surface $12s_2$.

In the third example illustrated in FIG. 5C, a subset of the filters 100 has a double-sided DBR structure and another subset of the filters 100 has a single-sided DBR structure. The ratio of the single-sided DBR structure to the entire DBR structure included in the filter array 10 may be equal to or greater than 10% and less than or equal to 90%, for example. The ratio of the single-sided DBR structure may be smaller than the ratio of the double-sided DBR structure, equal to the ratio of the double-sided DBR structure, or larger than the ratio of the double-sided DBR structure. The arrangement of the double-sided DBR structure and the single-sided DBR structure may be regular or irregular. By mixing together the double-sided DBR structure and the single-sided DBR structure, the randomness of the transmission spectra of the filters 100 included in the filter array 10 can be improved. As a result, more accurate isolated images 220 can be obtained.

Figure 6:
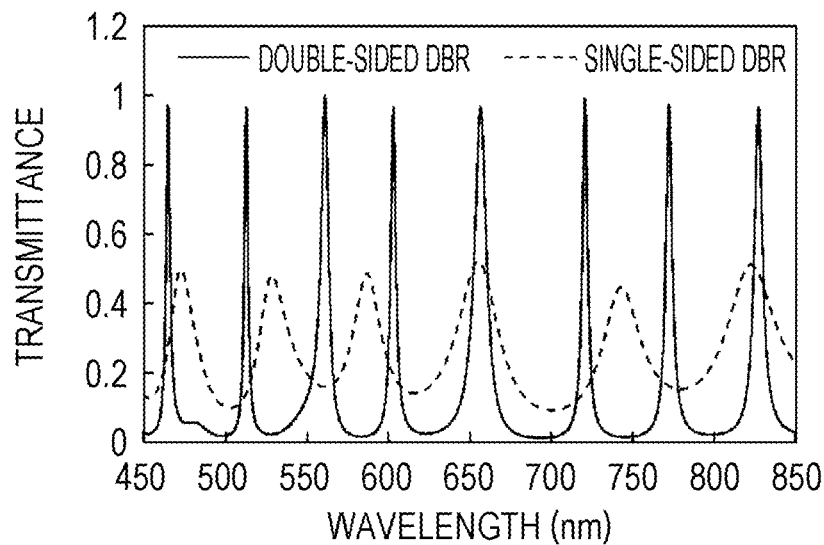
FIG. 6 is a diagram illustrating an example of transmission spectra of light in a double-sided DBR structure and a single-sided DBR structure when light is incident perpendicularly.

Next, FIG. 6 will be referenced to describe an example of the transmission spectra of the filters 100. FIG. 6 is a diagram illustrating an example of transmission spectra of light in a double-sided DBR structure and a single-sided DBR structure when light is incident perpendicularly. In the example illustrated in FIG. 6, the target wavelength band W is equal to or greater than 450 nm and less than or equal to 850 nm. The solid line illustrated in FIG. 6 represents the transmission spectrum of the double-sided DBR structure and the dashed line illustrated in FIG. 6 represents the transmission spectrum of the single-sided DBR structure. As illustrated in FIG. 6, the transmission spectra of the double-sided DBR structure and the single-sided DBR structure have transmittance maxima at each of two or more wavelengths in the target wavelength band W. In this specification, a filter having such transmission spectra is referred to as a "multi-mode filter". The wavelengths on which the transmittance maxima are exhibited are shifted to shorter wavelengths if the interference layer 12 is thinner and shifted to longer wavelengths if the interference layer 12 is thicker.

The characteristics of the double-sided DBR structure and the single-sided DBR structure are different in the following respects. In the transmission spectrum of the double-sided DBR structure, each peak is sharp, with the maximum transmittance being approximately 1.0 and the minimum transmittance being approximately 0.02. In contrast, in the transmission spectrum of the single-sided DBR structure, each peak is wide, with the maximum transmittance being approximately 0.5 and the minimum transmittance being approximately 0.1. In the single-sided DBR structure, the baseline of the transmittance rises compared to the double-sided DBR structure. In the example illustrated in FIG. 6, the average transmittance of the single-sided DBR structure in the target wavelength band W is approximately 26%, and the average transmittance of the double-sided DBR structure in the target wavelength band W is approximately 14%. In the single-sided DBR structure, the average transmittance is approximately twice that of the double-sided DBR structure. In this way, the single-sided DBR structure can suppress light intensity loss during imaging.

In the filter array 10 according to the present embodiment, multiple types of multi-mode filters having mutually different transmission spectra in the target wavelength band W may be arranged irregularly. An irregular arrangement refers to an arrangement that does not exhibit clear regularity or periodicity, and is also an aperiodic arrangement. An aperiodic arrangement may be an arrangement in accordance with the line of thinking regarding a random distribution or a quasi-random distribution described above, for example. In one example, the filter array 10 includes millions of filters 100 arranged two-dimensionally, and the millions of filters 100 include nine types of multi-mode filters arranged irregularly. The nine types of multi-mode filters may be arranged with a high degree of randomness. With the filter array 10 having a filter arrangement with such a high degree of randomness, reconstruction error in the isolated images 220 can be reduced. Since the arrangement is irregular, adjacent filters may be the same type of filter in some cases. However, such cases are thought to be rare and therefore are not a big problem.

Note that the filter array 10 according to the present embodiment may also include a filter not having the above resonance structure. For example, the filter array 10 according to the present embodiment may also include a filter that does not have a wavelength-dependent light transmittance, such as a transparent filter or a neutral density (ND) filter.

In this specification, the filters 100 provided with the double-sided DBR structure and/or the single-sided DBR structure are also referred to as "Fabry-Pérot filters". A Fabry-Pérot filter is a type of interference filter. Another type of interference filter can be used instead of a Fabry-Pérot filter, such as a color separation filter formed from a diffraction grating or the like, for example.

<Positional Relationship Between Filter Array and Image Sensor>

Next, FIGS. 7 to 14 will be referenced to describe examples of the positional relationship between the filter array 10 and the image sensor 60. In the examples illustrated in FIG. 7 and subsequent drawings, each of the filter array 10 and the image sensor 60 is described as including 5×5 unit cells arranged two-dimensionally for simplicity. In actuality, however, each of the filter array 10 and the image sensor 60 may include millions of unit cells arranged two-dimensionally, for example. The structures illustrated in the drawings are merely examples, and the number and arrangement of unit cells may be determined in any way.

Figure 7:
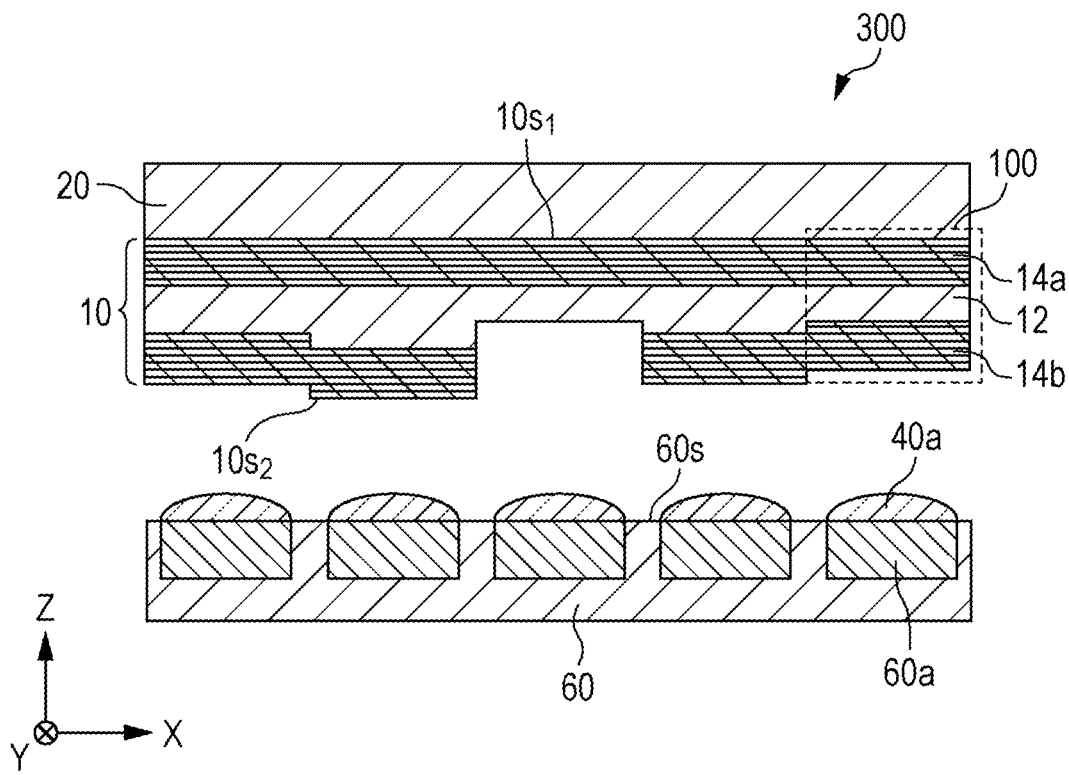
FIG. 7 is a cross section schematically illustrating a first example of a light detecting device according to an embodiment of the present disclosure.

FIG. 7 is a cross section schematically illustrating a first example of the light detecting device 300 according to an embodiment of the present disclosure. The cross section is a cross section of the filter array 10 and the image sensor 60 for a single row. The structure illustrated in FIG. 7 is a partial structure of the light detecting device 300. For convenience, mutually orthogonal axes X, Y, and Z are indicated in FIG. 7. The direction of the X-axis arrow denotes the +X direction and the opposite direction denotes the −X direction. The same is also true of the directions of the Y-axis and Z-axis arrows and their opposite directions. The side in the +Z direction is also referred to as the "top", and the side in the −Z direction is also referred to as the "bottom". These axes do not limit the placement and orientation of the light detecting device 300, and the actual light detecting device 300 may be placed and oriented in any way. The light detecting device 300 according to the present embodiment is provided with the filter array 10, the substrate 20 supporting the filter array 10, and the image sensor 60.

The configuration of the filter array 10 and the substrate 20 illustrated in FIG. 7 is the same as the configuration of the filter array 10 and the substrate 20 illustrated in FIG. 5C, except that the configuration is inverted top to bottom. The configuration illustrated in FIG. 5A or 5B may also be adopted instead of the configuration illustrated in FIG. 5C. The substrate 20 is used in a step for manufacturing the light detecting device 300. The substrate 20 is not strictly necessary, but the substrate 20 is included in the light detecting device 300 in cases where the substrate 20 is not removed in the manufacturing of the light detecting device 300.

The filter array 10 includes the filters 100 arranged two-dimensionally in a square grid in the XY plane. The filters 100 include multiple types of multi-mode filters having mutually different transmission spectra in the target wavelength band W. The thickness of the interference layer 12 is different depending on the transmission spectra of the multi-mode filters. The filters 100 are arranged at equal array pitch in the X and Y directions. The multiple types of multi-mode filters are arranged irregularly in accordance with the line of thinking regarding a random distribution or a quasi-random distribution described above, for example.

The filter array 10 has a light-incident surface $10s_1$ and a light-emitting surface $10s_2$ on the opposite side. The light-incident surface $10s_1$ is formed by the collection of light-incident surfaces of the filters 100. The light-emitting surface $10s_2$ is formed by the collection of light-emitting surfaces of the filters 100. In the example illustrated in FIG. 7, the light-incident surface $10s_1$ is flat. In other words, the light-incident surfaces of the filters 100 form a flat surface with no differences in level. In contrast, the light-emitting surface $10s_2$ is uneven, that is, has differences in level. In other words, the light-emitting surfaces of the filters 100 form an uneven surface. The unevenness is caused by the differences in thickness among the filters 100. The differences in thicknesses among the filters 100 are caused by differences in the thickness of the interference layer or by the presence or absence of the second reflection layer 14b. The substrate 20 is provided on the light-incident surface $10s_1$ of the filter array 10.

The image sensor 60 has a light-detecting surface 60s facing the light-emitting surface $10s_2$ and includes light-detecting elements 60a arranged two-dimensionally in a square grid on the light-detecting surface 60s. The light-detecting surface 60s is flat. The light-detecting elements 60a are sensitive in the target wavelength band W. The light-detecting elements 60a face the filters 100 in a one-to-one correspondence. In the first example illustrated in FIG. 7, the light-detecting elements 60a are arranged at equal array pitch in the X and Y directions. The light-detecting elements 60a may also be arranged at different array pitches in the X and Y directions. The array pitch of the light-detecting elements 60a may be equal to or greater than 1 μm and less than or equal to 10 μm, for example. In the first example illustrated in FIG. 7, the array pitch of the filters 100 is designed to be equal to the array pitch of the light-detecting elements 60a. The light-detecting elements 60a are respectively provided with microlenses 40a directly on top. The microlenses 40a cause light passing through the filters 100 to be incident on the light-detecting elements 60a efficiently. The light-incident surface $10s_1$ and the light-detecting surface 60s are parallel to each other. The light-incident surface $10s_1$ and the light-detecting surface 60s are parallel to each other" does not mean that the surfaces are strictly parallel, but that the angle obtained by the normal direction of the light-incident surface $10s_1$ and the normal direction of the light-detecting surface 60s is less than or equal to 10°. The normal direction of the light-incident surface $10s_1$ is the direction that is perpendicular to the light-incident surface $10s_1$ and going away from the filter array 10. The normal direction of the light-detecting surface 60s is the direction that is perpendicular to the light-detecting surface 60s and going away from the image sensor 60.

Light reflected by the object 70 mainly travels in the −Z direction through the substrate 20, is incident on the light-incident surface $10s_1$ of the filter array 10, passes through the filter array 10, and is emitted from the light-emitting surface $10s_2$ of the filter array 10. The light emitted from the light-emitting surface $10s_2$ of the filter array 10 is incident on the light-detecting surface 60s of the image sensor 60.

The distance between the light-emitting surface $10s_2$ and the light-detecting surface 60s is different for each multi-mode filter. The light detecting device 300 according to the present embodiment, is manufactured by fixing the structure illustrated in FIG. 5C and the image sensor 60 such that the uneven surface of the filter array 10 faces the light-detecting surface 60s. Since the distance between the light-emitting surface $10s_2$ and the light-detecting surface 60s is nonuniform, even if multiple reflections of the light occur between the light-emitting surface $10s_2$ and the light-detecting surface 60s, the appearance of a fringe pattern in the captured image due to light interference can be suppressed. Consequently, the imaging characteristics of the light detecting device 300 can be improved. The irregular arrangement of multiple types of multi-mode filters can not only reduce the reconstruction error in the isolated images 220 but also further suppress the appearance of a fringe pattern in the captured image.

Furthermore, in the present embodiment, by arranging not the substrate 20 but the second reflection layer 14b to face the light-detecting surface 60s of the image sensor 60, the filter array 10 and the image sensor 60 can be brought close together. The distance between the portion of the light-emitting surface $10s_2$ closest to the light-detecting surface 60s and the light-detecting surface 60s (hereinafter also referred to as the "minimum distance $d_m$") may be equal to or greater than 0.1 μm and less than or equal to 200 μm, for example. In the present embodiment, the f-number of the optical system 40 illustrated in FIG. 1 may be less than or equal to 16, and the array pitch of the light-detecting elements 60a may be approximately 6 μm. In this case, the depth of focus is approximately 200 μm, and therefore if the minimum distance between the light-emitting surface $10s_2$ and the light-detecting surface 60s is within the above range, the majority of the light passing through each of the filters 100 can be made to be incident on the region of the light-detecting surface 60s positioned directly below each of the filters 100. In the first example illustrated in FIG. 7, a single light-detecting element 60a is positioned in this region.

Light interference may occur between the light-emitting surface $10s_2$ and the light-detecting surface 60s, depending on the distance between the two. Due to the impact of this interference, there is a possibility that the spectrum of the light detected by the light-detecting element $60a$ and the transmission spectrum of the multi-mode filter may be misaligned. The interference that could occur at this point depends on the distance d between the light-emitting surface $10s_2$ and the light-detecting surface $60s$. If the round-trip distance 2d between the light-emitting surface $10s_2$ and the light-detecting surface $60s$ is an integer multiple of the wavelength $\lambda$, that is, if the distance $d=m_1\lambda/2$, the light is intensified by the interference, and as a result, the transmittance reaches a maximum at the wavelength $\lambda=2d/m_1$. Here, $m_1$ is an integer equal to or greater than 1. In contrast, if the round-trip distance 2d between the light-emitting surface $10s_2$ and the light-detecting surface $60s$ is a half-integer multiple of the wavelength $\lambda$, that is, if the distance $d=(m_2+½)\lambda/2$, the light is weakened by the interference, and as a result, the transmittance reaches a minimum at the wavelength $\lambda=2d/(m_2+½)$. Here, $m_2$ is an integer equal to or greater than 0. The maximum wavelength at which the transmittance goes to a minimum due to interference is the case where $m_2=0$, that is, when $\lambda=4d$. In this specification, the interference that occurs at the distance $d=\lambda/4$ is referred to as the "fundamental mode interference".

Figure 8:
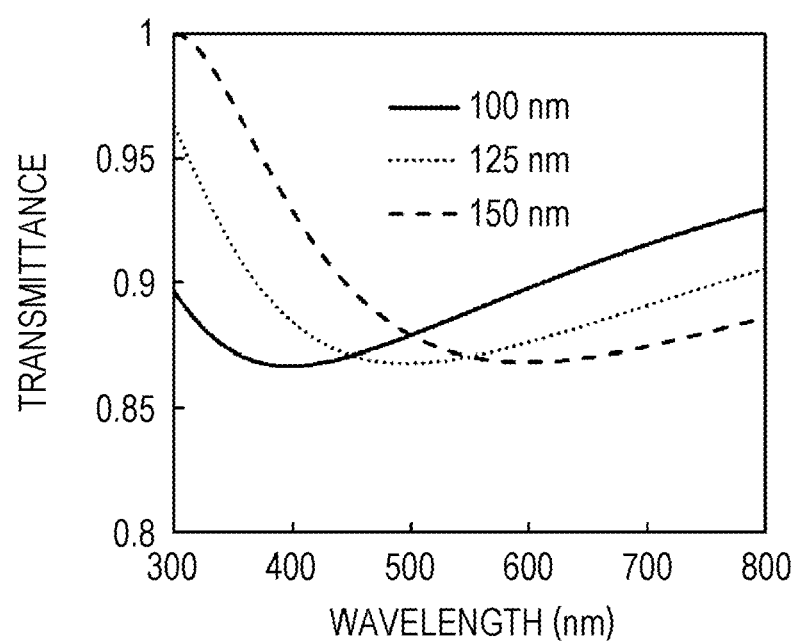
FIG. 8 is a graph illustrating a transmission spectrum of a configuration provided with two media having the same refractive index and a gap layer of air positioned between the media.

FIG. 8 is a graph illustrating a transmission spectrum of a configuration provided with two media having the same refractive index and a gap layer of air positioned between the media. The solid line, dotted line, and dashed line illustrated in FIG. 8 indicate the cases where the thickness d of the gap layer is 100 nm, 125 nm, and 150 nm, respectively. The two media are $SiO_2$, and the refractive index of each is n=1.5. As illustrated in FIG. 8, at the distance d=100 nm, fundamental mode interference occurs for light on the wavelength $\lambda=400$ nm, and the transmittance goes to a minimum near the wavelength $\lambda=400$ nm. Similarly, at the distance d=125 nm, the transmittance goes to a minimum near the wavelength $\lambda=500$ nm, and at the distance d=150 nm, the transmittance goes to a minimum near the wavelength $\lambda=600$ nm. As illustrated in FIG. 8, if the wavelength is longer than the wavelength for which the fundamental mode interference occurs, the transmittance gently increases, whereas if the wavelength is shorter than the wavelength for which the fundamental mode interference occurs, the transmittance increases sharply toward a maximum.

The light-detecting element of each pixel detects light in which the transmission spectrum of the multi-mode filter is tinged by the above interference. That is, there is a possibility that the spectrum of the light detected in each pixel and the transmission spectrum of the multi-mode filter may differ greatly. As a result, there is a possibility of lowered imaging characteristics, such as increased reconstruction error in the isolated images 220.

Assume that the target wavelength band is the wavelength band of visible light, that is, equal to or greater than approximately 400 nm and less than or equal to approximately 700 nm. If the minimum distance $d_m$ is less than or equal to 0.1 µm, there is a possibility that the transmittance will be lower due to the impact of interference over the entire target wavelength band. If the minimum distance $d_m$ is greater than 0.1 µm, that is, if a pixel with a distance $d_m$ less than or equal to 0.1 µm does not exist, the impact of the interference near the 400 nm wavelength can be reduced in the target wavelength band. Consequently, the imaging characteristics can be improved over the case where the minimum distance $d_m$ is less than or equal to 0.1 µm.

Similarly, if the minimum distance $d_m$ is greater than 0.125 µm, the impact of interference in the wavelength band equal to or greater than 400 nm and less than or equal to 500 nm within the target wavelength band can be reduced, making it possible to improve the imaging characteristics further. Similarly, if the minimum distance $d_m$ is greater than 0.150 µm, the impact of interference in the wavelength band equal to or greater than 400 nm and less than or equal to 600 nm within the target wavelength band can be reduced, making it possible to improve the imaging characteristics even further.

Generalizing the above, if the target wavelength band is $\lambda_1 \le \lambda \le \lambda_2$, the imaging characteristics can be improved by setting the minimum distance $d_m$ greater than $\lambda_1/4$. The imaging characteristics can be improved further by setting the minimum distance $d_m$ greater than $\lambda_2/4$.

As the minimum distance $d_m$ is increased, the transmittance illustrated in FIG. 8 oscillates on a shorter period as the wavelength changes in the target wavelength band due to the impact of interference. If the range of oscillation is sufficiently smaller than each wavelength band $W_i$ included in the target wavelength band illustrated in FIG. 3A, for example, the short-period oscillations are averaged together and canceled out in each wavelength band $W_i$, and therefore the isolated images 220 are substantially unaffected by the interference and the imaging characteristics can be improved further.

The lower-bound wavelength $\lambda_1$ and the upper-bound wavelength $\lambda_2$ of the target wavelength band may be the lower-bound wavelength and the upper-bound wavelength, respectively, of the wavelength component included in the isolated images 220. Alternatively, the lower-bound wavelength $\lambda_1$ and the upper-bound wavelength $\lambda_2$ of the target wavelength band may be the lower-bound wavelength and the upper-bound wavelength, respectively, of the light detectable by the image sensor 60 in the light detecting device 300. Alternatively, the lower-bound wavelength $\lambda_1$ and the upper-bound wavelength $\lambda_2$ of the target wavelength band may be the lower-bound wavelength and the upper-bound wavelength, respectively, of the light incident on the image sensor 60 in the light detecting device 300.

The filter array 10 and the image sensor 60 may have curvature. The substrate 20 supporting the filter array 10 may also have curvature in the same direction as the filter array 10. For example, if the filter array 10 or the image sensor 60 is 10 mm long on one side, a difference of approximately 1 µm in the Z direction between the central and edge portions may be created by curvature. The filter array 10 and the image sensor 60 may have curvature bowing in the same direction. That is, the filter array 10 and the image sensor 60 may both be curved upward or curved downward. Alternatively, the filter array 10 and the image sensor 60 may also have curvature bowing in opposite directions. That is, one of the filter array 10 or the image sensor 60 may be curved upward while the other is curved downward. In particular, if the filter array 10 and the image sensor 60 have curvature bowing in opposite directions, the distance between the light-emitting surface $10s_2$ and the light-detecting surface $60s$ is more nonuniform, and thus the appearance of a fringe pattern in the captured image can be suppressed further. Note that in this specification, when it is said that "the light-incident surface $10s_1$ and the light-detecting surface $60s$ are flat", any curvature of the filter array 10 and the image sensor 60 is ignored.

Figure 9A:
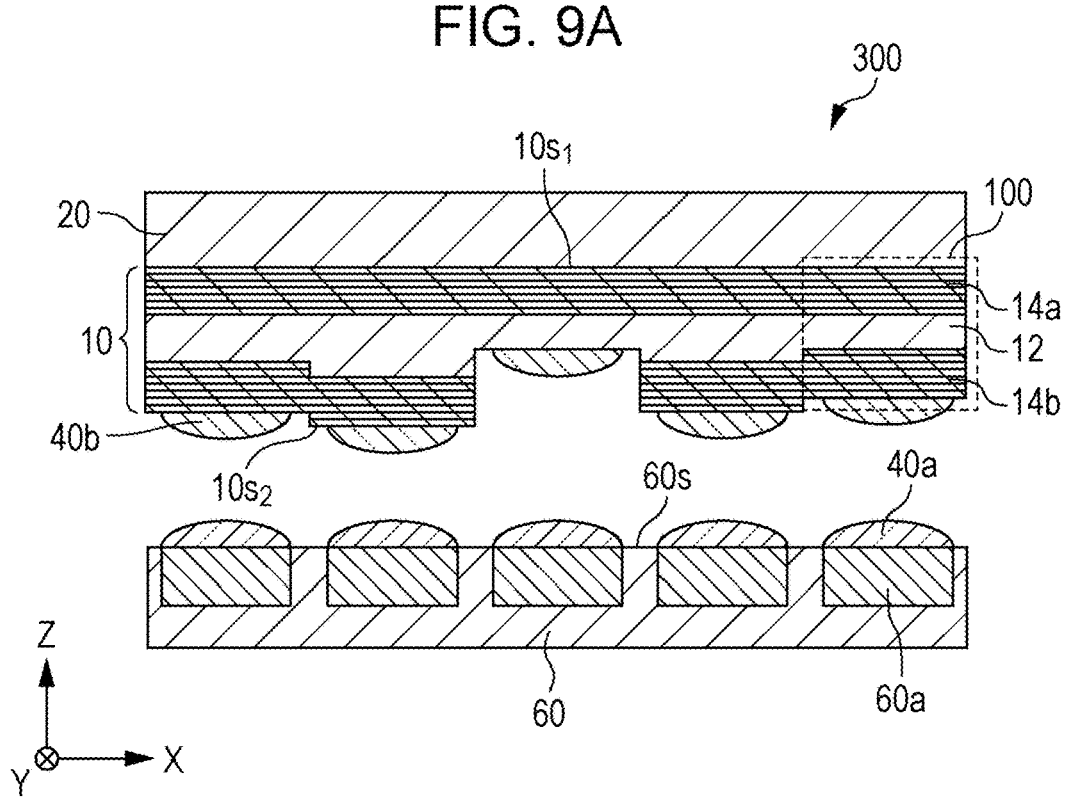
FIG. 9A is a diagram schematically illustrating a modification of the light detecting device illustrated in FIG. 7.

As a modification of the light detecting device 300 illustrated in FIG. 7, microlenses may also be disposed in a one-to-one correspondence on the light-emitting surfaces of the filters 100 in the filter array 10. FIG. 9A is a diagram schematically illustrating a modification of the light detecting device 300 illustrated in FIG. 7. The light detecting device 300 illustrated in FIG. 9A differs from the light detecting device 300 illustrated in FIG. 7 in that the filter array 10 is provided with microlenses 40b disposed in a one-to-one correspondence on the light-emitting surfaces of the filters 100. The microlenses 40b disposed on the light-emitting surface $10s_2$ face, in a one-to-one correspondence, the microlenses 40a disposed on the light-detecting surface 60s. With such a configuration, the majority of the light passing through the filters 100 can be condensed or collimated by the microlenses 40b and made to be incident through the microlenses 40a below on the light-detecting elements 60a. By using both the microlenses 40a and the microlenses 40b, the light passing through each of the filters 100 can be made to be incident more efficiently on each of the corresponding light-detecting elements 60a.

Figure 9B:
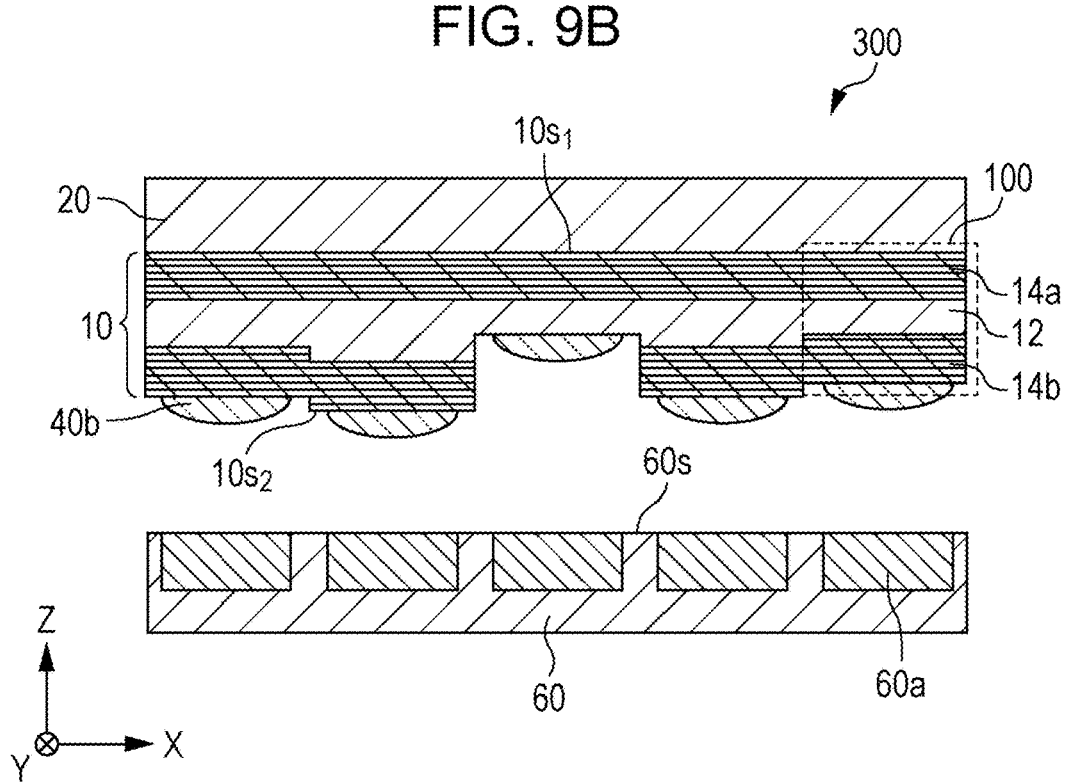
FIG. 9B is a diagram schematically illustrating another modification of the light detecting device illustrated in FIG. 7.

FIG. 9B is a diagram schematically illustrating another modification of the light detecting device 300 illustrated in FIG. 7. The light detecting device 300 illustrated in FIG. 9B differs from the light detecting device 300 illustrated in FIG. 9A in that the microlenses 40a are not provided on the light-detecting surface 60s. By not disposing the microlenses 40a and using the microlenses 40b disposed on the light-emitting surface $10s_2$ like in the present modification, light can be made to be incident efficiently on the light-detecting elements 60a.

In this specification, the microlenses 40a disposed on the light-detecting surface 60s are also referred to as the "first microlenses", and the microlenses 40b provided on the light-emitting surface $10s_2$ are also referred to as the "second microlenses".

Figure 10:
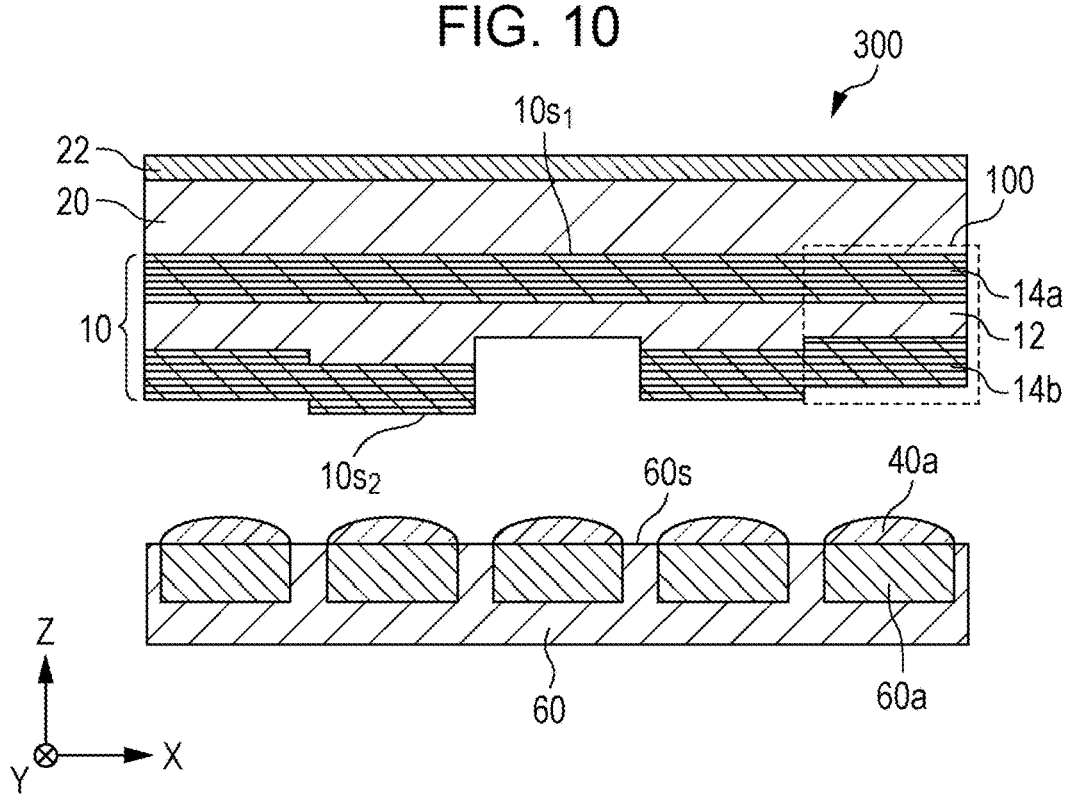
FIG. 10 is a cross section schematically illustrating a second example of a light detecting device.

Another structural element may also be added to the structure illustrated in FIG. 7. FIG. 10 is a cross section schematically illustrating a second example of the light detecting device 300. The structure illustrated in FIG. 10 differs from the structure illustrated in FIG. 7 in that the substrate 20 is provided with an anti-reflective film 22 on the surface on the opposite side from the surface supporting the filter array 10. The anti-reflective film 22 can suppress light reflections produced at the interface between air and the substrate 20 in the first example illustrated in FIG. 7. Consequently, the light detection efficiency of the light detecting device 300 can be improved. Furthermore, the anti-reflective film 22 can be used to moderate the curvature of the filter array 10 and the substrate 20, or invert the direction of the curvature. By adjusting the curvature of the filter array 10 and the substrate 20 with the anti-reflective film 22, the appearance of a fringe pattern in the captured image can be suppressed further.

Figure 11:
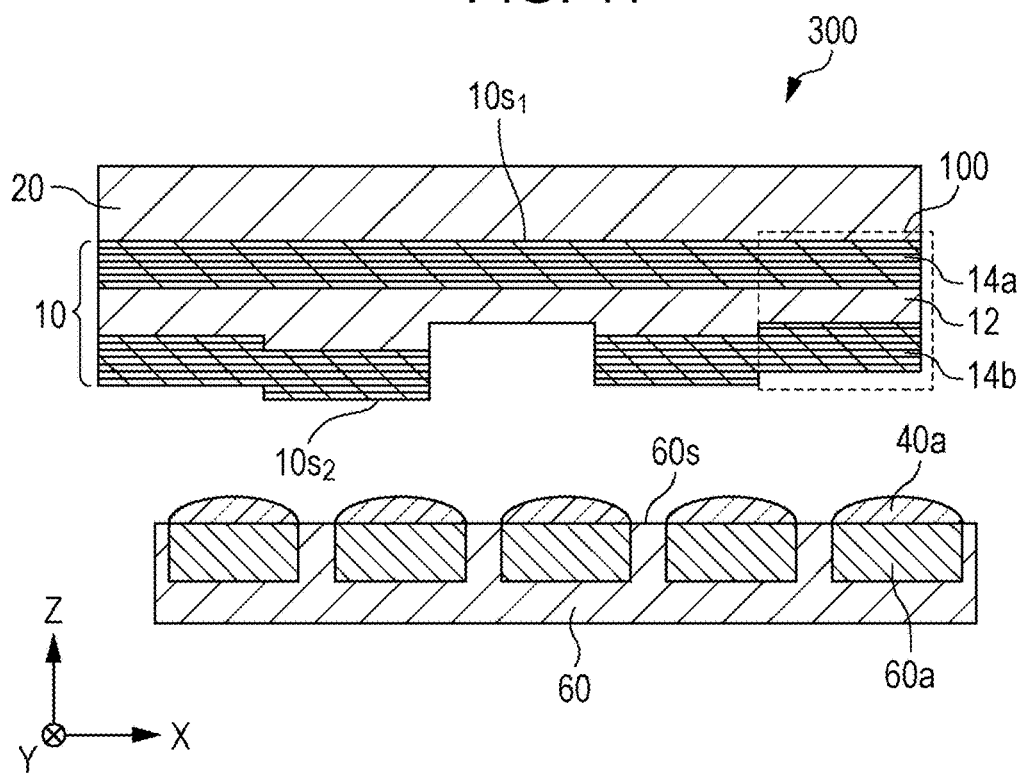
FIG. 11 is a cross section schematically illustrating a third example of a light detecting device.

The arrangement of the configuration illustrated in FIG. 7 may also be changed. FIG. 11 is a cross section schematically illustrating a third example of the light detecting device 300. The structure illustrated in FIG. 11 differs from the structure illustrated in FIG. 7 in that the positional relationship between the filter array 10 and the image sensor 60 is displaced in a direction parallel to the light-detecting surface 60s. In the third example illustrated in FIG. 11, the direction is the X direction. The magnitude of the displacement is less than the array pitch of the filters 100 or the array pitch of the light-detecting elements 60a. In the third example illustrated in FIG. 11, the filters 100 and the light-detecting elements 60a do not face each other in a one-to-one correspondence. Except for the filters 100 located at the edges, each of the filters 100 overlaps with two adjacent light-detecting elements 60a when viewed from the Z direction. In other words, each of the filters 100 has portions that face a portion of each of two adjacent light-detecting elements 60a. In this case, a portion of the light passing through each of the filters 100 is incident on one of the light-detecting elements 60a, and another portion is incident on the other adjacent light-detecting element 60a. Consequently, randomness in the spectra of the light detected by the light-detecting elements 60a can be improved. As a result, the isolated images 220 can be reconstructed more accurately.

In the example illustrated in FIG. 11, the array pitch of the filters 100 and the array pitch of the light-detecting elements 60a are equal, but the array pitches may also differ. Alternatively, the array pitch of the filters 100 and/or the array pitch of the light-detecting elements 60a may be nonuniform. According to such an arrangement, by positioning the light-emitting surface $10s_2$ of the filter array 10 and the light-detecting surface 60s of the image sensor 60 opposite each other, a configuration can be obtained in which the filters 100 and the light-detecting elements 60a do not face each other in a one-to-one correspondence. In such a configuration, some of the filters 100 and the some of the light-detecting elements 60a may face each other in a one-to-one correspondence. In the present embodiment, at least one of the filters 100 may have portions that face a portion of each of two adjacent light-detecting elements 60a.

Figure 12:
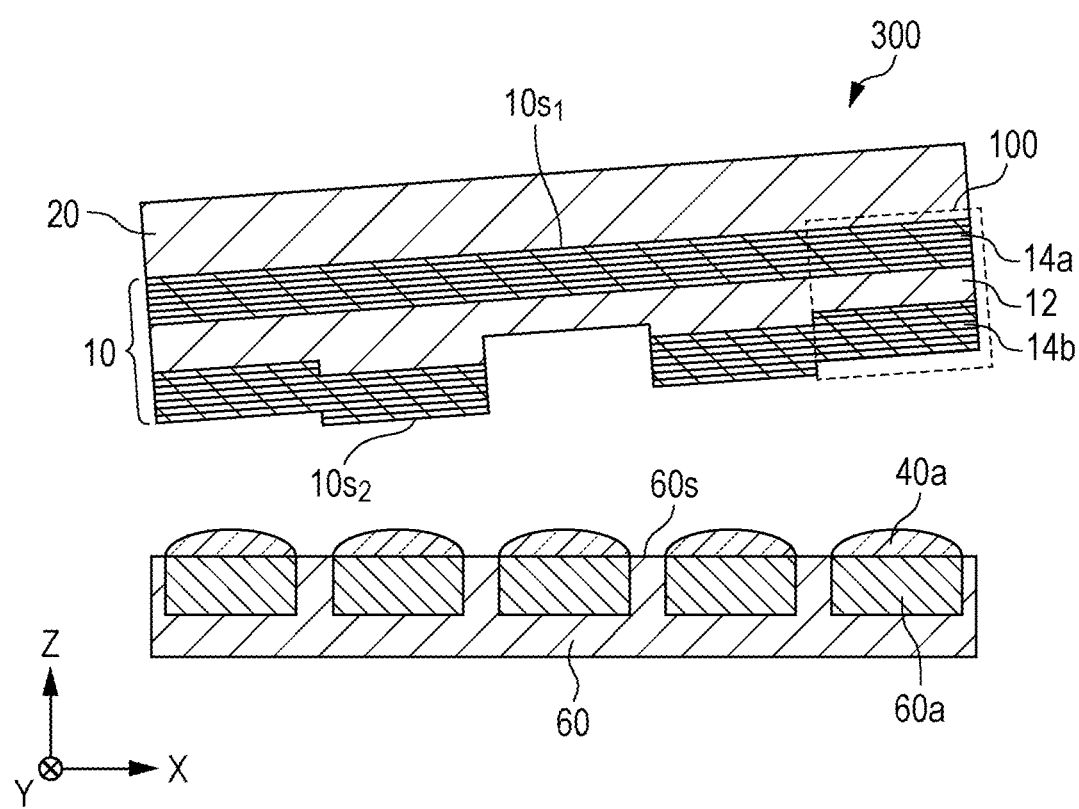
FIG. 12 is a cross section schematically illustrating a fourth example of a light detecting device.

FIG. 12 is a cross section schematically illustrating a fourth example of the light detecting device 300. The fourth example illustrated in FIG. 12 differs from the first example illustrated in FIG. 7 in that the light-incident surface $10s_1$ of the filter array 10 and the light-detecting surface 60s of the image sensor 60 are not parallel to each other. The normal direction of the light-incident surface $10s_1$ and the normal direction of the light-detecting surface 60s intersect. The angle at which the normal directions intersect may be equal to or greater than 30° and less than or equal to 45°, for example. In a configuration in which the light-incident surface $10s_1$ and the light-detecting surface 60s are not parallel like in the present embodiment, the distance between the light-emitting surface $10s_2$ and the light-detecting surface 60s is more nonuniform. As a result, the appearance of a fringe pattern in the captured image can be suppressed further.

Figure 13:
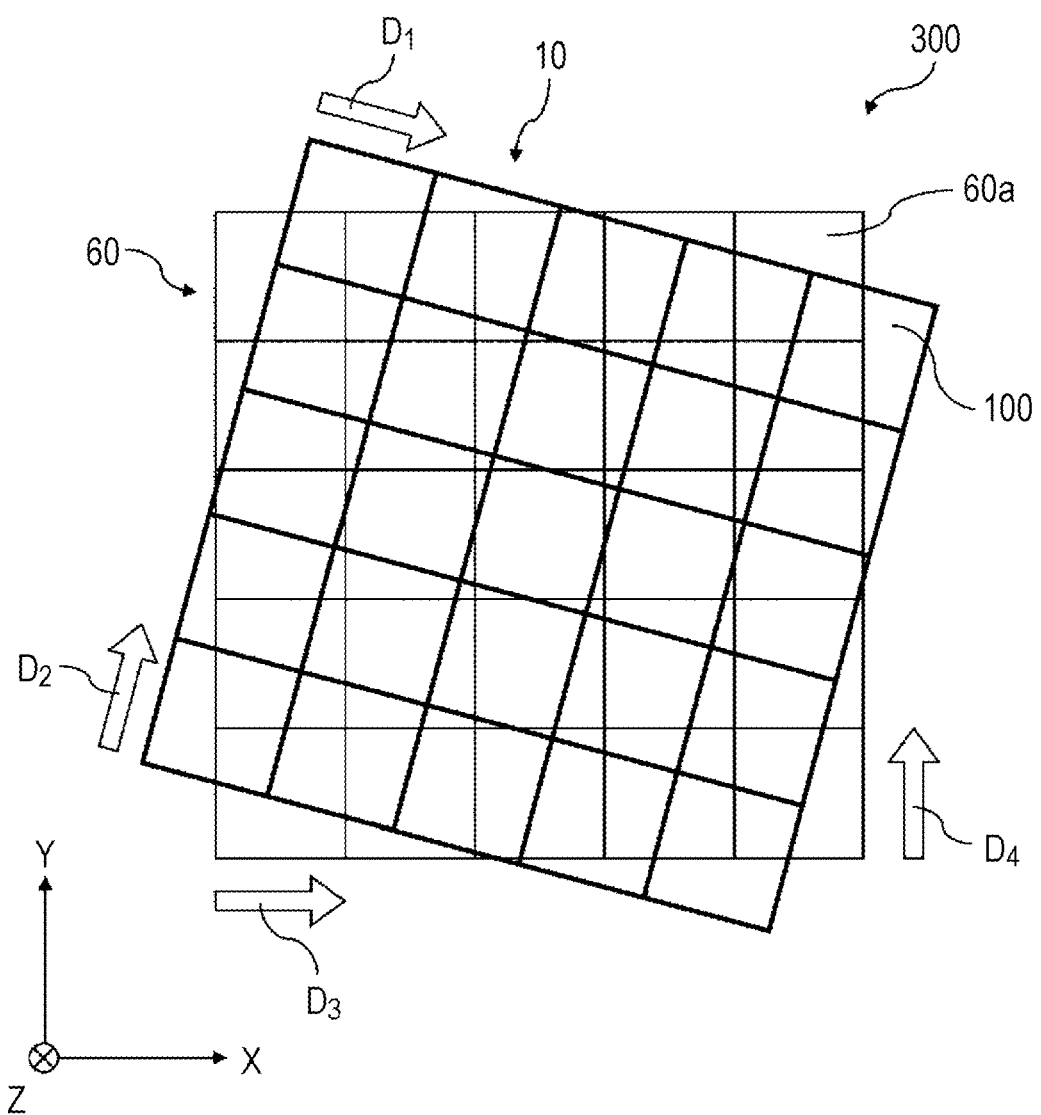
FIG. 13 is a plan view schematically illustrating a fifth example of a light detecting device.

FIG. 13 is a plan view schematically illustrating a fifth example of the light detecting device 300. The plan view is a view of the light detecting device 300 from the light-incident surface $10s_1$ side of the filter array 10. In the plan view, the substrate 20 is omitted from illustration. In the fifth example illustrated in FIG. 13, the thick lines represents the filter array 10 including 5×5 filters 100, and the thin lines represent the image sensor 60 including 5×5 light-detecting elements 60a. The fifth example illustrated in FIG. 13 differs from the first example illustrated in FIG. 7 in that the filter array 10 is rotated by a certain angle in the XY plane with respect to the image sensor 60. A first vector $D_1$ and a second vector $D_2$ obtained by rotating the first vector $D_1$ 90° counter-clockwise are treated as basis vectors, and the filters 100 included in the filter array 10 are arranged two-dimensionally in the directions of the basis vectors. A third vector $D_3$ and a fourth vector $D_4$ obtained by rotating the third vector $D_3$ 90° counter-clockwise are treated as basis vectors, and the light-detecting elements 60a included in the image sensor 60 are arranged two-dimensionally in the directions of the basis vectors. The magnitudes of the first and second vectors $D_1$ and $D_2$ are equal to the array pitch of the filters 100 in the directions of the first and second vectors $D_1$ and $D_2$. The magnitudes of the third and fourth vectors $D_3$ and $D_4$ are equal to the array pitch of the light-detecting elements 60a in the directions of the third and fourth vectors $D_3$ and $D_4$. The first vector $D_1$ to the fourth vector $D_4$ are all of equal magnitude. In the first example illustrated in FIG. 7, the first vector $D_1$ and the third vector $D_3$ are parallel to each other, and the second vector $D_2$ and the fourth vector $D_4$ are parallel to each other. In contrast, in the fifth example illustrated in FIG. 13, the third vector $D_3$ intersects the first vector $D_1$, and the fourth vector $D_4$ intersects the second vector $D_2$.

Figure 14:
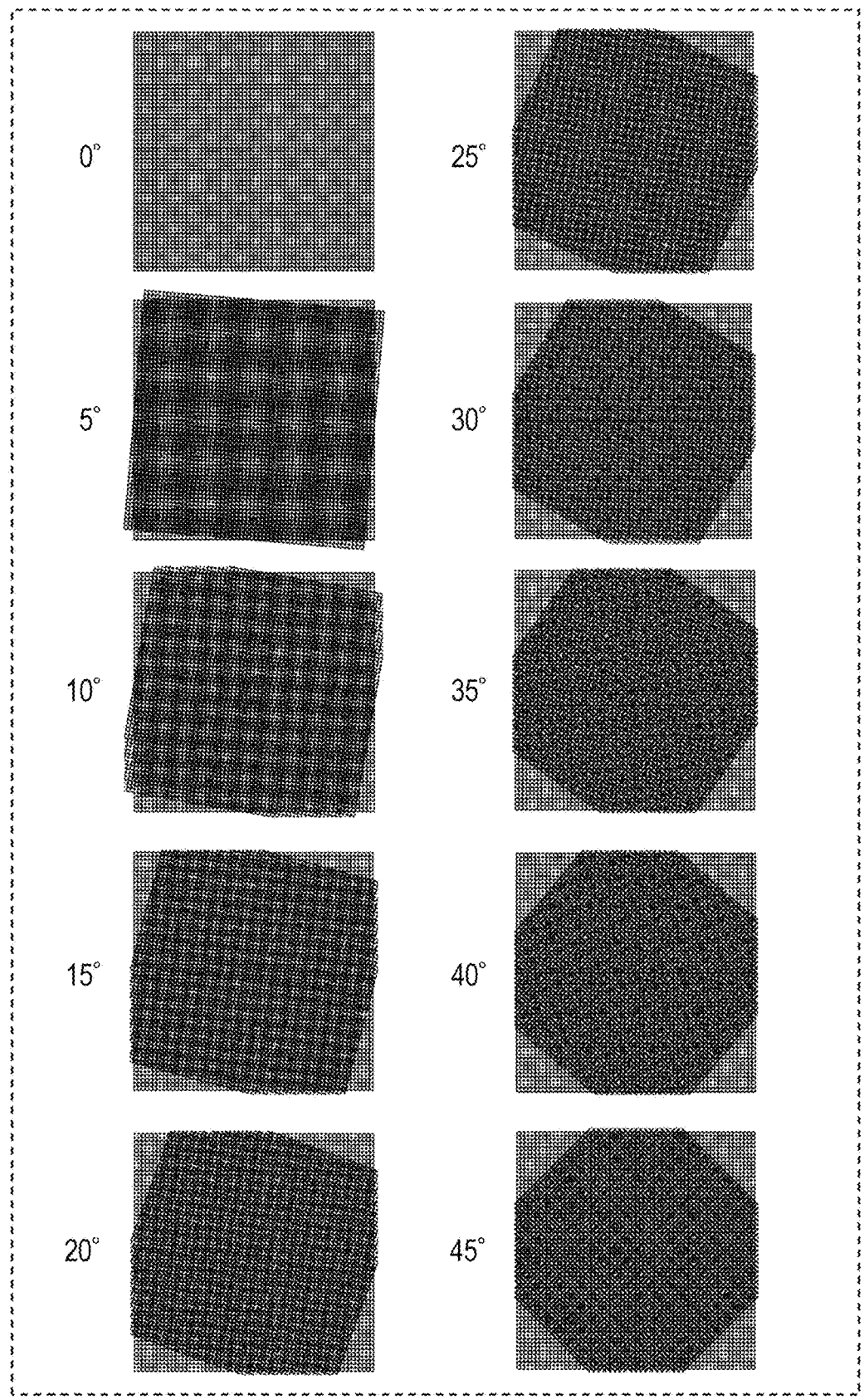
FIG. 14 is a plan view schematically illustrating configurations obtained by rotating a filter array from a 0° angle to a 45° angle in 5° increments in an XY plane with respect to an image sensor.

FIG. 14 is a plan view schematically illustrating configurations obtained by rotating the filter array 10 from a 0° angle to a 45° angle in 5° increments in the XY plane with respect to the image sensor 60. Configurations having a rotation angle from 45° to 90° are the same as the configurations having a rotation angle from 45° to 0° illustrated in FIG. 14. For example, a configuration having a 55° rotation angle is the same as the configuration having a 35° rotation angle, and a configuration having an 80° rotation angle is the same as the configuration having a 10° rotation angle. As illustrated in FIG. 14, for rotation angles other than 0°, a moiré pattern, that is, a regular variation of light and dark areas, appears in the portion where the filter array 10 and the image sensor 60 overlap. As the rotation angle increases, the moiré pattern becomes finer. For rotation angles in the range equal to or greater than 25° and less than or equal to 45°, the moiré pattern is hard to see.

To obtain a higher-quality hyperspectral image, moiré patterns may be suppressed as much as possible. Even if one attempts to arrange the filter array 10 and the image sensor 60 without any rotation, in actuality, a rotational angle error of a few degrees may occur. As illustrated in FIG. 14, a noticeable moiré pattern appears even for a rotational angle of 5°. In contrast, if the filter array 10 and the image sensor 60 are arranged at a rotational angle equal to or greater than 25° and less than or equal to 45°, as illustrated in FIG. 14, there is little or no change in the moiré pattern even if a rotational angle error of a few degrees occurs, and moreover, the moiré pattern is hard to see. Consequently, an increase in a moiré pattern due to positioning error can be suppressed.

Furthermore, in the fifth example illustrated in FIG. 13, the filters 100 and the light-detecting elements 60a do not face each other in a one-to-one correspondence, similarly to the third example illustrated in FIG. 11. Consequently, randomness in the spectra of the light detected by the light-detecting elements 60a can be improved. As a result, the isolated images 220 can be reconstructed more accurately.

In the example illustrated in FIG. 13, the angle obtained between the first vector $D_1$ and the second vector $D_2$ and the angle obtained between the third vector $D_3$ and the fourth vector $D_4$ are 90°. This angle corresponds to a square grid array. The angle obtained between the first vector $D_1$ and the second vector $D_2$ and the angle obtained between the third vector $D_3$ and the fourth vector $D_4$ may also be a predetermined angle other than 90°. For example, an angle of 60° corresponds to a triangular grid array. The moiré pattern is hard to see when the rotational angle is equal to or greater than ¼ and less than or equal to ½ the predetermined angle.

<Fixing Arrangement of Filter Array and Image Sensor>

Next, FIGS. 15A to 16E will be referenced to describe an example of a structure in which the filter array 10 and the image sensor 60 are fixed with respect to each other.

Figure 15A:
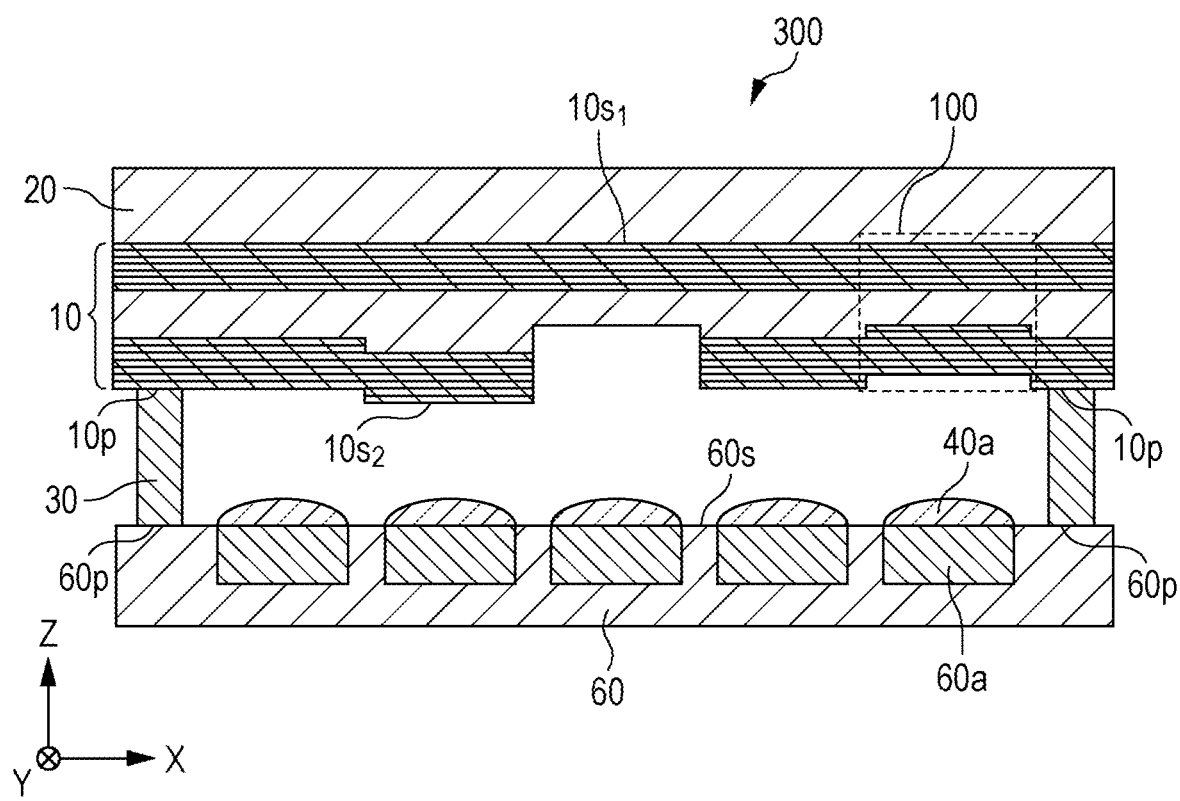
FIG. 15A is a cross section schematically illustrating a sixth example of a light detecting device.
Figure 15B:
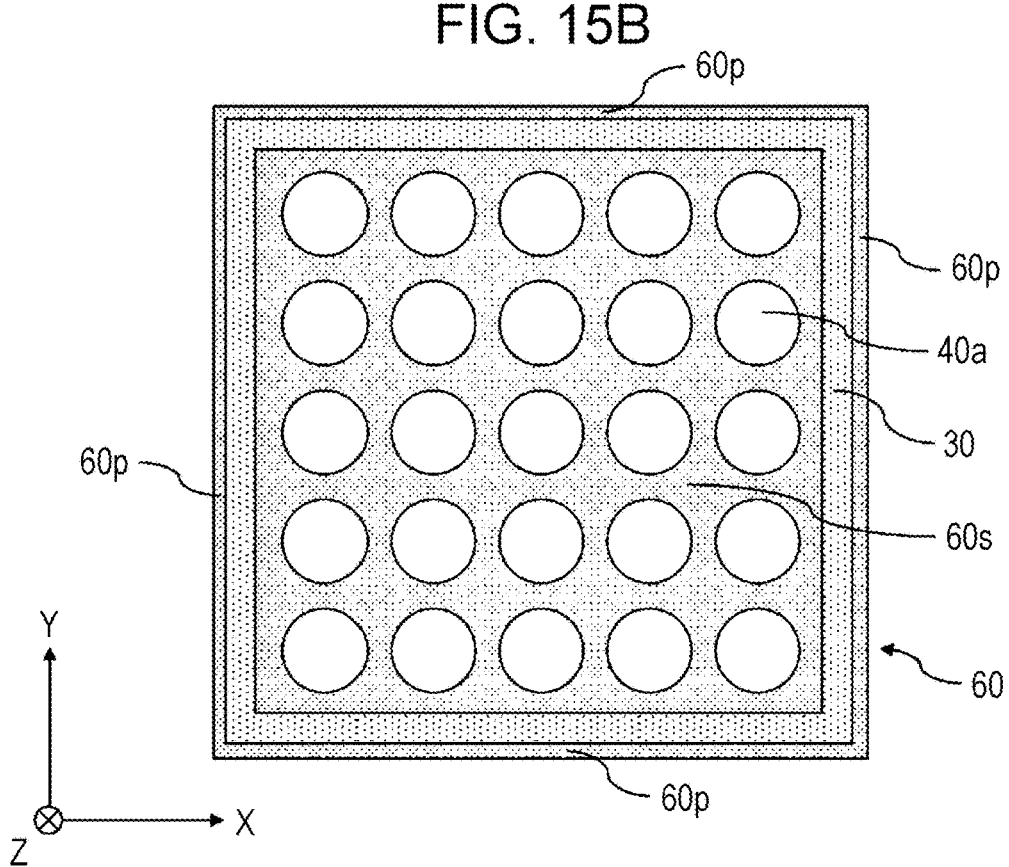
FIG. 15B is a plan view illustrating a state with the filter array and the substrate removed from the light detecting device illustrated in FIG. 15A.

FIG. 15A is a cross section schematically illustrating a sixth example of the light detecting device 300. FIG. 15B is a plan view illustrating a state with the filter array 10 and the substrate 20 removed from the light detecting device 300 illustrated in FIG. 15A. In the sixth example illustrated in FIG. 15A, the filter array 10 has a peripheral area 10p located around the light-emitting surface $10s_2$, and the image sensor 60 has a peripheral area 60p located around the light-detecting surface 60s. The peripheral area 10p of the filter array 10 and the peripheral area 60p of the image sensor 60 are flat. In the sixth example illustrated in FIG. 15A, the light detecting device 300 is provided with double-sided tape 30 for sticking together the peripheral area 10p of the filter array 10 and the peripheral area 60p of the image sensor 60. The double-sided tape 30 has a shape extending in the direction perpendicular to the light-detecting surface 60s, as illustrated in FIG. 15A, and has a shape surrounding the space between the light-emitting surface $10s_2$ and the light-detecting surface 60s, as illustrated in FIG. 15B. The double-sided tape 30 prescribes the distance between the light-emitting surface of each of the filters 100 and the light-detecting surface 60s. The height of the double-sided tape 30 may be designed such that the distance between the light-emitting surface $10s_2$ and the light-detecting surface 60s satisfies the minimum distance described above. By fixing the arrangement of the filter array 10 and the image sensor 60 with the double-sided tape 30, the light detecting device 300 can be manufactured at low cost with a simple step.

Figure 15C:
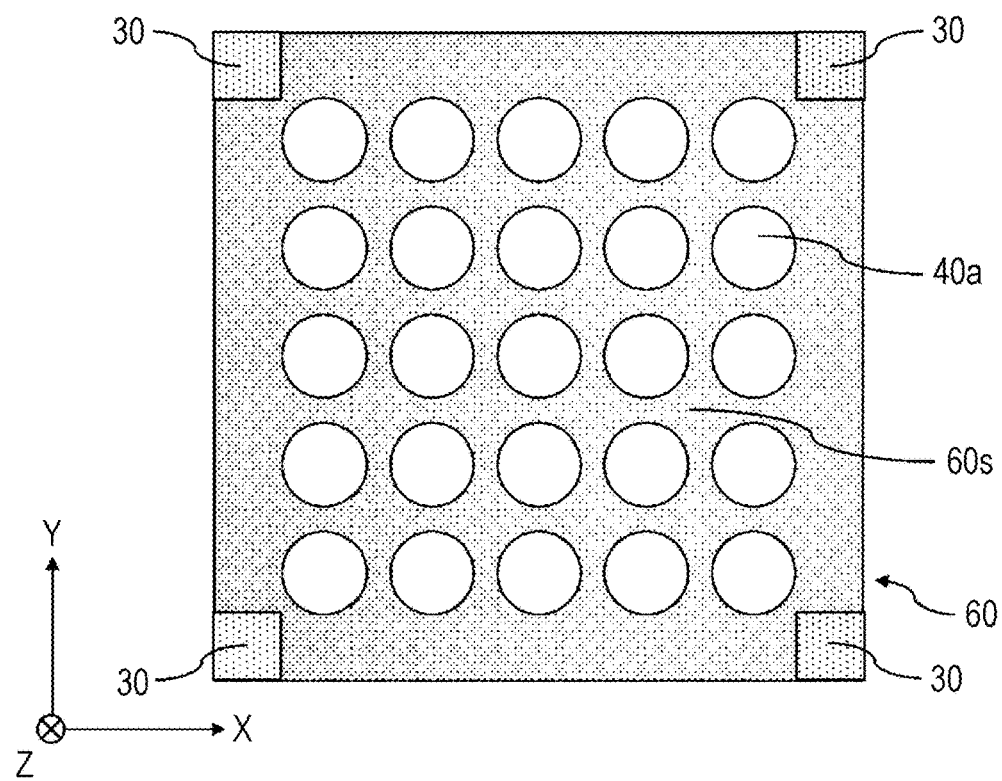
FIG. 15C is a plan view schematically illustrating another example of the double-sided tape 30 illustrated in FIG. 15B.

FIG. 15C is a plan view schematically illustrating another example of the double-sided tape 30 illustrated in FIG. 15B. In the example illustrated in FIG. 15C, the four corners of the peripheral area 10p of the filter array 10 and the four corners of the peripheral area 60p of the image sensor 60 are stuck together by the double-sided tape 30. In the present embodiment, at least a portion of the peripheral area 10p of the filter array 10 and at least a portion of the peripheral area 60p of the image sensor 60 are stuck together by the double-sided tape 30. As a result, the arrangement of the filter array 10 and the image sensor 60 can be fixed.

Figure 16A:
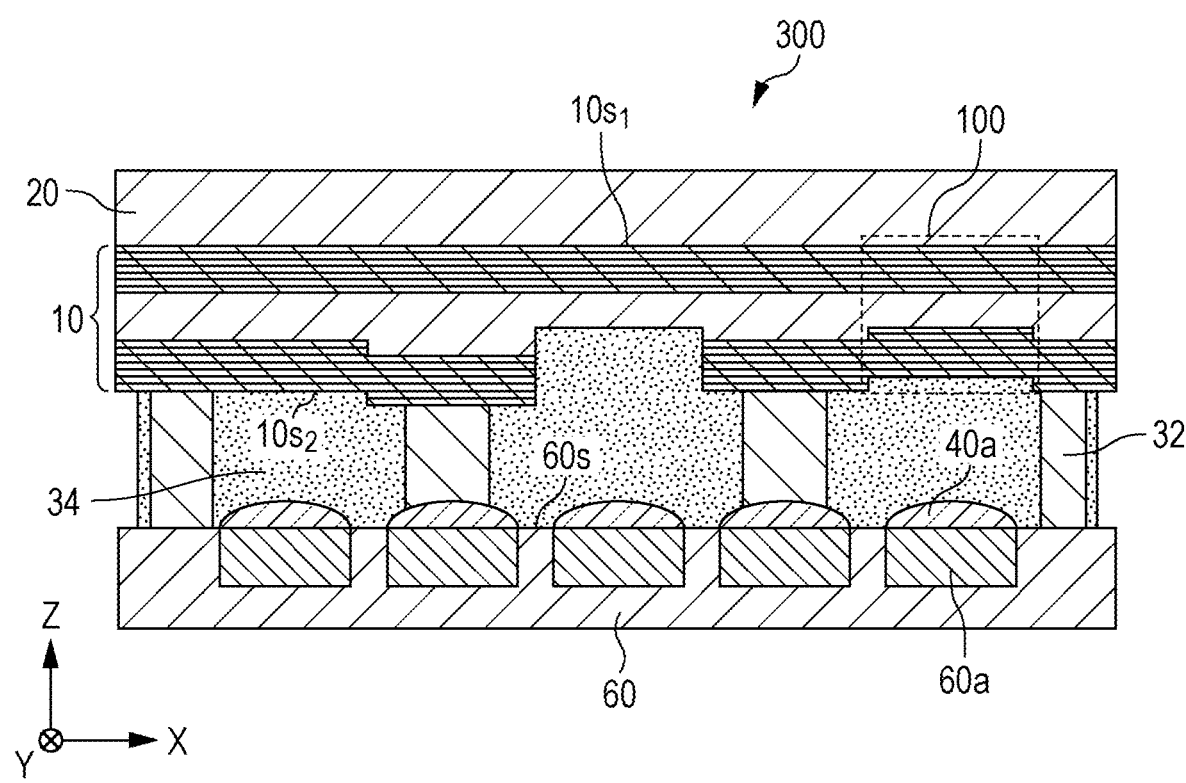
FIG. 16A is a cross section schematically illustrating a seventh example of a light detecting device.
Figure 16B:
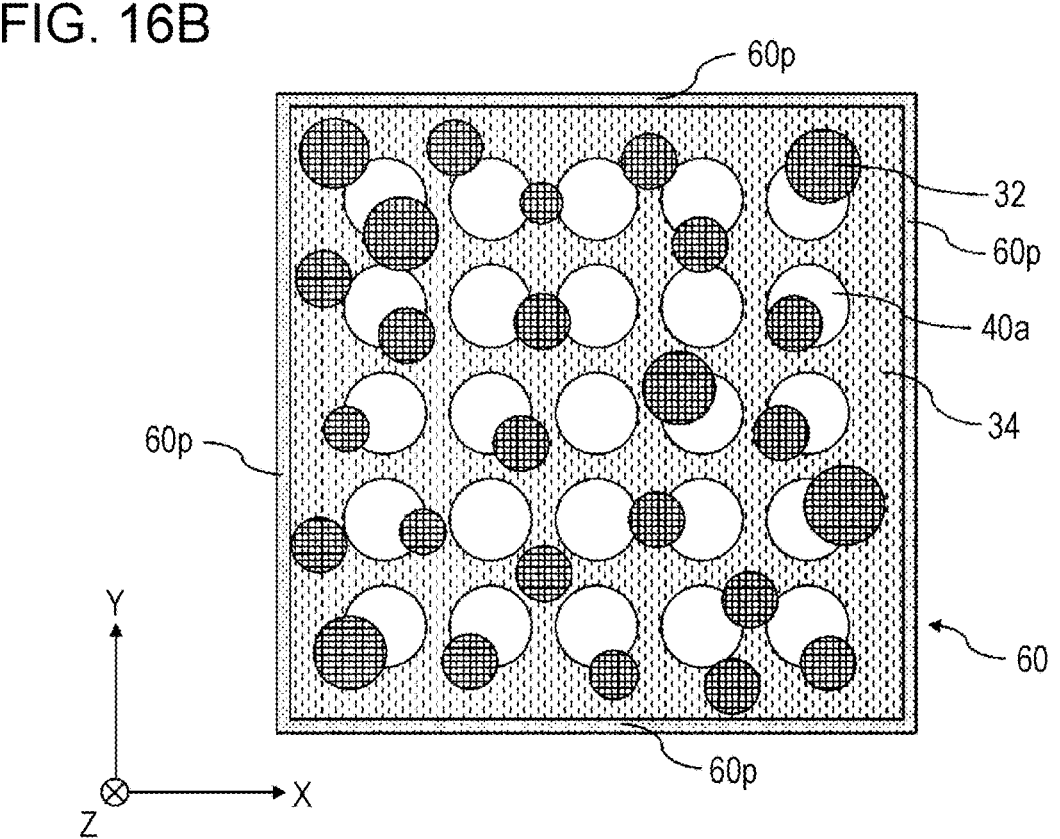
FIG. 16B is a plan view illustrating a state with the filter array and the substrate removed from the light detecting device illustrated in FIG. 16A.

FIG. 16A is a cross section schematically illustrating a seventh example of the light detecting device 300. FIG. 16B is a plan view illustrating a state with the filter array 10 and the substrate 20 removed from the light detecting device 300 illustrated in FIG. 16A. In the seventh example illustrated in FIG. 16A, the light detecting device 300 is provided with spacers 32 caught between the filter array 10 and the image sensor 60. The light-emitting surface $10s_2$ and the light-detecting surface 60s are bonded to each other with a transparent adhesive 34. The transparent adhesive 34 transmits light in all of the wavelength bands $W_1$ to $W_i$ included in the target wavelength band at a high transmittance. The high transmittance is 0.8 or higher, for example. The spacers 32 are rigid and prescribe the distance between the light-emitting surface of each of the filters 100 and the light-detecting surface 60s more accurately. The spacers 32 may be photospacers that prescribe the height of the space into which a liquid crystal material is injected in a liquid crystal display, for example. The photospacers may be formed from the negative photoresist SU-8 (manufactured by Nippon Kayaku Co., Ltd.), for example. The transparent adhesive 34 may be formed from the optical coupling adhesive GA700L (manufactured by NTT Advanced Technology Corporation), for example. A method for forming the spacers 32 will be described later.

In the case where the cross-sectional size of each of the spacers 32 in the XY plane is larger than the size of the light-detecting elements 60a, the spacers 32 are supported by the light-emitting surfaces of the filters 100 and the tops of the microlenses 40a. In the case where the cross-sectional size of each of the spacers 32 is approximately the same as the size of the light-detecting elements 60a, some of the spacers 32 are supported by the light-emitting surfaces of the filters 100 and the tops of the microlenses 40a. In either case, the distance between the light-emitting surface of each of the filters 100 and the light-detecting surface 60s is prescribed more accurately by the spacers 32.

In the example illustrated in FIG. 16B, the spacers 32 are arranged irregularly. The distribution density of the spacers 32 may be designed to be uniform in individual regions of predetermined size (such as regions corresponding to a 3×3 unit cell, for example). The cross-sectional size of the spacers 32 may be uniform or nonuniform. The cross-sectional size of the spacers 32 may be larger than or approximately the same as the size of the light-detecting elements 60a, for example. The cross-sectional size of some of the spacers 32 may also be smaller than the size of the light-detecting elements 60a. The spacers 32 may or may not be translucent. In a plan view, at least one of the spacers 32 may be disposed at a position overlapping the microlenses 40a.

The spacers 32 serve to prescribe the distance between the light-emitting surface of each of the filters 100 and the light-detecting surface 60s more accurately, irrespectively of whether the spacers 32 are provided near the peripheral area 60p of the image sensor 60 or on the light-detecting surface 60s. The spacers 32 provided on the light-detecting surface 60s and overlapping the microlenses 40a also serve to improve the randomness in the spectra of the light detected by the light-detecting elements 60a. This is because if the refractive index of the spacers 32 and the refractive index of the transparent adhesive 34 are different, some of the light incident on the light-detecting elements 60a is modulated by the spacers 32.

In the example illustrated in FIGS. 16A and 16B, the space between the light-emitting surface $10s_2$ and the light-detecting surface 60s is filled with the transparent adhesive 34. Consequently, the mechanical strength of the light detecting device 300 can be improved. As a result, the reliability of the light detecting device 300 can be improved. Furthermore, since heat emitted from the image sensor 60 is transferred to the filter array 10 and the substrate 20 through the transparent adhesive 34, the heat can be released to the outside efficiently. In the present embodiment, at least a portion of the light-emitting surface $10s_2$ and at least a portion of the light-detecting surface 60s are bonded to each other with the transparent adhesive 34. Alternatively, as illustrated in FIGS. 15A to 15C, at least a portion of the peripheral area 10p of the filter array 10 and at least a portion of the peripheral area 60p of the image sensor 60 may be stuck together with an adhesive. In this case, the adhesive is not necessarily transparent.

Figure 16C:
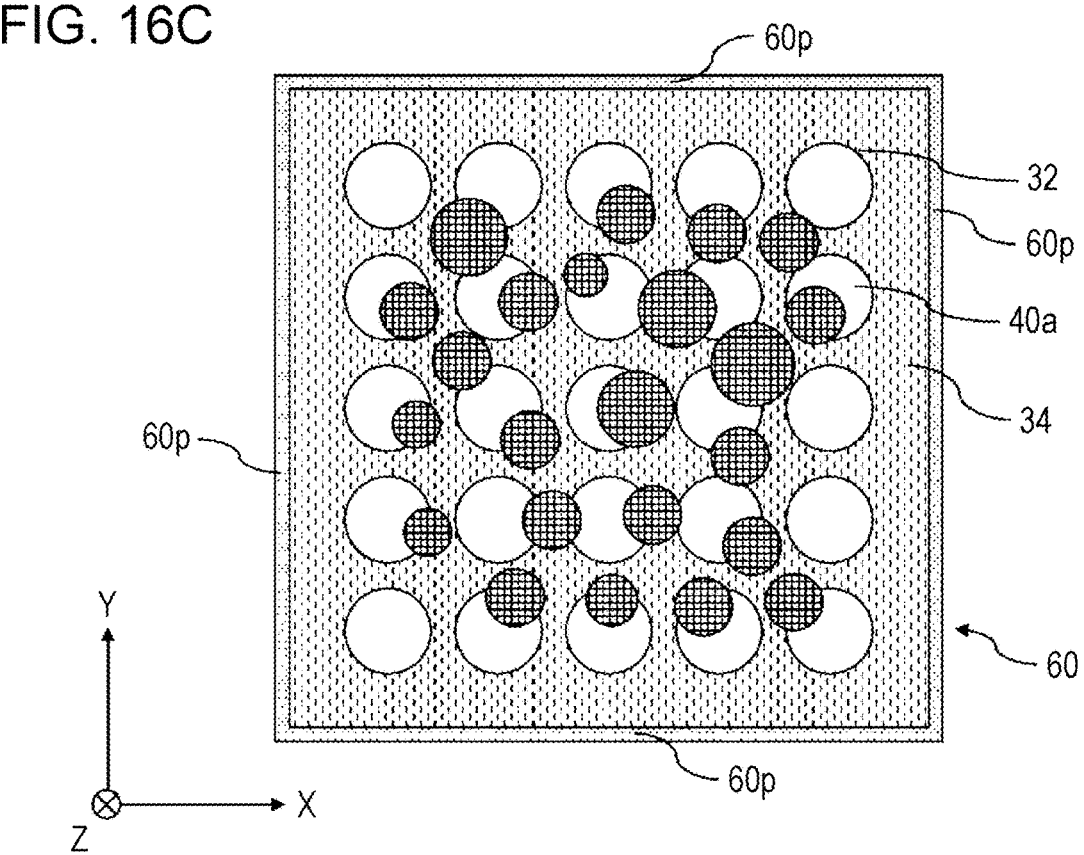
FIG. 16C is a plan view schematically illustrating another example of the arrangement of the spacers illustrated in FIG. 16B.

FIG. 16C is a plan view schematically illustrating another example of the arrangement of the spacers 32 illustrated in FIG. 16B. In the example illustrated in FIG. 16C, the spacers 32 are provided on the light-detecting surface 60s of the image sensor 60 rather than the peripheral area 60p of the image sensor 60. The arrangement of the spacers 32 illustrated in FIG. 16C is effective in the case where a further improvement in the randomness of the spectra of the light detected by the light-detecting elements 60a is necessary.

Figure 16D:
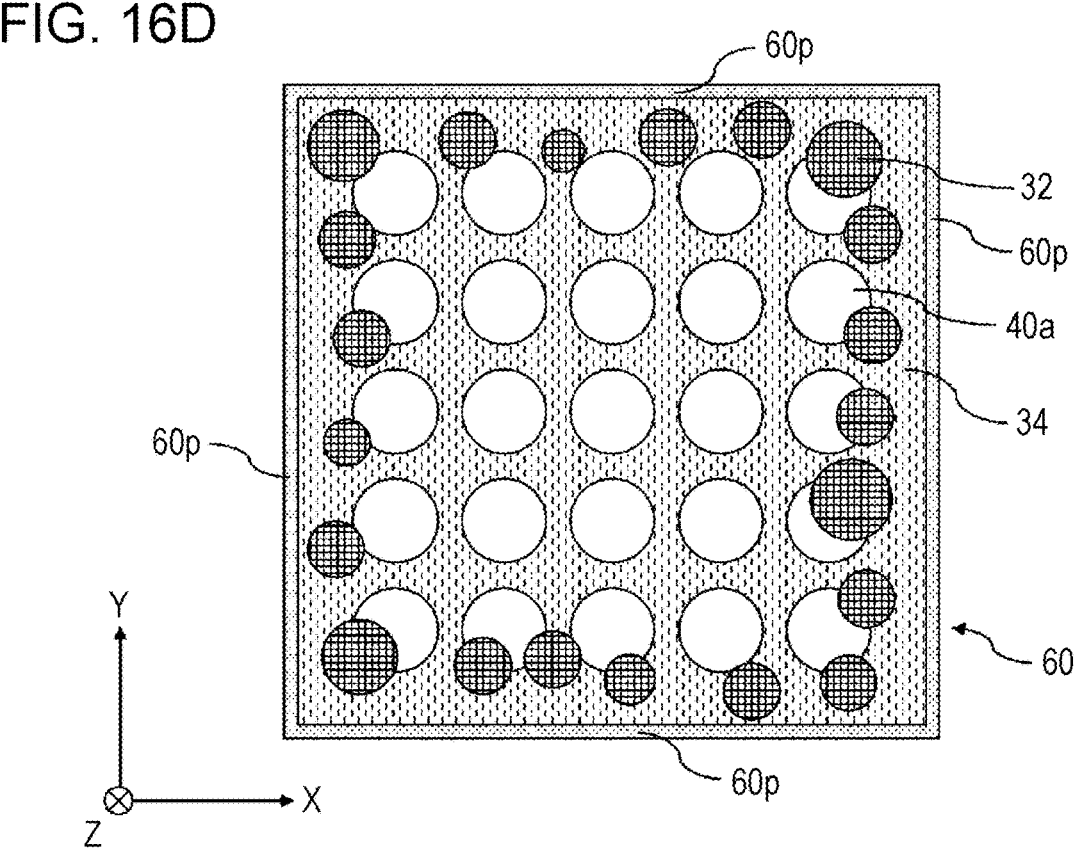
FIG. 16D is a plan view schematically illustrating yet another example of the arrangement of the spacers illustrated in FIG. 16B.

FIG. 16D is a plan view schematically illustrating yet another example of the arrangement of the spacers 32 illustrated in FIG. 16B. In the example illustrated in FIG. 16D, the spacers 32 are provided closer to the peripheral area 60p of the image sensor 60 rather than the light-detecting surface 60s of the image sensor 60. The arrangement of the spacers 32 illustrated in FIG. 16D is effective in the case where improving the randomness in the spectra of the light detected by the light-detecting elements 60a is not necessary, but prescribing the distance between the light-emitting surface of each of the filters 100 and the light-detecting surface 60s more accurately is necessary.

Figure 16E:
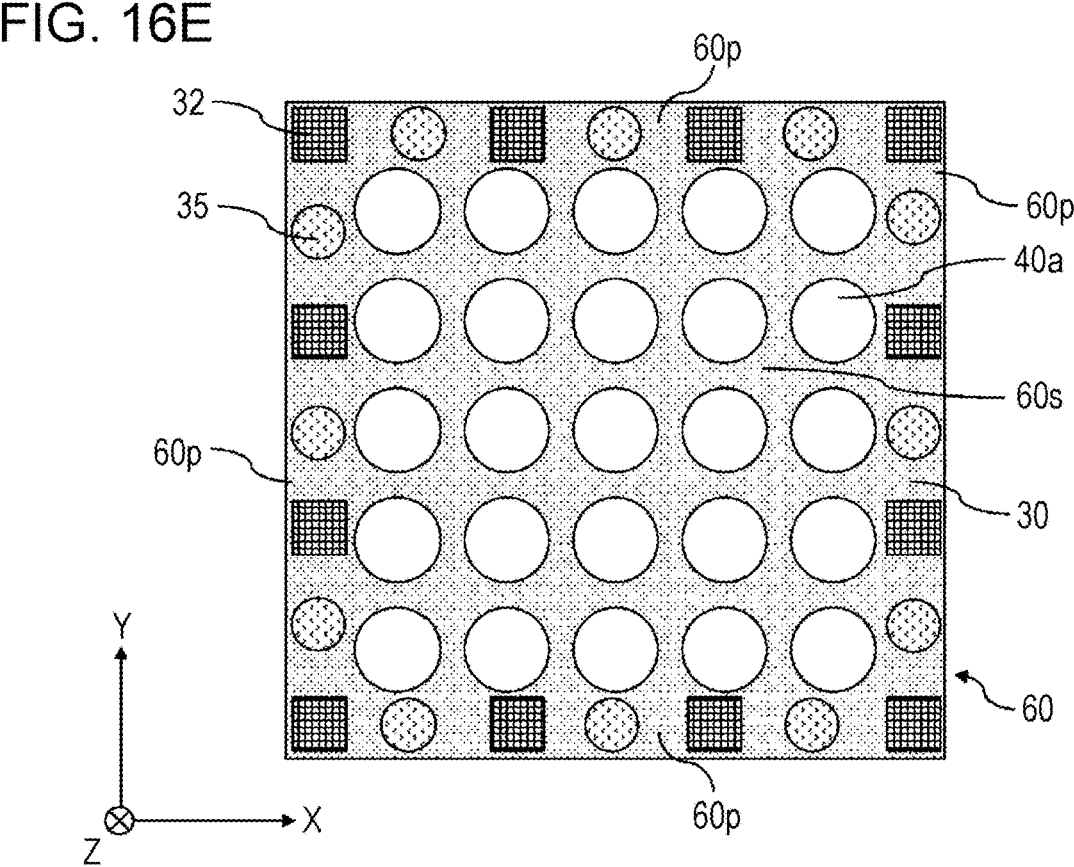
FIG. 16E is a plan view schematically illustrating yet another example of the arrangement of the spacers illustrated in FIG. 16B.

FIG. 16E is a plan view schematically illustrating yet another example of the arrangement of the spacers 32 illustrated in FIG. 16B. In the example illustrated in FIG. 16E, the spacers 32 and adhesives 35 are arranged in the peripheral area 60p of the image sensor 60. The adhesives 35 have a columnar shape similar to the spacers 32. The adhesives 35 arranged in the peripheral area 60p are not necessarily transparent. This is because the peripheral area 60p does not contribute to light detection. The adhesives 35 and the spacers 32 do not overlap each other when viewed from the normal direction of the light-incident surface $10s_1$. Consequently, the distance between the light-emitting surface $10s_2$ of the filter array 10 and the light-detecting surface 60s of the image sensor 60 can be prescribed accurately, making it possible to stick together the filter array 10 and the image sensor 60 in a state closer to parallel. Furthermore, since the spacers 32 and the transparent adhesive 34 are not disposed on the light-detecting surface 60s, the light is not attenuated by the spacers 32 and the transparent adhesive 34. The arrangement of the spacers 32 illustrated in FIG. 16E is effective in the case where improving the randomness in the spectra of the light detected by the light-detecting elements 60a is not necessary, improving mechanical strength through the use of the transparent adhesive 34 is not necessary, but prescribing the distance between the light-emitting surface $10s_2$ and the light-detecting surface 60s more accurately is necessary.

In the example illustrated in FIG. 16E, the spacers 32 and adhesives 35 are arranged alternately in the peripheral area 60p of the image sensor 60. The spacers 32 and the adhesives 35 are not necessarily arranged alternately. Two or more spacers 32 may also be arranged consecutively, and two or more adhesives 35 may also be arranged consecutively. Alternatively, four of the spacers 32 may be disposed at the four corners, respectively, of the peripheral area 60p of the image sensor 60, and the adhesives 35 may be arranged in the portions other than the four corners. In the example illustrated in FIG. 16E, the spacers 32 have a square cross section, but may also have a circular cross section. The adhesives 35 are circular but may also be elliptical. If accurately prescribing the distance between the light-emitting surface $10s_2$ and the light-detecting surface 60s is not necessary, the adhesives 35 and the spacers 32 may also overlap one another when viewed from the normal direction of the light-incident surface $10s_1$.

<Method for Forming Spacers>

One conceivable method for forming the spacers 32 is to form the spacers 32 on the light-detecting surface 60s of the image sensor 60, for example. However, with this method, the following problem may occur. Consider the case of sticking together the image sensor 60 in which the spacers 32 have been formed on the light-detecting surface 60s and the filter array 10 having the light-emitting surface $10s_2$, that is, an uneven surface. In this case, the distance between the light-detecting surface 60s of the image sensor 60 and the light-emitting surface $10s_2$ of the filter array 10 is different from pixel to pixel, or the distance between the peripheral area 10p of the filter array 10 and the peripheral area 60p of the image sensor 60 from place to place, and thus there is a possibility that some of the spacers 32 may not contact the light-emitting surface $10s_2$ of the filter array 10. Problems may occur with such a configuration, such as lowered mechanical strength of the filter array 10 and the image sensor 60 that are stuck together and lowered precision in prescribing the distance between the light-emitting surface $10s_2$ and the light-detecting surface $60s$. To address these problems, the inventors conceived of a method for forming the spacers 32 on the light-emitting surface $10s_2$ of the filter array 10.

Hereinafter, FIGS. 17A to 17D will be referenced to describe a method for forming the spacers 32 on the light-emitting surface $10s_2$ of the filter array 10. FIGS. 17A to 17D are diagrams for explaining an example of steps in the method for forming the spacers.

Figure 17A:
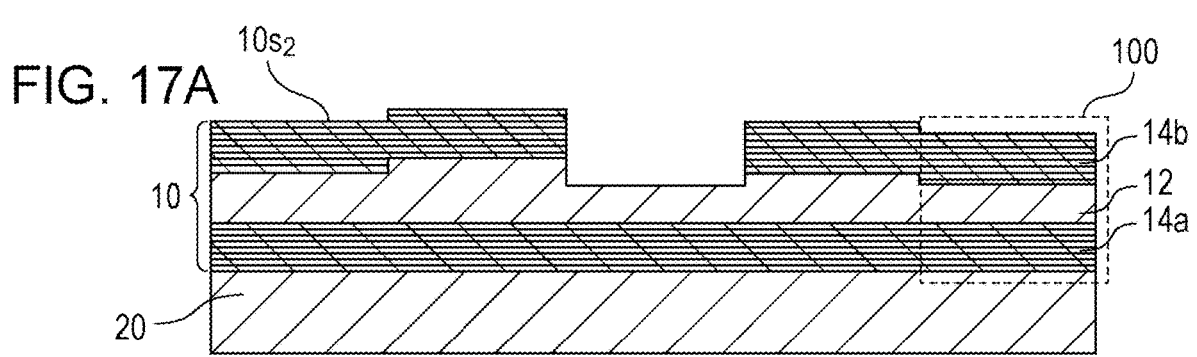
FIG. 17A is a diagram for explaining an example of a step in a method for forming spacers.

In a first step, as illustrated in FIG. 17A, the filter array 10 having an uneven surface is prepared. In the example illustrated in FIG. 17A, the filter array 10 is supported by the substrate 20, but the substrate 20 may also be omitted.

Figure 17B:
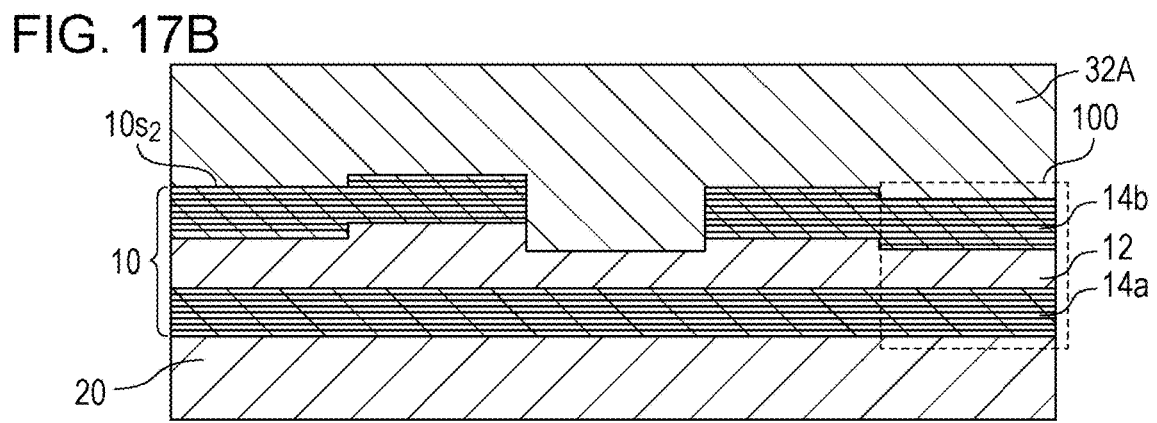
FIG. 17B is a diagram for explaining an example of a step in a method for forming spacers.

In the next step, as illustrated in FIG. 17B, a photoresist 32A in liquid form is applied to the light-emitting surface $10s_2$ of the filter array 10 by spin coating, for example. The photoresist 32A applied by spin coating absorbs or fills in the irregular unevenness of the light-emitting surface $10s_2$, and therefore the uppermost surface of the photoresist 32A is flat. According to the step described with reference to FIG. 17B, the photoresist can be formed on the uneven surface of the filter array 10.

Figure 17C:
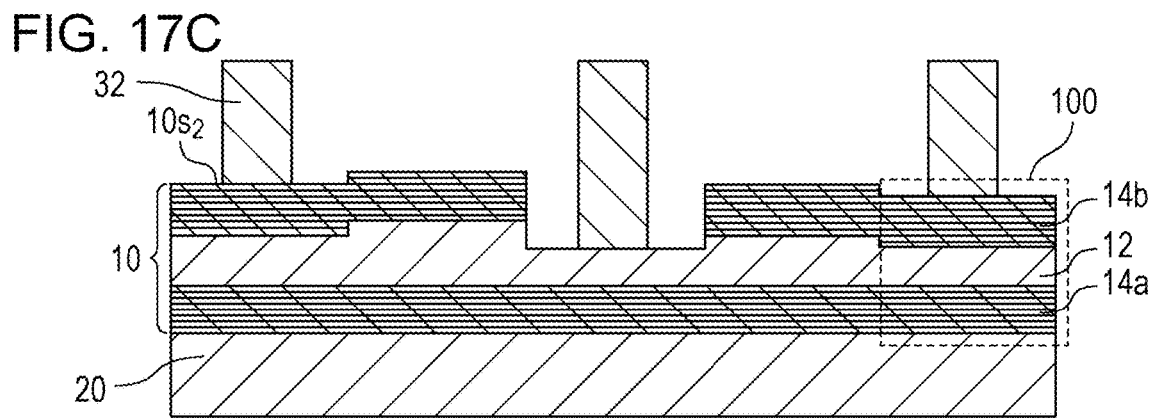
FIG. 17C is a diagram for explaining an example of a step in a method for forming spacers.
Figure 17D:
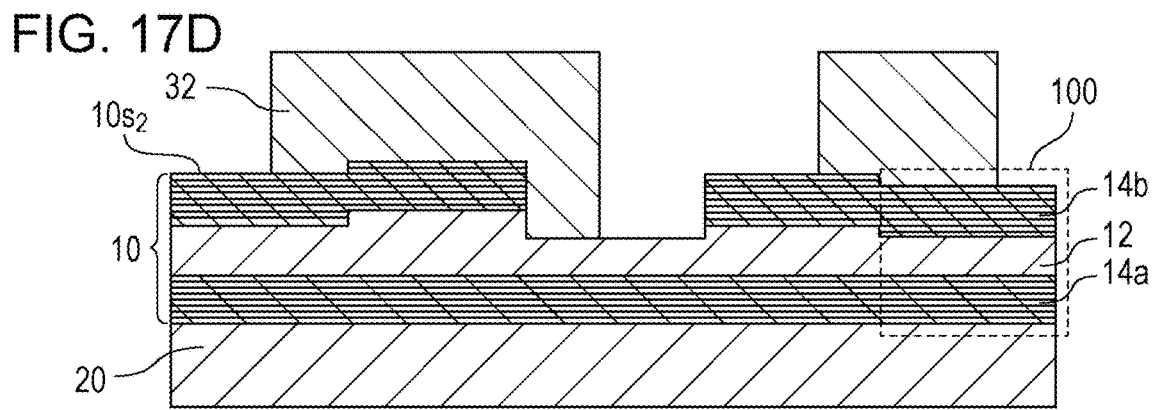
FIG. 17D is a diagram for explaining an example of a step in a method for forming spacers.

In the next step, as illustrated in FIG. 17C or 17D, the photoresist is patterned such that the spacers 32 with aligned heights are formed on the light-emitting surface $10s_2$ of the filter array 10. Here, aligned heights means that the ends of the spacers 32 are located at substantially the same height in the vertical direction. As illustrated in FIG. 17C, if the cross-sectional size of each of the spacers 32 is less than or equal to the size of a single pixel, the heights of the spacers 32 are aligned within the filter array 10 although the lengths of the spacers in the vertical direction are different for every pixel. As illustrated in FIG. 17D, if the cross-sectional size of each of the spacers 32 is greater than the size of a single pixel, the heights of the spacers 32 are aligned within the filter array 10. According to the step described with reference to FIG. 17C of 17D, the spacers can be formed on the uneven surface of the filter array 10.

In the example illustrated in FIGS. 17A to 17D, the spacers 32 are formed on the light-emitting surface $10s_2$ of the filter array 10. However, the configuration is not limited to the above example, and the spacers 32 may also be formed on the light-emitting surface $10s_2$ and/or the peripheral area $10p$ of the filter array 10. In this specification, the filter array 10 having the spacers 32 formed thereon is also referred to as a "structure".

<Sticking Together Filter Array 10 and Image Sensor 60>

Figure 18A:
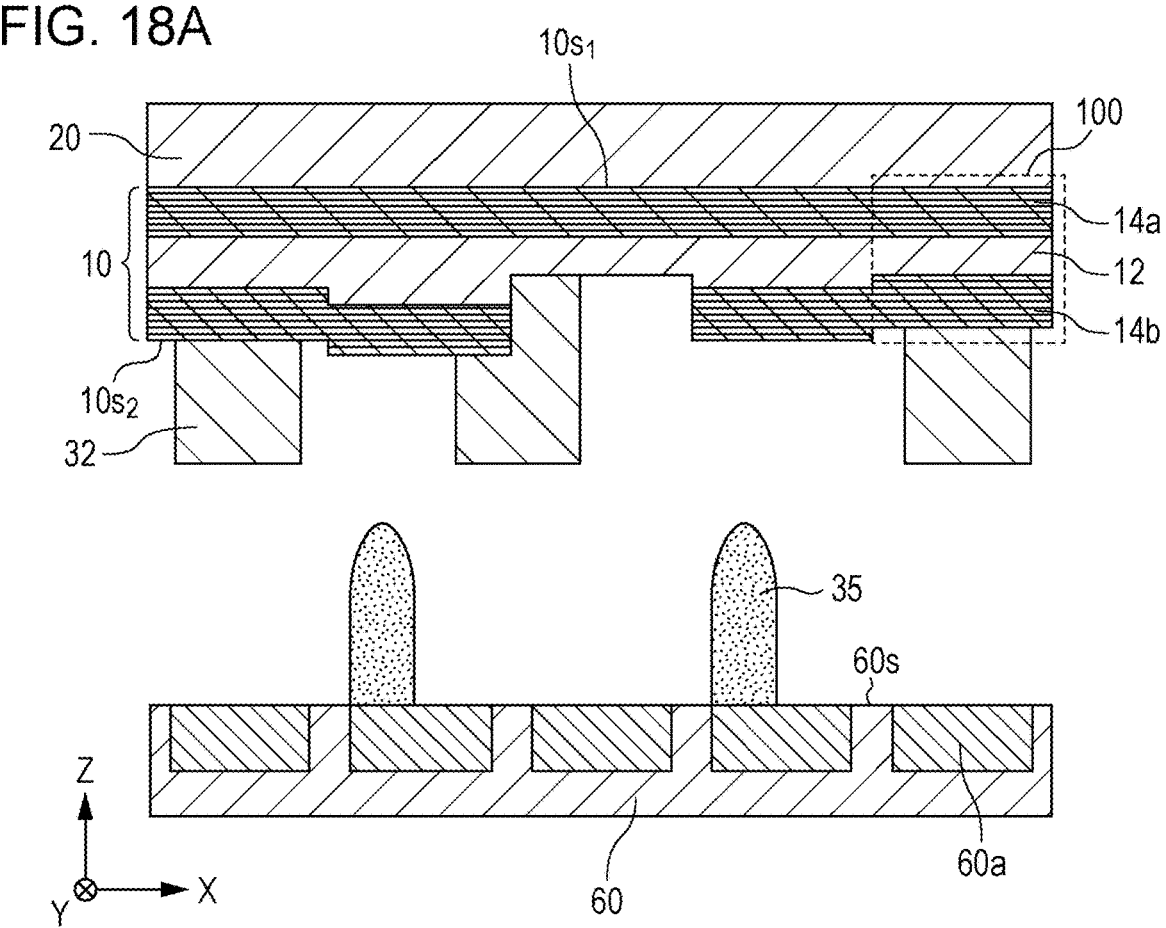
FIG. 18A is a diagram for explaining an example of a step in a method for sticking together a filter array and an image sensor.
Figure 18B:
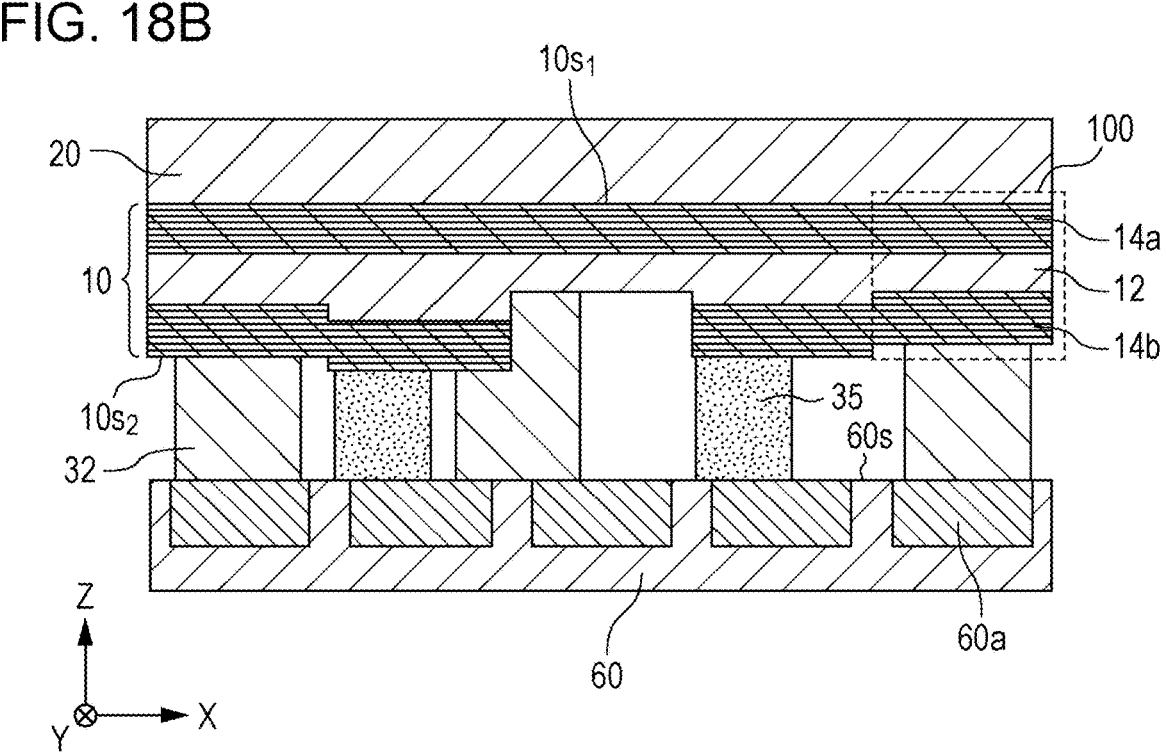
FIG. 18B is a diagram for explaining an example of a step in a method for sticking together a filter array and an image sensor.
Figure 18C:
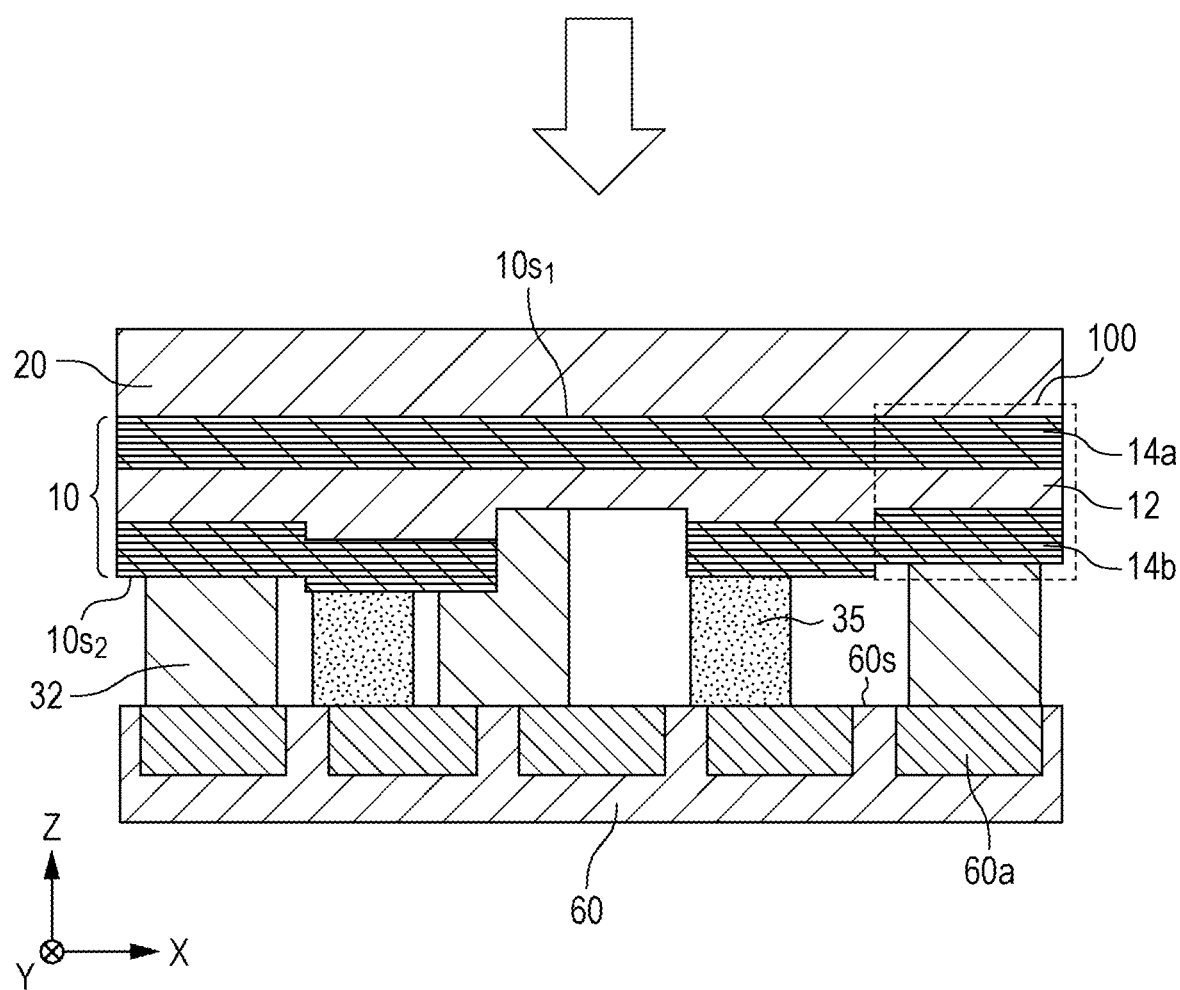
FIG. 18C is a diagram for explaining an example of a step in a method for sticking together a filter array and an image sensor.

Next, FIGS. 18A to 18C will be referenced to describe a method for sticking together the filter array 10 and the image sensor 60. FIGS. 18A to 18C are diagrams for explaining an example of steps in the method for sticking together the filter array 10 and the image sensor 60.

In a first step, as illustrated in FIG. 18A, the filter array 10 having the spacers 32 formed on the light-emitting surface $10s_2$ and the image sensor 60 having the adhesives 35 disposed in a point-like manner on the light-detecting surface $60s$ are prepared. The adhesives 35 may be formed from a light-curing resin or a heat-curing resin, for example. The light-curing resin may be a UV-curing resin or a visible-light-curing resin. In the example illustrated in FIG. 18A, the adhesives 35 generally have a semi-ellipsoidal shape. The adhesives 35 may have any shape.

In the next step, as illustrated in FIG. 18B, in a state in which the light-emitting surface $10s_2$ of the filter array 10 and the light-detecting surface $60s$ of the image sensor 60 are facing each other, the filter array 10 is pressed against the image sensor 60 with the spacers 32 and the adhesives 35 interposed in between. As illustrated in FIG. 18B, the spacers 32 and the adhesives 35 may be arranged in a non-overlapping way when viewed from a direction perpendicular to the light-incident surface $10s_1$. In this step, the adhesives 35 are pressed down by the filter array 10 and generally have a cylindrical shape. The pressing-down causes the diameter of the adhesives 35 illustrated in FIG. 18B to be larger than the diameter of the adhesives 35 illustrated in FIG. 18A.

In the next step, in the case where the adhesives 35 are formed from a light-curing resin, as illustrated in FIG. 18C, the adhesives 35 are irradiated with light through the filter array 10 and the substrate 20. The arrow illustrated in FIG. 18C illustrates how the light is radiated. If the light-curing resin is a UV-curing resin, the irradiating light is ultraviolet light, whereas if the light-curing resin is a visible-light-curing resin, the irradiating light is visible light. The adhesives 35 are cured by the light irradiation, such that the filter array 10 and the image sensor 60 are stuck together substantially parallel to each other. Through the sticking together, the distance between the light-emitting surface of each of the filters 100 and the light-detecting surface of the corresponding light-detecting elements $60a$ can be prescribed accurately. In the case where the adhesives 35 are formed from a heat-curing resin, the adhesives 35 are cured by being heated, such that the filter array 10 and the image sensor 60 are stuck together substantially parallel to each other.

In the example illustrated in FIGS. 18A to 18C, the filter array 10 having the spacers 32 formed on the light-emitting surface $10s_2$ and the image sensor 60 having the adhesives 35 arranged on the light-detecting surface $60s$ are stuck together. However, the configuration is not limited to the above example, and the filter array 10 having the spacers 32 formed on the light-emitting surface $10s_2$ and/or the peripheral area $10p$ and the image sensor 60 having the adhesives 35 arranged on the light-detecting surface $60s$ and/or the peripheral area $60p$ may also be stuck together. Although not illustrated in FIGS. 18A to 18C, the peripheral area $10p$ of the filter array 10 and the peripheral area $60p$ of the image sensor 60 also face each other.

<Encapsulation of Filter Array and Image Sensor>

Figure 19:
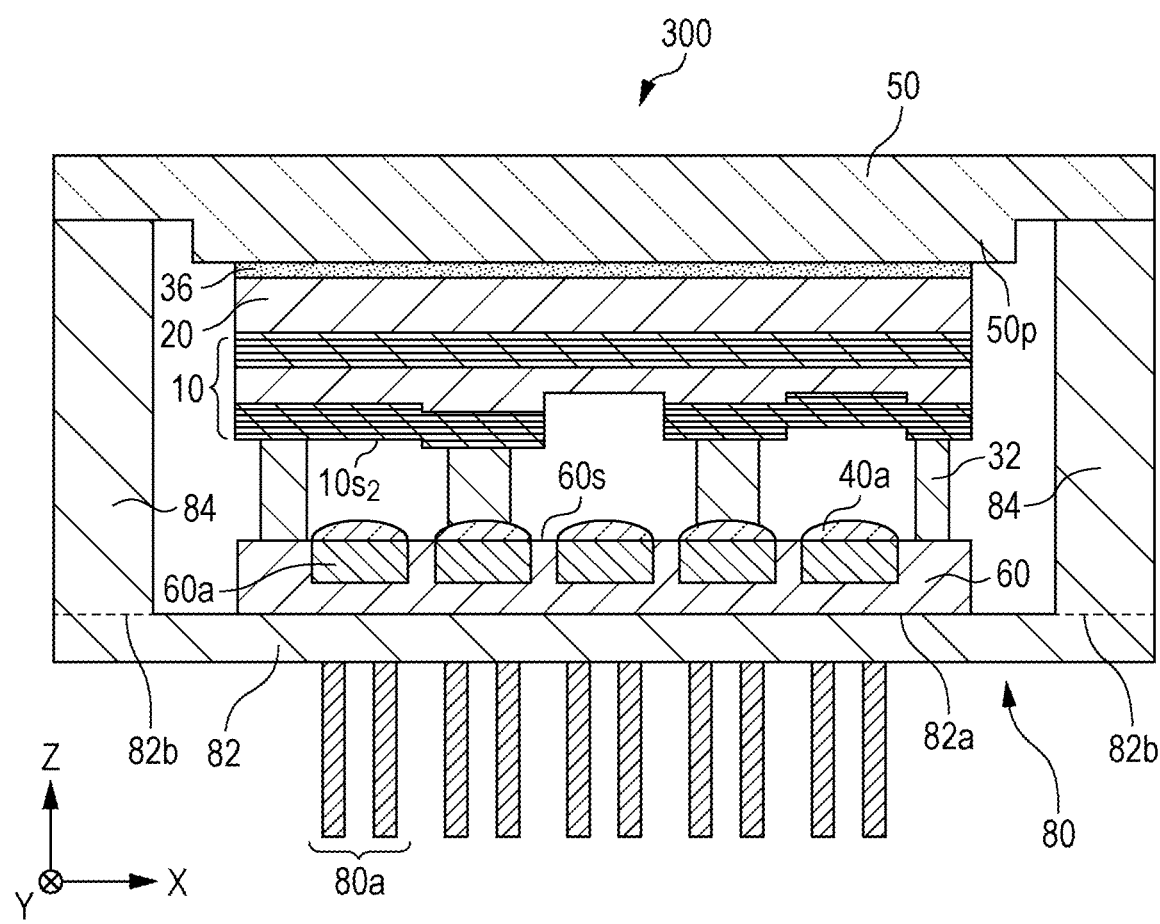
FIG. 19 is a cross section schematically illustrating an eighth example of a light detecting device.
Figure 20:
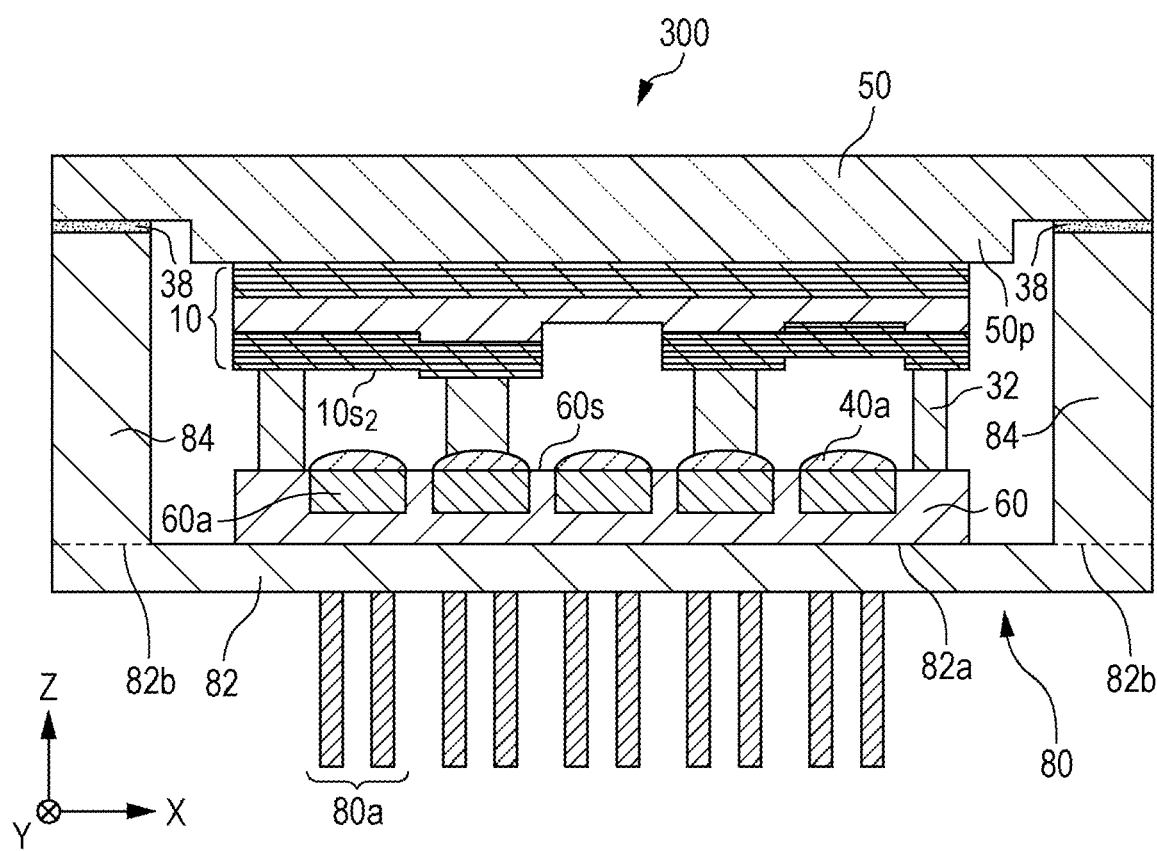
FIG. 20 is a cross section schematically illustrating a ninth example of a light detecting device.

Next, FIGS. 19 and 20 will be referenced to describe an example of encapsulating the filter array 10 and the image sensor 60 into a package.

FIG. 19 is a cross section schematically illustrating an eighth example of the light detecting device 300. The eighth example illustrated in FIG. 19 differs from the seventh example illustrated in FIG. 16A in that the light detecting device 300 is provided with a transparent cover 50 and a package 80, and is not provided with the transparent adhesive 34 between the light-emitting surface $10s_2$ and the light-detecting surface $60s$. The transparent cover 50 transmits light in all of the wavelength bands $W_1$ to $W_i$ included in the target wavelength band at a high transmittance. The high transmittance is 0.8 or higher, for example. The transparent cover 50 has a raised part $50p$. The raised part $50p$ of the transparent cover 50 supports the filter array 10 and the substrate 20 through a transparent adhesive 36. The transparent cover 50 may be formed from glass or plastic, for example. If the refractive index of the transparent adhesive 36 is close to the refractive index of the transparent cover 50, light reflections produced at the interface between the transparent cover 50 and the transparent adhesive 36 can be suppressed. The package 80 is provided with a base 82, side walls 84, and lead electrodes $80a$ penetrating through the base 82. The base 82 has a first area $82a$ where the image sensor 60 is provided. The side walls 84 extend in a perpendicular direction from a second area 82b of the base 82, the second area 82b being located around the first area 82a. The side walls 84 have a shape that surrounds the image sensor 60. The lead electrodes 80a are electrically connected to each of the light-detecting elements 60a included in the image sensor 60. A photocurrent generated in each of the light-detecting elements 60a can be retrieved from a pair of the lead electrodes 80a.

The upper surfaces of the side walls 84 of the package 80 are bonded to a peripheral area of the transparent cover 50 facing the upper surfaces. For the bonding, a soldering material, a brazing material, a light-curing resin, or a heat-curing resin may be used, for example. As illustrated in FIG. 19, the transparent cover 50 and the package 80 encapsulate the filter array 10 and the image sensor 60. Through the encapsulation, the intrusion of dust, dirt, or moisture into the light detecting device 300 can be deterred. As a result, the reliability of the light detecting device 300 can be improved.

The light detecting device 300 illustrated in FIG. 19 can be manufactured by covering the image sensor 60 and the package 80 including the lead electrodes 80a with the transparent cover 50 supporting the filter array 10 and the substrate 20 through the transparent adhesive 36. Since the package 80 is covered by the transparent cover 50, the light detecting device 300 can be manufactured at low cost with a simple step. The spacers 32 are provided on the light-emitting surface $10s_2$ before the package 80 is covered by the transparent cover 50. The thickness of the raised part 50p of the transparent cover 50 and the thickness of the transparent adhesive 36 are designed such that the spacers 32 contact the light-detecting surface 60s when the package 80 is covered by the transparent cover 50. When the package 80 is covered by the transparent cover 50, the uncured transparent adhesive 36 is compressed, and the thickness of the transparent adhesive 36 decreases. As a result, the distance between the light-emitting surface of each of the filters 100 and the light-detecting surface 60s is prescribed more accurately by the spacers 32. If manufacturing error exists in relation to the heights of the side walls 84 of the package 80, the size of the gap between the substrate 20 and the transparent cover 50 may be different for every package 80. In some cases, the manufacturing error may range from 100 µm to 300 µm, for example. In the case where the transparent adhesive 36 is formed from a light-curing resin, even if the size of the gap between the substrate 20 and the transparent cover 50 is different for every package 80, the gap can be filled by the transparent adhesive 36 that expands or contracts before being cured. Thereafter, the transparent adhesive 36 is cured by being irradiated with light or by being heated. Unlike the configuration illustrated in FIG. 19, the substrate 20 and the transparent cover 50 positioned on top of the filter array 10 are not necessarily bonded by the transparent adhesive 36. In this case, a gap exists between the substrate 20 and the transparent cover 50, and the two do not contact each other. The filter array 10 is secured to the image sensor 60 by the adhesives 35.

FIG. 20 is a cross section schematically illustrating a ninth example of the light detecting device 300. The ninth example illustrated in FIG. 20 differs from the eighth example illustrated in FIG. 19 in the following three respects. The raised part 50p of the transparent cover 50 directly supports the filter array 10 without the substrate 20 in between. The side walls 84 of the package 80 are lower by an amount corresponding to the lack of the substrate 20. On the upper surfaces of the side walls 84 of the package 80 are bonded to the peripheral area of the transparent cover 50 facing the upper surfaces by an adhesive 38 formed from a light-curing resin or a heat-curing resin.

As illustrated in FIG. 20, the filter array 10 may be layered directly on top of the raised part 50p of the transparent cover 50. Compared to the eighth example illustrated in FIG. 19, the number of parts can be reduced by an amount corresponding to the lack of the substrate 20. Even if manufacturing error exists in relation to the heights of the side walls 84 of the package 80, gaps between the upper surfaces of the side walls 84 of the package 80 and the peripheral area of the transparent cover 50 can be filled by the adhesive 38 that expands or contracts before being cured. Thereafter, the adhesive 38 is cured by being irradiated with light or by being heated. As a result, the transparent cover 50 is bonded to the package 80. The adhesive 38 is not necessarily transparent.

<Positional Relationship Between Filter Array Including Color Filter and Image Sensor>

In the examples described above, the filter array 10 includes a Fabry-Pérot filter. Such a filter array 10 may be used in a hyperspectral camera. A filter array according to the present disclosure is not limited to a hyperspectral camera and can also be used in a typical camera (that is, an imaging device) that acquires color images in three primary colors (red, green, blue), for example. In this case, the filter array 10 may include a color filter rather than a Fabry-Pérot filter. The effect of reducing the impact of a fringe pattern described above is not limited to a Fabry-Pérot filter and is also obtained in a filter array having a color filter. A filter array including a color filter may also be used in a hyperspectral camera. Hereinafter, an example of a configuration using such a filter array to acquire hyperspectral images, that is, the isolated images 220 described above, will be described.

Figure 21:
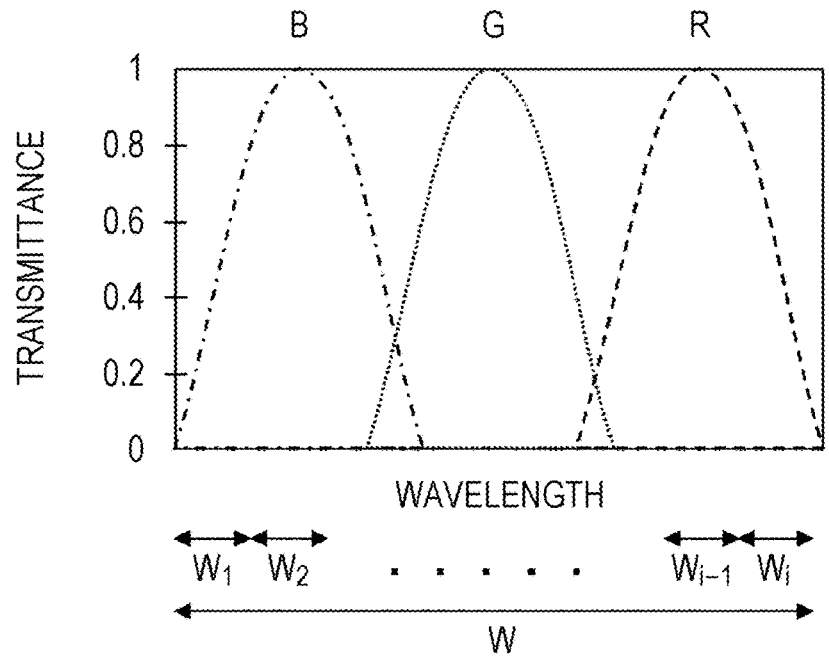
FIG. 21 is a diagram schematically illustrating transmission spectra of a red filter, a green filter, and a blue filter.

FIG. 21 is a diagram schematically illustrating transmission spectra of a red filter, a green filter, and a blue filter. In FIG. 21, "R", "G", and "B" denote red, green, and blue, respectively. In this specification, the red, green, and blue color filters are referred to as the "R filter", "G filter", and "B filter", respectively. The transmission spectrum of the R filter has a maximum at a wavelength in the range equal to or greater than 600 nm and less than or equal to 700 nm, and has a peak width comparable to the wavelength range. The transmission spectrum of the G filter has a maximum at a wavelength in the range equal to or greater than 500 nm and less than or equal to 600 nm, and has a peak width comparable to the wavelength range. The transmission spectrum of the B filter has a maximum at a wavelength in the range equal to or greater than 400 nm and less than or equal to 500 nm, and has a peak width comparable to the wavelength range. The transmission spectrum of each color filter has a single, wide peak in the target wavelength band W. The peak width is wide enough to include two or more of the wavelength bands $W_1$, $W_2$, . . . , $W_i$ included in the target wavelength band W. If the transmission spectrum of each color filter has such a wide peak, one of the color filters may have a difference in the transmittance between adjacent wavelength bands $W_i$ and $W_{i+1}$ in the target wavelength band W. In this case, multiple isolated images 220 can be obtained even if the transmission spectrum of each color filter does not have two or more peaks in the target wavelength band W.

Accordingly, the filter array 10 including the Fabry-Pérot filter in the first example illustrated in FIG. 7 to the ninth example illustrated in FIG. 20 may be replaced with the filter array 10 including a color filter. By using a color filter, the filter array 10 can be manufactured at low cost.

Next, FIGS. 22 to 31 will be referenced to describe examples of the positional relationship between the filter array 10 including a color filter and the image sensor 60. A description will be omitted for portions that overlap with the foregoing description.

Figure 22:
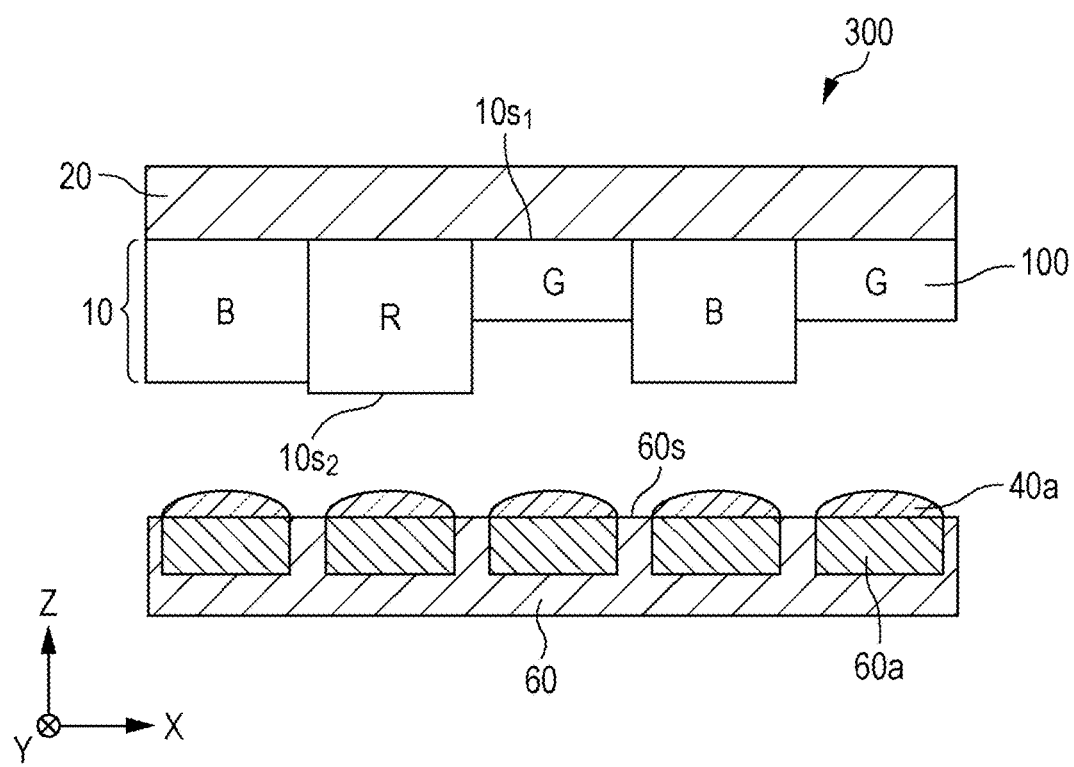
FIG. 22 is a cross section schematically illustrating a 10th example of a light detecting device.

FIG. 22 is a cross section schematically illustrating a 10th example of the light detecting device 300 according to an embodiment of the present disclosure. The 10th example illustrated in FIG. 22 differs from the first example illustrated in FIG. 7 in that the filter array 10 includes filters 100 which are color filters. The color filters may be formed from color resist, for example. The filter array 10 includes R filters, G filters, and B filters arrayed irregularly on the substrate 20, such as in a random distribution or a quasi-random distribution. The R filters, G filters, and B filters have mutually different thicknesses. The thickness of each filter may be equal to or greater than 100 nm and less than or equal to 5 μm, for example. The distance between the light-emitting surface $10s_2$ and the light-detecting surface $60s$ is different for each of the R filters, the G filters, and the B filters. Since the distance between the light-emitting surface $10s_2$ and the light-detecting surface $60s$ is nonuniform, even if multiple reflections of the light occur between the light-emitting surface $10s_2$ and the light-detecting surface $60s$, the appearance of a fringe pattern in the captured image can be suppressed. If the distance between the light-emitting surface $10s_2$ and the light-detecting surface $60s$ is nonuniform, the appearance of a fringe pattern in the captured image can be suppressed, even if the filter array 10 includes an ordinary Bayer color filter array. Unlike the filter array 10 including a Fabry-Pérot filter, the filter array 10 including a color filter has substantially no curvature. Consequently, the filter array 10 has little or no influence on the curvature of the substrate 20.

The filter array 10 according to the present embodiment is provided with two or more types of color filters having mutually different transmission spectra in the target wavelength band W. The distance between the light-emitting surface $10s_2$ and the light-detecting surface $60s$ is different for each of the two or more types of color filters. The color filters may be primary color filters such as R filters, G filters, and B filters. Alternatively, the color filters may be complementary color filters such as cyan filters, magenta filters, and yellow filters. Alternatively, the color filters may be a mix of primary color filters and complementary color filters. Note that the filter array 10 according to the present embodiment may also include a filter that does not have a wavelength-dependent light transmittance, such as a transparent filter or an ND filter.

Figure 23A:
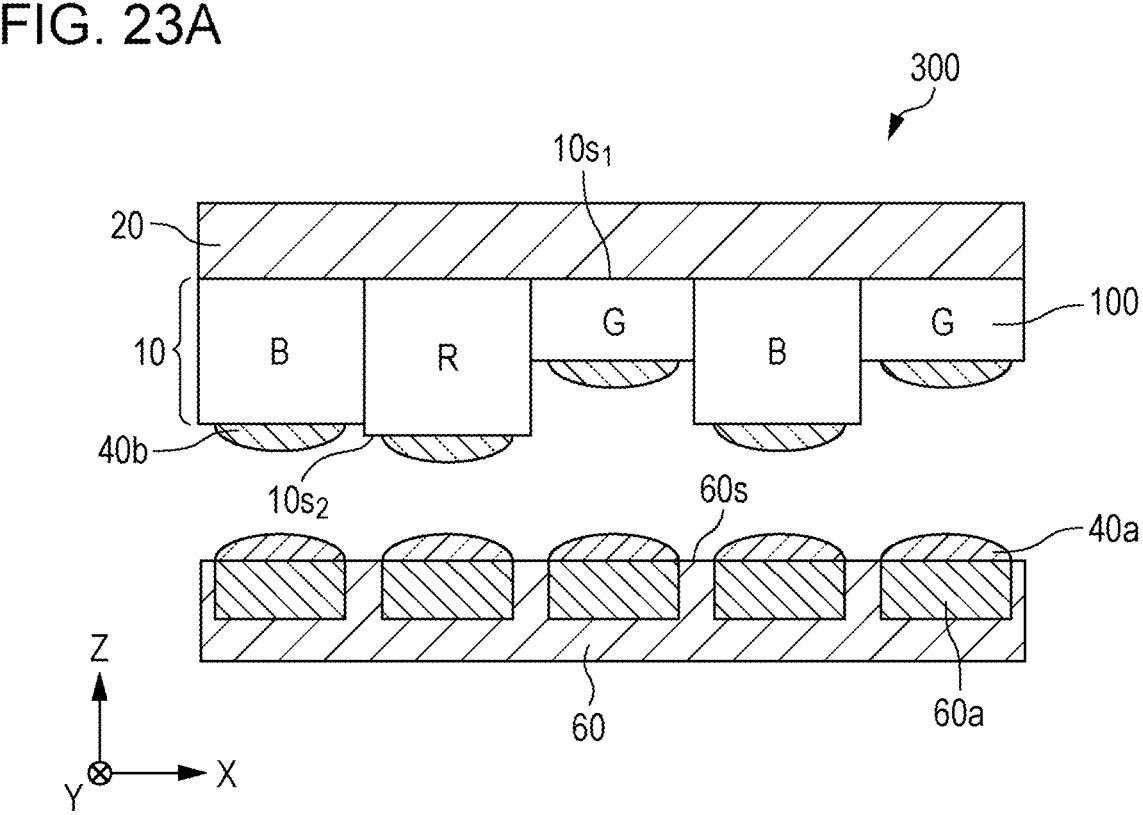
FIG. 23A is a cross section schematically illustrating a modification of the light detecting device illustrated in FIG. 22.
Figure 23B:
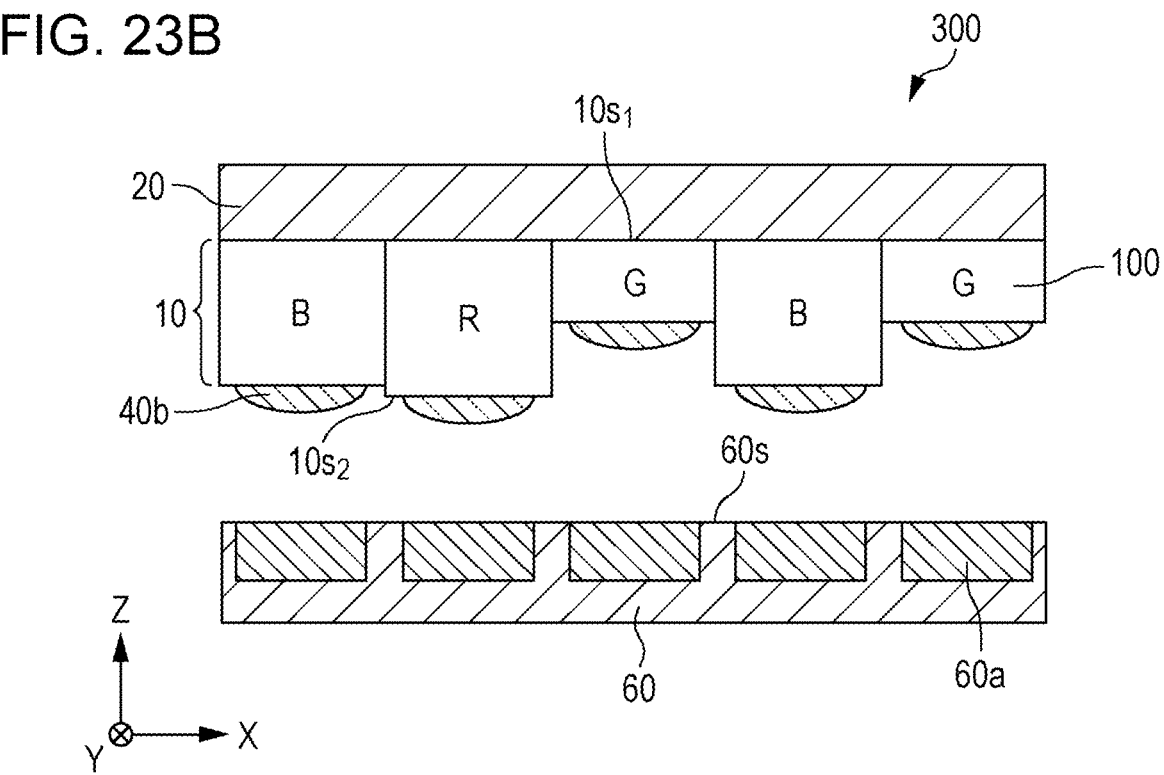
FIG. 23B is a diagram schematically illustrating another modification of the light detecting device illustrated in FIG. 22.

FIGS. 23A and 23B are cross sections schematically illustrating modifications of the light detecting device illustrated in FIG. 22. The modifications illustrated in FIGS. 23A and 23B correspond to the modifications illustrated in FIGS. 9A and 9B, respectively.

Figure 24A:
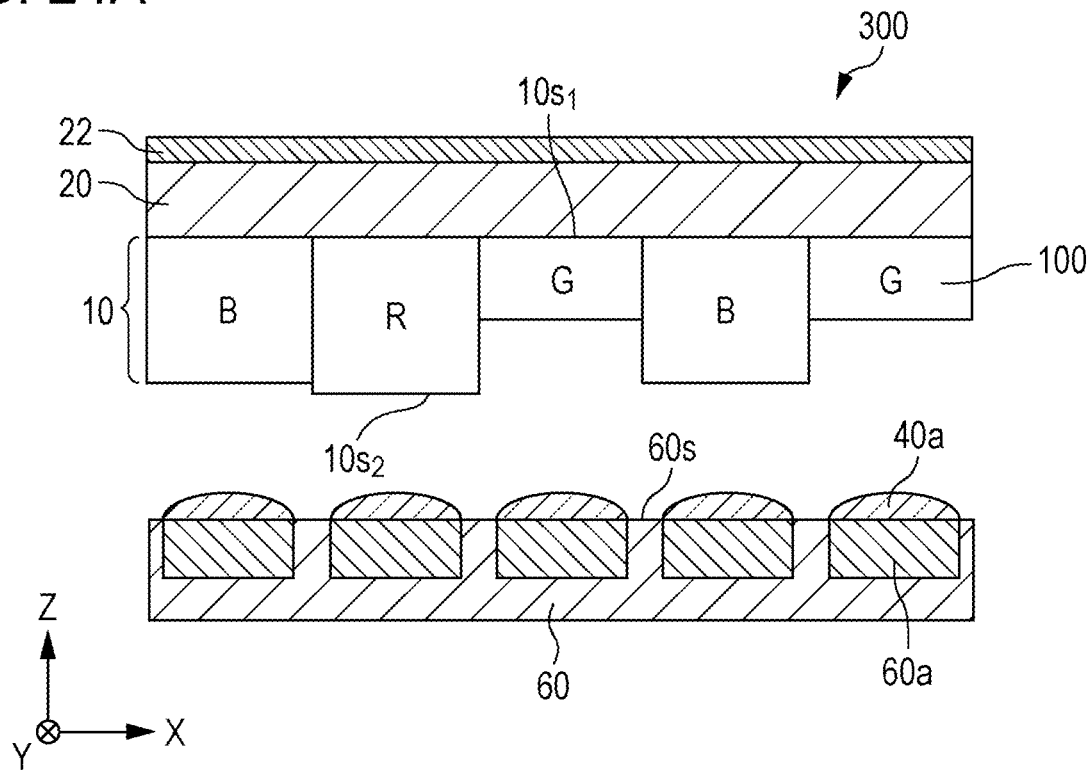
FIG. 24A is a cross section schematically illustrating an 11th example of a light detecting device.
Figure 24B:
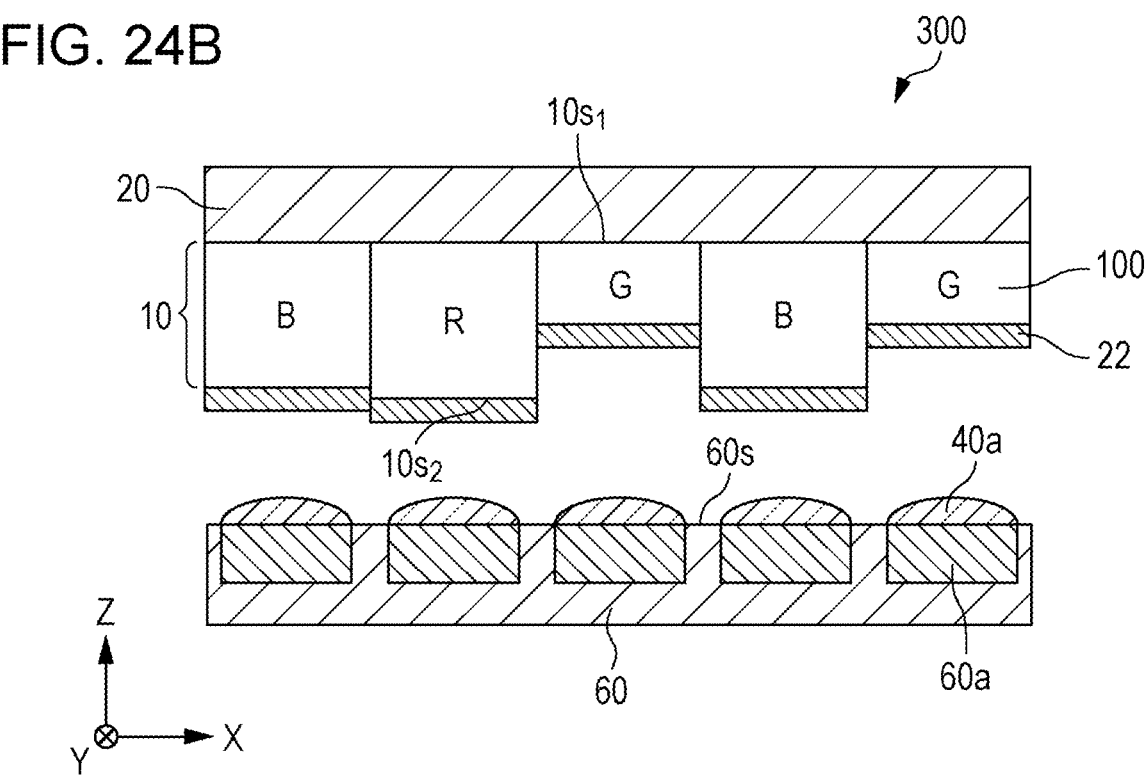
FIG. 24B is a cross section schematically illustrating a 12th example of a light detecting device.
Figure 24C:
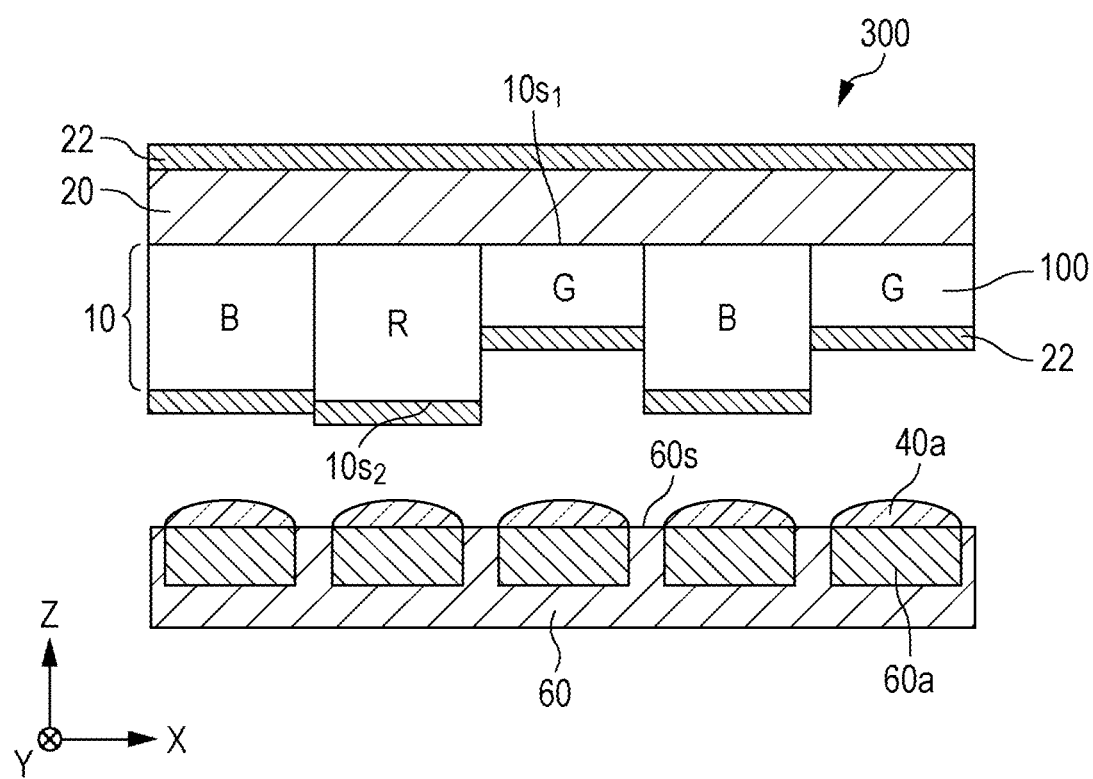
FIG. 24C is a cross section schematically illustrating a 13th example of a light detecting device.

FIG. 24A to FIG. 24C are cross sections schematically illustrating 11th to 13th examples, respectively, of the light detecting device 300 according to an embodiment of the present disclosure. The 11th example illustrated in FIG. 24A corresponds to the second example illustrated in FIG. 10. The 12th example illustrated in FIG. 24B and the 13th example illustrated in FIG. 24C are configurations peculiar to the filter array 10 including a color filter.

The 12th example illustrated in FIG. 24B differs from the 10th example illustrated in FIG. 22 in that each of the filters 100 is provided with the anti-reflective film 22 on the light-emitting surface. At least one of the filters 100 may be provided with the anti-reflective film 22 rather than all of the filters 100. If the anti-reflective film 22 is provided directly on a Fabry-Pérot filter, there is a possibility that the transmission spectrum of the Fabry-Pérot filter may change. In contrast, the transmission spectrum of a color filter does not change even if the anti-reflective film 22 is provided directly on the color filter. Consequently, in the filter array 10 including a color filter, the anti-reflective film 22 can be provided on the light-emitting surface $10s_2$. The anti-reflective film 22 can suppress light reflections produced at the interface between air and the filter array 10 in the 10th example illustrated in FIG. 22. Consequently, multiple reflections of the light occurring between the light-emitting surface $10s_2$ and the light-detecting surface $60s$ can be suppressed. As a result, the appearance of a fringe pattern in the captured image can be suppressed further. The 13th example illustrated in FIG. 24C differs from the 12th example illustrated in FIG. 24B in that the substrate 20 is further provided with the anti-reflective film 22 on the surface on the opposite side from the surface supporting the filter array 10. Through the two anti-reflective films 22, the light detection efficiency of the light detecting device 300 can be improved further.

Figure 25:
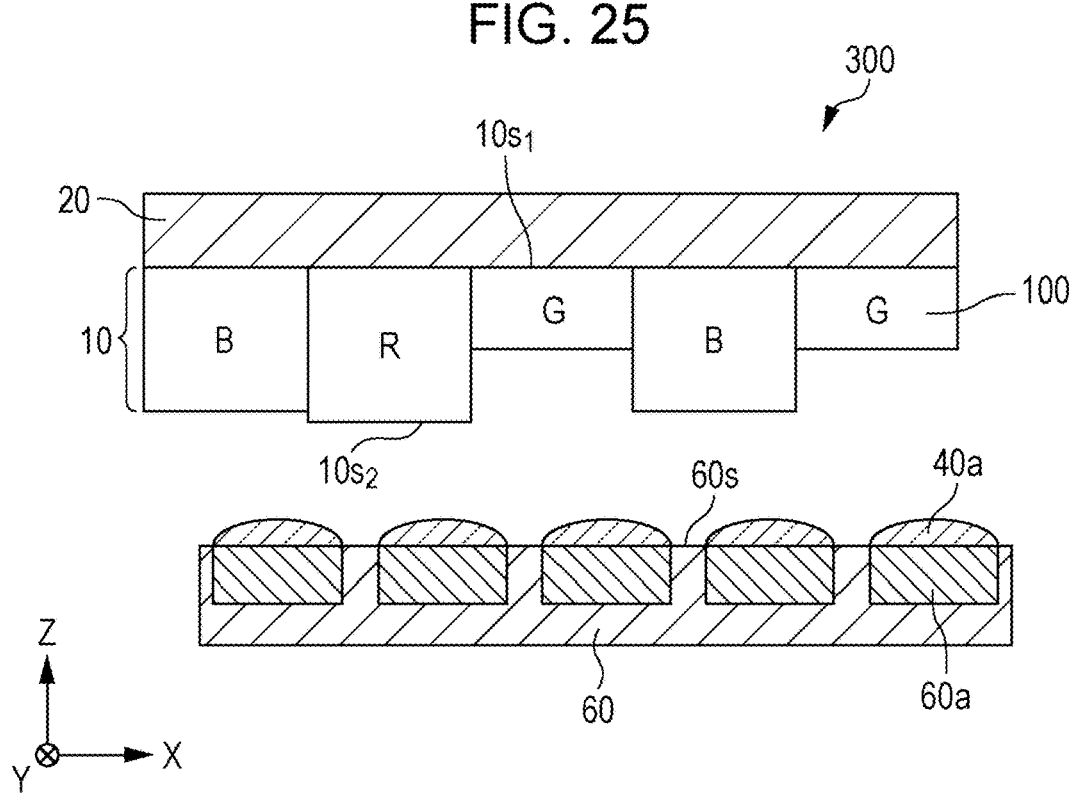
FIG. 25 is a cross section schematically illustrating a 14th example of a light detecting device.
Figure 26:
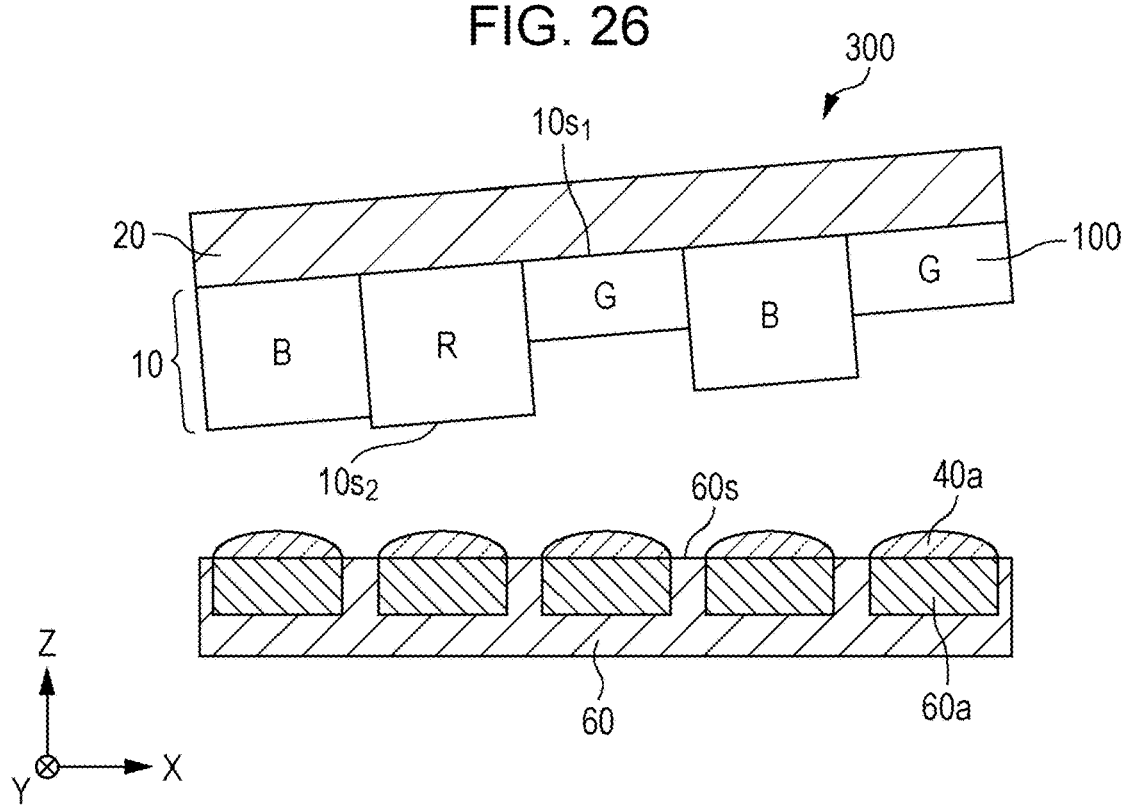
FIG. 26 is a cross section schematically illustrating a 15th example of a light detecting device.

FIGS. 25 and 26 are cross sections schematically illustrating 14th and 15th examples, respectively, of the light detecting device 300 according to an embodiment of the present disclosure. The 14th example illustrated in FIG. 25 corresponds to the third example illustrated in FIG. 11. The 15th example illustrated in FIG. 26 corresponds to the fourth example illustrated in FIG. 12.

Figure 27:
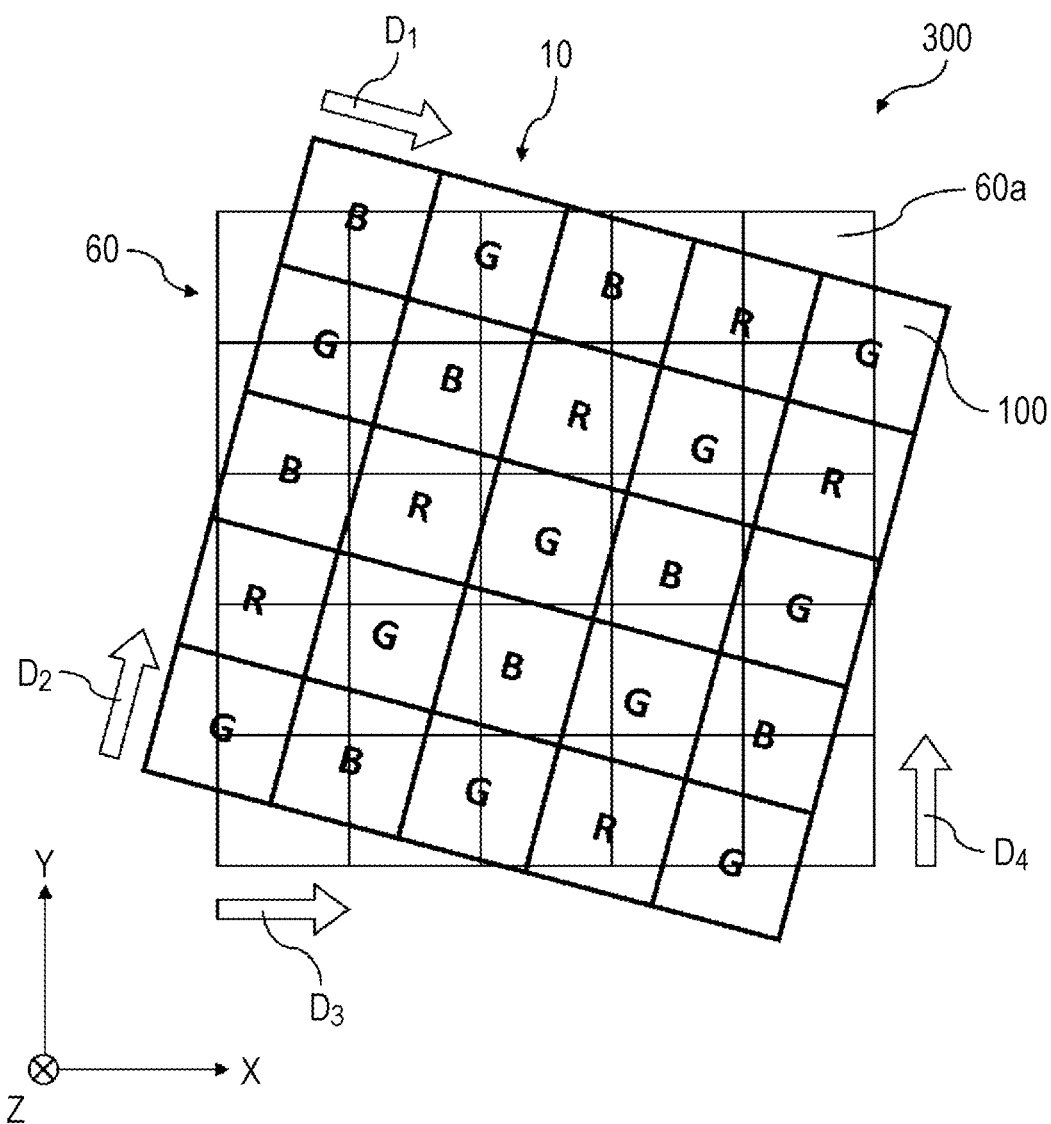
FIG. 27 is a cross section schematically illustrating a 16th example of a light detecting device.

FIG. 27 is a plan section schematically illustrating a 16th example of the light detecting device 300 according to an embodiment of the present disclosure. The 16th example illustrated in FIG. 27 corresponds to the fifth example illustrated in FIG. 13.

Figure 28:
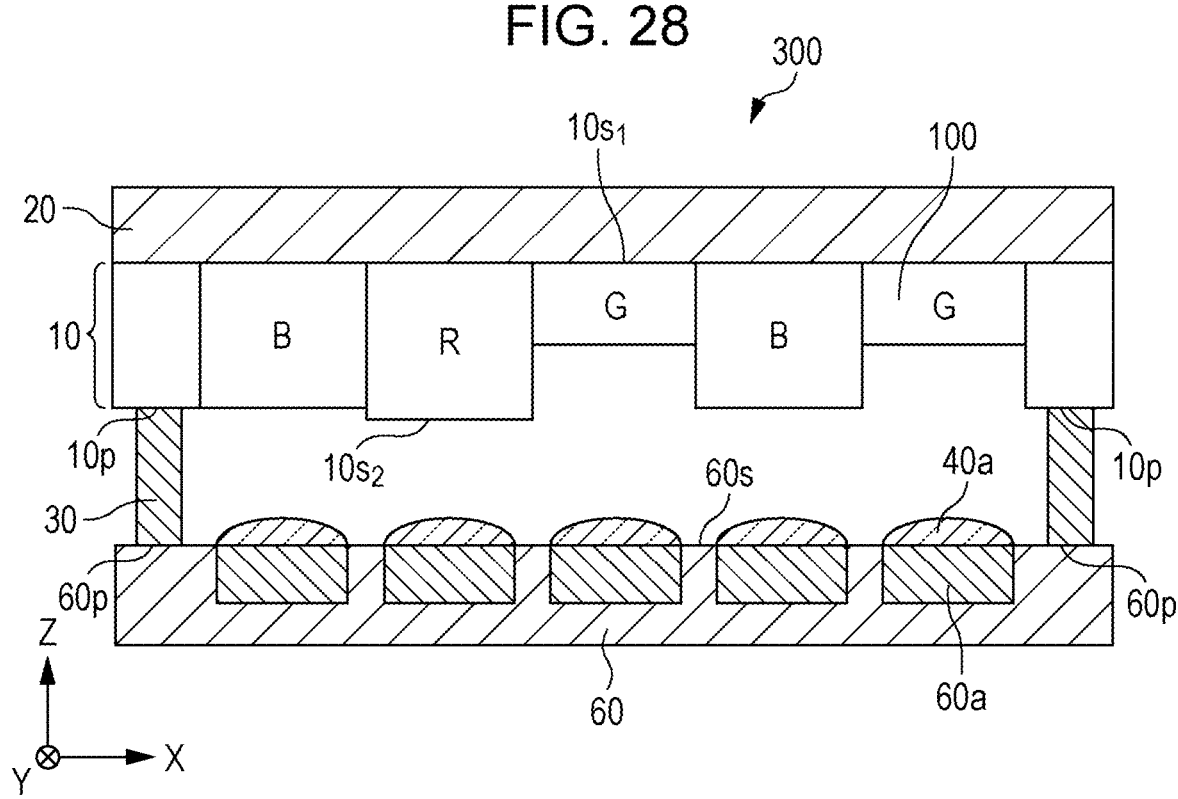
FIG. 28 is a cross section schematically illustrating a 17th example of a light detecting device.

FIG. 28 is a cross section schematically illustrating a 17th example of the light detecting device 300 according to an embodiment of the present disclosure. The 17th example illustrated in FIG. 28 corresponds to the sixth example illustrated in FIG. 15A. The peripheral area $10p$ of the filter array 10 illustrated in FIG. 28 may be the surface of any of the R filters, G filters, and B filters, for example.

Figure 29:
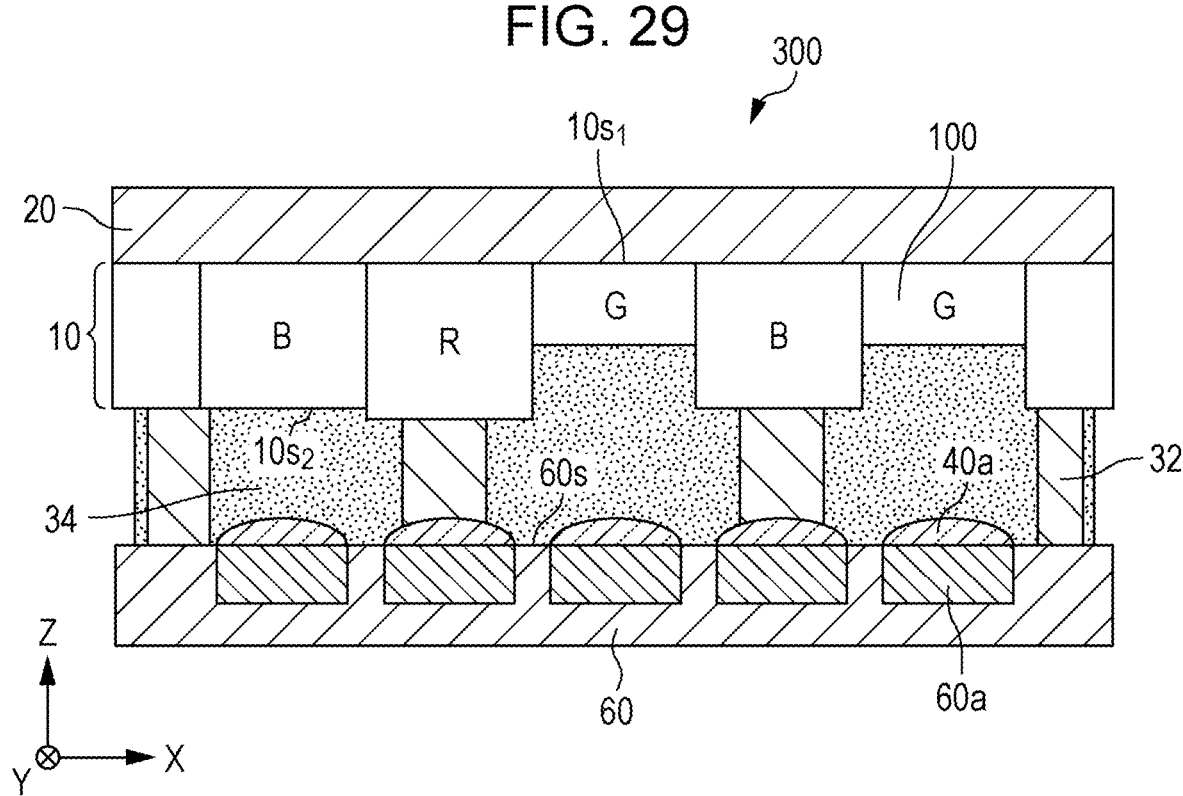
FIG. 29 is a cross section schematically illustrating an 18th example of a light detecting device.
Figure 30:
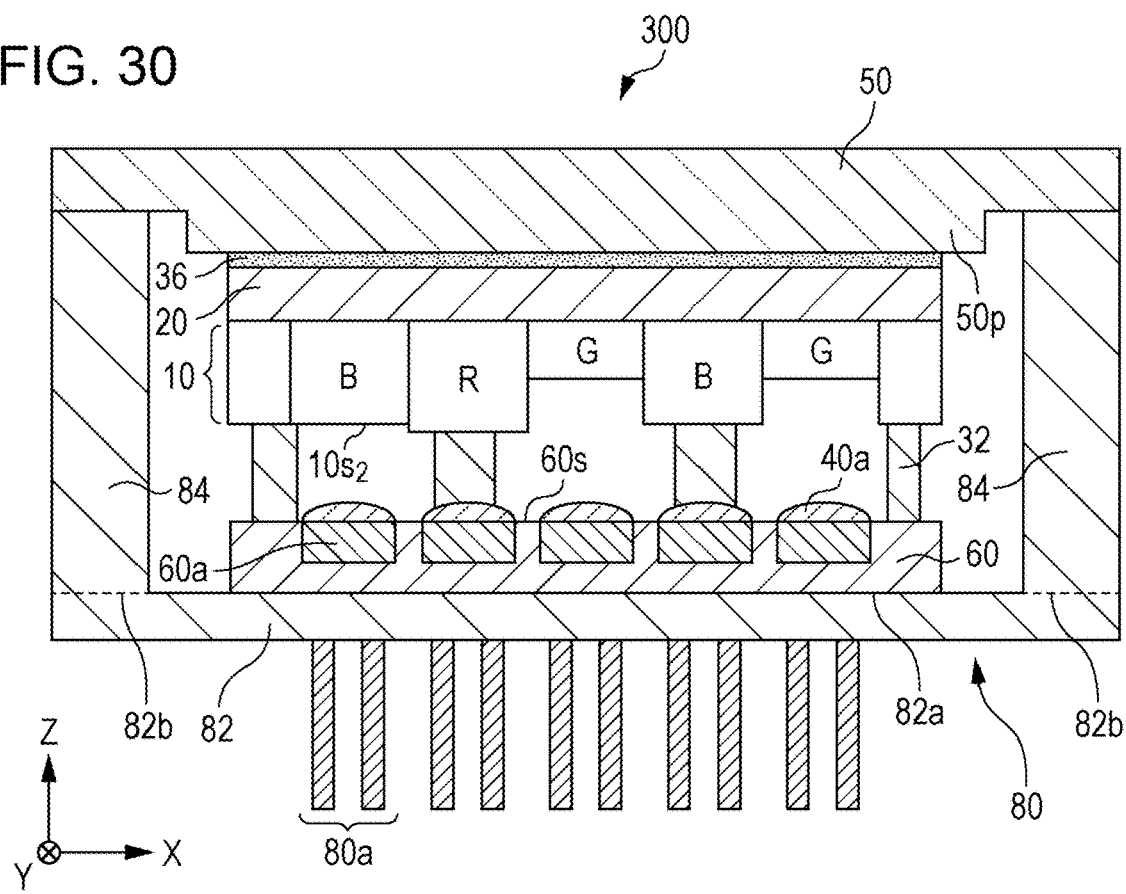
FIG. 30 is a cross section schematically illustrating a 19th example of a light detecting device.
Figure 31:
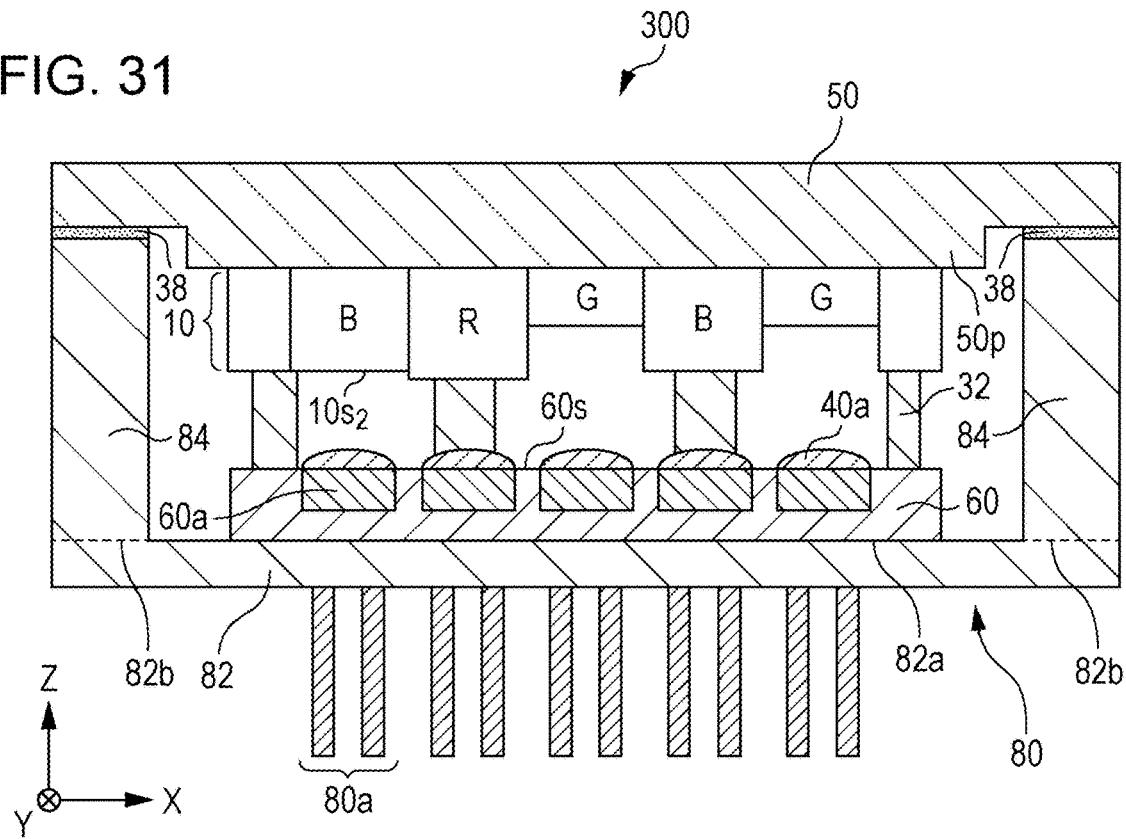
FIG. 31 is a cross section schematically illustrating a 20th example of a light detecting device.

FIGS. 29 to 31 are cross sections schematically illustrating 18th to 20th examples, respectively, of the light detecting device 300 according to an embodiment of the present disclosure. The 18th example illustrated in FIG. 29 corresponds to the seventh example illustrated in FIG. 16A. The 19th example illustrated in FIG. 30 corresponds to the eighth example illustrated in FIG. 19. The 20th example illustrated in FIG. 31 corresponds to the ninth example illustrated in FIG. 20.

Note that some or all of the examples of the light detecting device 300 described above may be combined in anyway depending on the objective or purpose. For example, the anti-reflective film 22 in the second example illustrated in FIG. 10 may also be applied to any from the third example illustrated in FIG. 11 to the ninth example illustrated in FIG. 20. Alternatively, the filter array 10 and the image sensor 60 in the fifth example illustrated in FIG. 13 may be encapsulated by the transparent cover 50 and the package 80 in the eighth example illustrated in FIG. 19 or the ninth example illustrated in FIG. 20.

The light detecting device and filter array according to the present disclosure are useful in cameras and measuring instruments that acquire multi-wavelength two-dimensional images, for example. The light detecting device and filter array according to the present disclosure are also applicable to biological, medical, and cosmetic sensing, foreign matter and residual pesticide inspection systems for food, remote sensing systems, in-vehicle sensing systems, and the like.

What is claimed is:

1. A light detecting device comprising:
   a filter array including filters arranged two-dimensionally, the filters including a light-incident surface and light-emitting surfaces, the filters corresponding one-to-one to the light emitting surfaces, the filters including multiple types of filters exhibiting mutually different transmission spectra; and
   an image sensor including light-detecting elements and a light-detecting surface facing the light-emitting surfaces, wherein
   distances between the light-emitting surfaces and the light-detecting surface vary among the multiple types of filters, and
   the multiple types of filters are arranged irregularly.

2. The light detecting device according to claim 1, wherein
   each of the multiple types of filters is provided with a resonance structure including an interference layer having a first surface and a second surface positioned on opposite sides from each other and a reflection layer provided on the first surface, each of the interference layers having a thickness,
   the thicknesses of the interference layers are different depending on the transmission spectra of the filters,
   the transmission spectrum of each of the multiple types of filters has a transmittance maximum at each of two or more wavelengths included in a specific wavelength band, and
   the image sensor is sensitive in the specific wavelength band.

3. The light detecting device according to claim 1, wherein the multiple types of filters include two or more types of color filters.

4. The light detecting device according to claim 3, wherein
   the two or more types of color filters includes a color filter including an anti-reflective film on the light-emitting surface of the color filter.

5. The light detecting device according to claim 1, wherein a minimum distance among the distances is equal to or greater than 0.1 µm and less than or equal to 200 µm.

6. The light detecting device according to claim 1, wherein the filters face the light-detecting elements in a one-to-one correspondence.

7. The light detecting device according to claim 1, wherein
   at least one of the filters includes a first portion and a second portion,
   the light-detecting elements include a first light-detecting element and a second light-detecting element adjacent to the first light-detecting element,
   the first portion faces a portion of the first light-detecting element, and
   the second portion faces a portion of the second light-detecting element.

8. The light detecting device according to claim 1, wherein the light-incident surface of the filters and the light-detecting surface are parallel to each other.

9. The light detecting device according to claim 1, wherein the light-incident surface of the filters and the light-detecting surface are not parallel to each other.

10. The light detecting device according to claim 1, wherein
    when viewed from the light-incident surface side, the filters are arranged two-dimensionally in a first direction and a second direction rotated counter-clockwise from the first direction by a predetermined angle, and the light-detecting elements are arranged two-dimensionally in a third direction and a fourth direction rotated counter-clockwise from the third direction by the predetermined angle, and
    an angle obtained by the first direction and the third direction is equal to or greater than ¼ and less than or equal to ½ the predetermined angle.

11. The light detecting device according to claim 10, wherein the predetermined angle is 90 degrees.

12. The light detecting device according to claim 1, further comprising double-sided tape sticking together at least a portion of a peripheral area located around an area including the light-emitting surfaces of the filters and at least a portion of a peripheral area located around the light-detecting surface of the image sensor.

13. The light detecting device according to claim 1, wherein the image sensor is provided with first microlenses arranged on the light-detecting elements in a one-to-one correspondence.

14. The light detecting device according to claim 1, wherein the filter array is provided with second microlenses disposed on the light-emitting surface of each of the filters in a one-to-one correspondence.

15. The light detecting device according to claim 1, wherein a minimum distance among the distances is greater than 0.1 µm.

16. The light detecting device according to claim 1, wherein provided that a target wavelength band is equal to or greater than $\lambda_1$ and less than or equal to $\lambda_2$, a minimum distance among the distances is greater than $\lambda_1/4$.

17. The light detecting device according to claim 1, wherein provided that a target wavelength band is equal to or greater than $\lambda_1$ and less than or equal to $\lambda_2$, a minimum among the distances is greater than $\lambda_2/4$.

18. The light detecting device according to claim 1, further comprising:
    a transparent cover supporting the filter array; and
    a package provided with a base having a first area where the image sensor is provided and side walls surrounding the image sensor and extending from a second area of the base, the second area being located around the first area, wherein
    the transparent cover and the package encapsulate the filter array and the image sensor.

19. A light-detecting device comprising:
    a filter array including filters arranged two-dimensionally, the filters including a light-incident surface and light-emitting surfaces, the filters corresponding one-to-one to light-emitting surfaces, the filters including multiple types of filters exhibiting mutually different transmission spectra;
    an image sensor including light-detecting elements and a light-detecting surface facing the light-emitting surfaces; and
    a substrate on the light-incident surface of the filters, wherein
    distances between the light-emitting surfaces and the light-detecting surface vary among the multiple types of filters, and
    the substrate is provided with an anti-reflective film on a surface on an opposite side from a surface on the filter array side.

20. A light-detecting device comprising:
a filter array including filters arranged two-dimensionally, the filters including a light-incident surface and light-emitting surfaces, the filters corresponding one-to-one to light-emitting surfaces, the filters including multiple types of filters exhibiting mutually different transmission spectra;
an image sensor including light-detecting elements and a light-detecting surface facing the light-emitting surfaces;
spacers caught between the filter array and the image sensor, wherein
distances between the light-emitting surfaces and the light-detecting surface vary among the multiple types of filters,
the spacers prescribe the distances, and
at least a portion of the light-emitting surfaces of the filters and at least a portion of the light-detecting surface are bonded to each other with an adhesive.

21. The light detecting device according to claim 20, wherein in a plan view, at least one of the spacers is disposed at a position overlapping at least one of the light-detecting elements.

22. A light detecting device comprising:
a filter array including filters arranged two-dimensionally, the filters including a light-incident surface and light-emitting surfaces, the filters corresponding one-to-one to light-emitting surfaces, the filters including multiple types of filters exhibiting mutually different transmission spectra;
an image sensor including light-detecting elements and a light-detecting surface facing the light-emitting surfaces; and
a signal processing circuit, wherein
distances between the light-emitting surfaces and the light-detecting surface vary among the multiple types of filters, and
the signal processing circuit generates spectral images corresponding one-to-one to four or more wavelength bands on a basis of a compressed image encoded by the filter array.

23. A method for manufacturing a structure, the method comprising:
a step for preparing a filter array having an uneven surface and including filters arranged two-dimensionally, the filters having mutually different transmission spectra;
a step for forming a photoresist on the uneven surface of the filter array by spin coating; and
a step for forming spacers on the uneven surface of the filter array by patterning the photoresist.

24. A method for manufacturing a light detecting device, the method comprising:
a step for preparing a structure manufactured according to the method for manufacturing a structure according to claim 23 and an image sensor having a light-detecting surface; and
a step for sticking together the filter array and the image sensor with the spacers interposed in between, in a state in which the uneven surface of the filter array and the light-detecting surface of the image sensor are facing each other.

25. The method for manufacturing a light detecting device according to claim 24, wherein
adhesives are arranged on the light-detecting surface and/or a peripheral area located around the light-detecting surface of the image sensor, and
the step for sticking together the filter array and the image sensor includes pressing the filter array against the image sensor with the spacers and the adhesives interposed in between.

* * * * *